(12) United States Patent
Yang et al.

(10) Patent No.: US 11,405,077 B2
(45) Date of Patent: Aug. 2, 2022

(54) ENCODING AND RESOURCE MAPPING FOR MULTIPLEXING FEEDBACK CODEBOOKS

(71) Applicant: QUALCOMM Incorporated, San Diego, CA (US)

(72) Inventors: Wei Yang, San Diego, CA (US); Seyedkianoush Hosseini, San Diego, CA (US); Yi Huang, San Diego, CA (US); Seyed Ali Akbar Fakoorian, San Diego, CA (US); Wanshi Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/831,516

(22) Filed: Mar. 26, 2020

(65) Prior Publication Data
US 2020/0313732 A1    Oct. 1, 2020

Related U.S. Application Data

(60) Provisional application No. 62/826,940, filed on Mar. 29, 2019.

(51) Int. Cl.
*H04W 72/14* (2009.01)
*H04B 7/0417* (2017.01)
(Continued)

(52) U.S. Cl.
CPC ......... *H04B 7/0417* (2013.01); *H04B 7/0482* (2013.01); *H04W 72/0473* (2013.01); *H04W 72/1263* (2013.01); *H04W 72/14* (2013.01)

(58) Field of Classification Search
CPC .................................................... H04B 7/0417
See application file for complete search history.

(56) References Cited

U.S. PATENT DOCUMENTS

2018/0279291 A1   9/2018 Tiirola et al.
2019/0069321 A1*  2/2019 Akkarakaran ........ H04L 5/0057
(Continued)

FOREIGN PATENT DOCUMENTS

WO    WO-2018129017 A2    7/2018
WO    WO-2018231728 A1    12/2018

OTHER PUBLICATIONS

CMCC: "Discussion on Intra-UE Multiplexing", 3GPP Draft, 3GPP TSG RAN WG1 #96, R1-1902337, 3rd Generation Partnership Project (3GPP), Mobile Competence Centre, 650, Route Des Lucioles, F-06921, Sophia-Antipolis Cedex, France, vol. RAN WG1. No. Athens, Greece; Feb. 25, 2019-Mar. 1, 2019, Feb. 16, 2019 (82 16, 2019), XP051600031, 4 pages, Retrieved from the Internet: URL:http://www.3gpp.org/ftp/tsg%5Fran/WG1%5FRL1/TSGR1%5F96/Docs/R1%2D1902337%2Ezip [retrieved on Feb. 16, 2019] section 2.5.
(Continued)

*Primary Examiner* — Sulaiman Nooristany
(74) *Attorney, Agent, or Firm* — Holland & Hart LLP

(57) ABSTRACT

Methods, systems, and devices for wireless communications are described. A UE may determine resource amounts for transmitting feedback codebook for two different service types based on satisfaction of a multiplexing condition by overlapping resource schedules. The codebooks may be encoded according to different coding rates to generate encoded feedback codebooks. The encoded codebooks may be mapped to transmission resources according to codebook payload sizes, encoding rates, and available resources and transmitted according to the mapping.

35 Claims, 27 Drawing Sheets

(51) Int. Cl.
　　　*H04B 7/0456*　　(2017.01)
　　　*H04W 72/12*　　(2009.01)
　　　*H04W 72/04*　　(2009.01)

(56) References Cited

U.S. PATENT DOCUMENTS

| | | | |
|---|---|---|---|
| 2019/0081737 A1 | 3/2019 | Huang et al. | |
| 2020/0037350 A1* | 1/2020 | Park | H04W 76/27 |
| 2020/0228173 A1* | 7/2020 | Ye | H04W 72/0413 |
| 2020/0313745 A1 | 10/2020 | Yang et al. | |

OTHER PUBLICATIONS

International Search Report and Written Opinion—PCT/US2020/025398—ISA/EPO—dated Jul. 3, 2020.
LG Electronics: "Intra-UE Prioritization for NR URLLC", 3GPP Draft, 3GPP TSG RAN WG1 Meeting #96, R1-1902051, URLLC INTRA-UE PR, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051599747, 5 pages, Retrieved from the Internet:URL: http://www.3gpp.org/ftp/tsg%5Fran/WG1%5FRL1/TSGR1%5F96/Docs/R1%2D1902051%2Ezip [retrieved on Feb. 16, 2019]section 2.4.
Mediatek Inc: "Evaluation and Enhancements of NR PUCCH", 3GPP Draft, 3GPP TSG RAN WG1 Meeting #95, R1-1812375 Evaluation and Enhancements of NR PUCCH, 3rd Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 11, 2018 (Nov. 11, 2018), XP051554284, 10 pages, Retrieved from the Internet: URL:http://www.3gpp.org/ftp/Meetings%5F3GPP%5FSYNC/RAN1/Docs/R1%2D1812375%2Ezip [retrieved on Nov. 11, 2018]section 3.3.

\* cited by examiner

• Bit Pair 605

ENCODING AND RESOURCE MAPPING FOR MULTIPLEXING FEEDBACK CODEBOOKS

CROSS REFERENCE

The present Application for Patent claims the benefit of U.S. Provisional Patent Application No. 62/826,940 by YANG et al., entitled "ENCODING AND RESOURCE MAPPING FOR MULTIPLEXING FEEDBACK CODEBOOKS," filed Mar. 29, 2019, assigned to the assignee hereof, and expressly incorporated by reference herein.

BACKGROUND

The following relates generally to wireless communications, and more specifically to encoding and resource mapping for multiplexing feedback codebooks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may receive one or more enhanced mobile broadband (eMBB) downlink grants and may transmit an eMBB codebook within a physical uplink control channel (PUCCH) including one or more acknowledgements (ACKs) and/or non-acknowledgements (NACKs) corresponding to the one or more eMBB downlink grants. In other cases, a UE may receive an ultra-reliable low-latency communication (URLLC) grants and may transmit a URLLC codebook within a PUCCH including an ACK or NACK corresponding to the URLLC grant.

SUMMARY

The described techniques relate to improved methods, systems, devices, and apparatuses that support encoding and mapping for multiplexed feedback codebooks. Generally, the described techniques provide for a user equipment (UE) to determine a first resource amount to be utilized for transmission of a first feedback codebook for a first service type (e.g., ultra-reliable low-latency communication (URLLC)) and a second resource amount to be utilized for transmission of a second feedback codebook for a second service type (e.g., enhanced mobile broadband (eMBB)) based at least in part on a multiplexing condition being satisfied. The UE may monitor for a first transmission of the first service type and a second transmission of a second service type for generating the first and second feedback codebooks. The UE may separately encode the first feedback codebook and generated for the first transmission (e.g., a URLLC hybrid automatic repeat request (HARQ) acknowledgement (ACK) codebook) and a second feedback codebook generated for the second transmission (e.g., an eMBB HARQ-ACK codebook). Separately encoding the first and second feedback codebooks may allow the first encoded feedback codebook and the second encoded feedback codebook to be mapped to available transmission resources. In some cases, the UE may determine resource amounts for transmitting the feedback codebooks based on a feedback multiplexing condition being satisfied. The UE may transmit one or both of the encoded feedback codebooks in a control channel (e.g., a physical uplink control channel (PUCCH)) or a shared data channel (e.g., a physical uplink shared channel (PUSCH)).

In some cases, a grant may schedule the UE to transmit one of the first feedback codebook or the second feedback codebook in the control channel, and the UE may multiplex the first feedback codebook and the second feedback codebook for transmission via the control channel. In some additional cases, a grant may schedule the UE to transmit data on a shared data channel that may at least partially overlap with a resource configured for transmitting the first feedback codebook, the second feedback codebook, or both, and the UE may multiplex the first feedback codebook and the second feedback codebook for transmission via the shared data channel. The UE may determine that the feedback multiplexing condition is satisfied based on identifying a collision in time due to at least a partial overlap between a first resource allocated for transmitting the first feedback codebook and a second resource allocated for transmitting the second codebook, a collision due to at least a partial overlap between the first resource, the second resource, and a third resource on a shared data channel in which the UE is scheduled to send a data transmission, or the like.

A method of wireless communications by a user equipment is described. The method may include determining a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type, encoding the first feedback codebook using a first coding rate to generate a first encoded feedback codebook and the second feedback codebook using a second coding rate to generate a second encoded feedback codebook, mapping the first encoded feedback codebook and the second encoded feedback codebook to a transmission resource based on the first resource amount and the second resource amount, and transmitting the first encoded feedback codebook and the second encoded feedback codebook using the transmission resource based on the mapping.

An apparatus for wireless communications by a user equipment is described. The apparatus may include a processor, memory in electronic communication with the processor, and instructions stored in the memory. The instructions may be executable by the processor to cause the apparatus to determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type, encode the first feedback codebook using a first coding rate to generate a first encoded feedback codebook and the second feedback codebook using a second coding rate to generate a second encoded feedback codebook, map the first encoded feedback codebook and the second encoded feedback codebook to a transmission resource based on the first resource amount and the second resource amount, and transmit the first encoded feedback codebook and the second encoded feedback codebook using the transmission resource based on the mapping.

Another apparatus for wireless communications by a user equipment is described. The apparatus may include means for determining a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type, encoding the first feedback codebook using a first coding rate to generate a first encoded feedback codebook and the second feedback codebook using a second coding rate to generate a second encoded feedback codebook, mapping the first encoded feedback codebook and the second encoded feedback codebook to a transmission resource based on the first resource amount and the second resource amount, and transmitting the first encoded feedback codebook and the second encoded feedback codebook using the transmission resource based on the mapping.

A non-transitory computer-readable medium storing code for wireless communications by a user equipment is described. The code may include instructions executable by a processor to determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type, encode the first feedback codebook using a first coding rate to generate a first encoded feedback codebook and the second feedback codebook using a second coding rate to generate a second encoded feedback codebook, map the first encoded feedback codebook and the second encoded feedback codebook to a transmission resource based on the first resource amount and the second resource amount, and transmit the first encoded feedback codebook and the second encoded feedback codebook using the transmission resource based on the mapping.

In some examples of the method, apparatuses, and non-transitory computer-readable medium described herein, determining the first resource amount and the second resource amount may include operations, features, means, or instructions for determining the first resource amount based on a size of the first feedback codebook, and determining the second resource amount based on a size of the second feedback codebook.

In some examples of the method, apparatuses, and non-transitory computer-readable medium described herein, determining the first resource amount and the second resource amount may include operations, features, means, or instructions for determining the first resource amount and the second resource amount based on a control channel format of the transmission resource.

Some examples of the method, apparatuses, and non-transitory computer-readable medium described herein may further include operations, features, means, or instructions for receiving a grant scheduling a first resource for transmission of the first feedback codebook, and determining the first coding rate that corresponds to the first resource.

In some examples of the method, apparatuses, and non-transitory computer-readable medium described herein, transmitting the first encoded feedback codebook and the second encoded feedback codebook using the transmission resource may include operations, features, means, or instructions for transmitting the first encoded feedback codebook and the second encoded feedback codebook using the transmission resource that may be the first resource.

In some examples of the method, apparatuses, and non-transitory computer-readable medium described herein, the transmission resource may be a shared data channel resource, and where the first encoded feedback codebook and the second encoded feedback codebook may be transmitted using the shared data channel resource.

Some examples of the method, apparatuses, and non-transitory computer-readable medium described herein may further include operations, features, means, or instructions for receiving a grant scheduling a second resource for transmission of the second feedback codebook, and determining the second coding rate that corresponds to the second resource.

Some examples of the method, apparatuses, and non-transitory computer-readable medium described herein may further include operations, features, means, or instructions for receiving control signaling indicating a ratio between the first coding rate and the second coding rate, and determining the second coding rate based on the ratio and the first coding rate.

In some examples of the method, apparatuses, and non-transitory computer-readable medium described herein, the control signaling may be radio resource control signaling.

Some examples of the method, apparatuses, and non-transitory computer-readable medium described herein may further include operations, features, means, or instructions for adjusting the second coding rate based on determining that a sum of the first resource amount and the second resource amount exceeds an available amount of resources for the transmission resource.

Some examples of the method, apparatuses, and non-transitory computer-readable medium described herein may further include operations, features, means, or instructions for adjusting a size of a payload for the second feedback codebook to partially drop a portion of the second feedback codebook based on determining that a sum of the first resource amount and the second resource amount exceeds an available amount of resources for the transmission resource.

In some examples of the method, apparatuses, and non-transitory computer-readable medium described herein, determining the first resource amount may include operations, features, means, or instructions for determining the first resource amount as a number of resource blocks based on the first coding rate, a size of the first feedback codebook, and a number of symbols in the transmission resource.

In some examples of the method, apparatuses, and non-transitory computer-readable medium described herein, determining the second resource amount may include operations, features, means, or instructions for determining the second resource amount as a number of resource blocks based on the second coding rate, a size of the second feedback codebook, and a number of symbols in the transmission resource.

Some examples of the method, apparatuses, and non-transitory computer-readable medium described herein may further include operations, features, means, or instructions for receiving control signaling that indicates a power ratio, and determining a first transmission power for transmission of the first encoded feedback codebook and a second transmission power for transmission of the second encoded feedback codebook based on the power ratio, where the first encoded feedback codebook and the second encoded feedback codebook may be respectively transmitted in accordance with the first transmission power and the second first transmission power.

In some examples of the method, apparatuses, and non-transitory computer-readable medium described herein, mapping the first encoded feedback codebook and the second encoded feedback codebook may include operations, features, means, or instructions for mapping the first encoded feedback codebook to first resource elements of the transmission resource based on proximity of the first resource elements to at least one demodulation reference signal symbol within the transmission resource, and mapping the second encoded feedback codebook to second resource elements remaining within the transmission resource after mapping of the first encoded feedback codebook to the first resource elements.

In some examples of the method, apparatuses, and non-transitory computer-readable medium described herein, determining the first resource amount may include operations, features, means, or instructions for setting the first resource amount as a first number of resource elements to be utilized for transmission of the first feedback codebook.

In some examples of the method, apparatuses, and non-transitory computer-readable medium described herein, determining the second resource amount may include operations, features, means, or instructions for determining a second number of resource elements to be utilized for transmission of the second feedback codebook, where the second resource amount may be the second number of resource elements based on a sum of the first number and the second number not exceeding a total number of resource elements in the transmission resource.

In some examples of the method, apparatuses, and non-transitory computer-readable medium described herein, determining the second resource amount may include operations, features, means, or instructions for determining a second number of resource elements to be utilized for transmission of the second feedback codebook, and setting the second resource amount as a third number of remaining resource elements in the transmission resource based on a sum of the first number and the second number exceeding a total number of resource elements in the transmission resource.

Some examples of the method, apparatuses, and non-transitory computer-readable medium described herein may further include operations, features, means, or instructions for receiving a first grant scheduling a first resource for transmission of the first feedback codebook, and receiving a second grant scheduling a second resource for transmission of the second feedback codebook, where the first resource collides in time with the second resource to satisfy the multiplexing condition.

Some examples of the method, apparatuses, and non-transitory computer-readable medium described herein may further include operations, features, means, or instructions for receiving a grant that schedules a transmission of the first service type and a control channel resource for transmission of the first feedback codebook, and generating the first feedback codebook based on the transmission of the first service type.

Some examples of the method, apparatuses, and non-transitory computer-readable medium described herein may further include operations, features, means, or instructions for receiving a grant that schedules a transmission of the second service type and a control channel resource for transmission of the second feedback codebook, and generating the second feedback codebook based on the transmission of the second service type.

Some examples of the method, apparatuses, and non-transitory computer-readable medium described herein may further include operations, features, means, or instructions for receiving a first grant scheduling a first resource for transmission of the first feedback codebook and a second grant scheduling a second resource for transmission of the second feedback codebook, and determining that the multiplexing condition may be satisfied based on the first resource at least partially overlapping with the second resource.

In some examples of the method, apparatuses, and non-transitory computer-readable medium described herein, the transmission resource may be the first resource.

In some examples of the method, apparatuses, and non-transitory computer-readable medium described herein, determining that the multiplexing condition may be satisfied may include operations, features, means, or instructions for receiving a third grant scheduling a data resource for transmission of uplink data on a shared data channel, and determining that the multiplexing condition may be satisfied based on at least one of the first resource and the second resource at least partially overlapping with the data resource, where the transmission resource may be the data resource.

In some examples of the method, apparatuses, and non-transitory computer-readable medium described herein, the encoding may include operations, features, means, or instructions for applying a first cyclic shift of a set of different cyclic shifts to a bit sequence to generate a shifted bit sequence to encode at least one bit of the first feedback codebook, at least one bit of the second feedback codebook, or both.

Some examples of the method, apparatuses, and non-transitory computer-readable medium described herein may further include operations, features, means, or instructions for adjusting from a first modulation scheme to a second modulation scheme based on a size of the first feedback codebook being a single bit, and modulating a bit of the first encoded feedback codebook and a bit of the second encoded feedback codebook based on the second modulation scheme.

In some examples of the method, apparatuses, and non-transitory computer-readable medium described herein, the first modulation scheme may be binary phase shift keying modulation scheme and the second modulation scheme may be quadrature phase shift keying modulation scheme.

In some examples of the method, apparatuses, and non-transitory computer-readable medium described herein, transmitting the first encoded feedback codebook and the second encoded feedback codebook using the transmission resource may include operations, features, means, or instructions for transmitting the first encoded feedback codebook and the second encoded feedback codebook using the transmission resource that may be a shared data channel resource.

Some examples of the method, apparatuses, and non-transitory computer-readable medium described herein may further include operations, features, means, or instructions for receiving control signaling indicating a first parameter and a second parameter, where each of the first resource amount and the second resource amount may be determined based on the first parameter and the second parameter.

In some examples of the method, apparatuses, and non-transitory computer-readable medium described herein, the first parameter may be a beta factor and the second parameter may be an alpha factor.

In some examples of the method, apparatuses, and non-transitory computer-readable medium described herein, the control signaling may be radio resource control signaling.

Some examples of the method, apparatuses, and non-transitory computer-readable medium described herein may further include operations, features, means, or instructions for calculating an amount of resources to be utilized for transmission of the first feedback codebook and the second feedback codebook based on the first parameter, calculating an amount of available resources on the shared data channel resource based on the second parameter, determining the first resource amount based on the amount of available resources, determining an amount of remaining resources within the available resources based on the first resource amount, and determining the second resource amount based on the amount of remaining resources.

In some examples of the method, apparatuses, and non-transitory computer-readable medium described herein, the mapping further may include operations, features, means, or instructions for mapping the first encoded feedback codebook and the second encoded feedback codebook to a set of spatial layers, where the first encoded feedback codebook and the second encoded feedback codebook may be transmitted via the transmission resource using the set of spatial layers.

Some examples of the method, apparatuses, and non-transitory computer-readable medium described herein may further include operations, features, means, or instructions for modulating the first feedback codebook and the second feedback codebook using a same modulation order as applied to modulate data on the shared data channel resource.

In some examples of the method, apparatuses, and non-transitory computer-readable medium described herein, the mapping may include operations, features, means, or instructions for mapping at least a portion of the first encoded feedback codebook to an earliest symbol of the transmission resource that does not include a front-loaded demodulation reference signal symbol.

In some examples of the method, apparatuses, and non-transitory computer-readable medium described herein, the mapping may include operations, features, means, or instructions for rate matching the second encoded feedback codebook around resources within the transmission resource allocated to the first encoded feedback codebook.

In some examples of the method, apparatuses, and non-transitory computer-readable medium described herein, the mapping may include operations, features, means, or instructions for mapping the first encoded feedback codebook to a symbol of the transmission resource that occurs prior to a demodulation reference signal symbol in the transmission resource.

In some examples of the method, apparatuses, and non-transitory computer-readable medium described herein, the mapping may include operations, features, means, or instructions for rate matching the second encoded feedback codebook within the transmission resource around resources allocated to the first encoded feedback codebook.

In some examples of the method, apparatuses, and non-transitory computer-readable medium described herein, the mapping may include operations, features, means, or instructions for mapping bits of the first encoded feedback codebook to respective frequency hops based on an interleaving pattern.

In some examples of the method, apparatuses, and non-transitory computer-readable medium described herein, the mapping may include operations, features, means, or instructions for repeating a bit of the first encoded feedback codebook on respective frequency hops.

Some examples of the method, apparatuses, and non-transitory computer-readable medium described herein may further include operations, features, means, or instructions for determining a first size of the first feedback codebook, a second size of the second feedback codebook, or both, based on a grant that schedules the transmission resource in a shared data channel.

In some examples of the method, apparatuses, and non-transitory computer-readable medium described herein, the grant includes a downlink assignment indication.

In some examples of the method, apparatuses, and non-transitory computer-readable medium described herein, the grant indicates a service type.

In some examples of the method, apparatuses, and non-transitory computer-readable medium described herein, the grant includes at least one field that indicates one or more of the first size, or the second size, or a sum of the first size and the second size, or any combination thereof.

Some examples of the method, apparatuses, and non-transitory computer-readable medium described herein may further include operations, features, means, or instructions for mapping data to the transmission resource based on a first size of the first feedback codebook, a second size of the second feedback codebook, or both, where the transmission resource may be a shared data channel resource.

Some examples of the method, apparatuses, and non-transitory computer-readable medium described herein may further include operations, features, means, or instructions for puncturing the data mapped to the transmission resource with one or more bits of the first encoded feedback codebook, the second encoded feedback codebook, or both, based on a total of the first size and the second size satisfying a threshold.

Some examples of the method, apparatuses, and non-transitory computer-readable medium described herein may further include operations, features, means, or instructions for puncturing the data mapped to the transmission resource with one or more bits of the first encoded feedback codebook based on the first feedback size satisfying a threshold, and rate matching the data within the transmission resource around the mapping of the second encoded feedback codebook to the transmission resource based on a total of the first size and the second size not satisfying the threshold.

In some examples of the method, apparatuses, and non-transitory computer-readable medium described herein, mapping the data further may include operations, features, means, or instructions for rate matching the data within the transmission resource around the mapping of the first encoded feedback codebook and the second encoded feedback codebook to the transmission resource based on the first size not satisfying a threshold.

Some examples of the method, apparatuses, and non-transitory computer-readable medium described herein may further include operations, features, means, or instructions for rating matching the data within the transmission resource around the mapping of the first encoded feedback codebook and the second encoded feedback codebook based on a receiving grant of the transmission resource indicating the first size, the second size, or both.

Some examples of the method, apparatuses, and non-transitory computer-readable medium described herein may further include operations, features, means, or instructions for puncturing the data mapped to the transmission resource with one or more bits of the first encoded feedback codebook, the second encoded feedback codebook, or both, based on a receiving a grant of the transmission resource that does not indicate the first size or the second size.

Some examples of the method, apparatuses, and non-transitory computer-readable medium described herein may further include operations, features, means, or instructions for receiving a grant indicating to report channel state information on a shared data channel resource, encoding the channel state information using a third coding rate, where the transmission resource may be the shared data channel resource for the first service type, and mapping the encoded channel state information to the shared data channel resource.

Some examples of the method, apparatuses, and non-transitory computer-readable medium described herein may further include operations, features, means, or instructions for receiving a grant indicating to report channel state information on a shared data channel resource, and dropping reporting of the channel state information based on the transmission resource being the shared data channel resource for the second service type.

In some examples of the method, apparatuses, and non-transitory computer-readable medium described herein, the first service type may be a ultra-reliable low latency (URLLC) service type and the second service type may be an enhanced mobile broadband (eMBB) service type.

In some examples of the method, apparatuses, and non-transitory computer-readable medium described herein, the first coding rate may be different from the second coding rate.

Some examples of the method, apparatus, and non-transitory computer readable medium described herein, may further include operations, features, means, or instructions for determining a total transmission power for transmission of the first encoded feedback codebook and transmission of the second encoded feedback codebook, and reducing a power allocated for transmission of the second encoded feedback codebook based at least in part on determining that the total transmission power exceeds a transmission power capability of the UE.

Some examples of the method, apparatus, and non-transitory computer readable medium described herein, may further include operations, features, means, or instructions for determining to avoid transmission of the second encoded feedback codebook based at least in part on the power allocated for transmission of the second encoded feedback codebook being below a configured threshold.

Some examples of the method, apparatus, and non-transitory computer readable medium described herein, may further include operations, features, means, or instructions for receiving a first grant scheduling a first resource for transmission of the first feedback codebook, determining that the first resource overlaps in time with a second resource scheduled for a channel state information report, and mapping the channel state information report to the transmission resource based at least in part on determining that the channel state information report satisfies a block error rate target threshold or a channel quality information table threshold.

In examples of the method, apparatus, and non-transitory computer readable medium described herein, the transmission resource is a shared data channel resource, and wherein the channel state information report is an aperiodic channel state information report scheduled to be transmitted on the shared data channel resource.

In examples of the method, apparatus, and non-transitory computer readable medium described herein, the transmission resource is a shared data channel resource, and wherein the second resource is scheduled for the channel state information report based at least in part on a control channel resource scheduled for the channel state information report overlapping in time with the shared data channel resource or the first resource.

Some examples of the method, apparatus, and non-transitory computer readable medium described herein, may further include operations, features, means, or instructions for receiving a first grant scheduling a first resource for transmission of the first feedback codebook, determining that the first resource overlaps in time with a second resource scheduled for a channel state information report, and dropping reporting of the channel state information report based at least in part on determining that the channel state information report does not satisfy a block error rate target threshold or a channel quality information table threshold.

A method of wireless communications by a base station is described. The method may include transmitting a first transmission for a first service type and a second transmission for a second service type, the first service type having a lower latency specification and a higher reliability specification than the second service type, determining a first resource amount to be utilized for transmission of a first feedback codebook for the first service type and a second resource amount to be utilized for transmission of a second feedback codebook for the second service type based on a multiplexing condition being satisfied, receiving the first encoded feedback codebook and the second encoded feedback codebook via a transmission resource, demapping the first encoded feedback codebook and the second encoded feedback codebook based on the first resource amount and the second resource amount, and decoding the first encoded feedback codebook using a first coding rate to generate a first feedback codebook and the second encoded feedback codebook using a second coding rate that differs from the first coding rate to generate a second feedback codebook.

An apparatus for wireless communications by a base station is described. The apparatus may include a processor, memory in electronic communication with the processor, and instructions stored in the memory. The instructions may be executable by the processor to cause the apparatus to transmit a first transmission for a first service type and a second transmission for a second service type, the first service type having a lower latency specification and a higher reliability specification than the second service type, determine a first resource amount to be utilized for transmission of a first feedback codebook for the first service type and a second resource amount to be utilized for transmission of a second feedback codebook for the second service type based on a multiplexing condition being satisfied, receive the first encoded feedback codebook and the second encoded feedback codebook via a transmission resource, demap the first encoded feedback codebook and the second encoded feedback codebook based on the first resource amount and the second resource amount, and decode the first encoded feedback codebook using a first coding rate to generate a first feedback codebook and the second encoded feedback codebook using a second coding rate that differs from the first coding rate to generate a second feedback codebook.

Another apparatus for wireless communications by a base station is described. The apparatus may include means for transmitting a first transmission for a first service type and a second transmission for a second service type, the first service type having a lower latency specification and a higher reliability specification than the second service type, determining a first resource amount to be utilized for transmission of a first feedback codebook for the first service type and a second resource amount to be utilized for transmission of a second feedback codebook for the second service type based on a multiplexing condition being satisfied, receiving the first encoded feedback codebook and the second encoded feedback codebook via a transmission resource, demapping the first encoded feedback codebook and the second encoded feedback codebook based on the first resource amount and the second resource amount, and decoding the first encoded feedback codebook using a first coding rate to generate a first feedback codebook and the second encoded feedback codebook using a second coding rate that differs from the first coding rate to generate a second feedback codebook.

A non-transitory computer-readable medium storing code for wireless communications by a base station is described. The code may include instructions executable by a processor to transmit a first transmission for a first service type and a second transmission for a second service type, the first service type having a lower latency specification and a higher reliability specification than the second service type, determine a first resource amount to be utilized for transmission of a first feedback codebook for the first service type and a second resource amount to be utilized for transmission of a second feedback codebook for the second service type based on a multiplexing condition being satisfied, receive the first encoded feedback codebook and the second encoded feedback codebook via a transmission resource, demap the first encoded feedback codebook and the second encoded feedback codebook based on the first resource amount and the second resource amount, and decode the first encoded feedback codebook using a first coding rate to generate a first feedback codebook and the second encoded feedback codebook using a second coding rate that differs from the first coding rate to generate a second feedback codebook.

In some examples of the method, apparatuses, and non-transitory computer-readable medium described herein, determining the first resource amount and the second resource amount may include operations, features, means, or instructions for determining the first resource amount based on a size of the first feedback codebook, and determining the second resource amount based on a size of the second feedback codebook.

In some examples of the method, apparatuses, and non-transitory computer-readable medium described herein, determining the first resource amount and the second resource amount may include operations, features, means, or instructions for determining the first resource amount and the second resource amount based on a control channel format of the transmission resource.

Some examples of the method, apparatuses, and non-transitory computer-readable medium described herein may further include operations, features, means, or instructions for transmitting a grant scheduling a first resource for transmission of the first feedback codebook, and determining the first coding rate that corresponds to the first resource.

Some examples of the method, apparatuses, and non-transitory computer-readable medium described herein may further include operations, features, means, or instructions for transmitting a grant scheduling a second resource for transmission of the second feedback codebook, and determining the second coding rate that corresponds to the second resource.

Some examples of the method, apparatuses, and non-transitory computer-readable medium described herein may further include operations, features, means, or instructions for transmitting control signaling indicating a ratio between the first coding rate and the second coding rate, and determining the second coding rate based on the ratio and the first coding rate.

Some examples of the method, apparatuses, and non-transitory computer-readable medium described herein may further include operations, features, means, or instructions for adjusting the second coding rate based on determining that a sum of the first resource amount and the second resource amount exceeds an available amount of resources for the transmission resource.

Some examples of the method, apparatuses, and non-transitory computer-readable medium described herein may further include operations, features, means, or instructions for adjusting a size of a payload for the second feedback codebook to partially drop a portion of the second feedback codebook based on determining that a sum of the first resource amount and the second resource amount exceeds an available amount of resources for the transmission resource.

In some examples of the method, apparatuses, and non-transitory computer-readable medium described herein, determining the first resource amount may include operations, features, means, or instructions for determining the first resource amount as a number of resource blocks based on the first coding rate, a size of the first feedback codebook, and a number of symbols in the transmission resource.

In some examples of the method, apparatuses, and non-transitory computer-readable medium described herein, determining the second resource amount may include operations, features, means, or instructions for determining the second resource amount as a number of resource blocks based on the second coding rate, a size of the second feedback codebook, and a number of symbols in the transmission resource.

Some examples of the method, apparatuses, and non-transitory computer-readable medium described herein may further include operations, features, means, or instructions for transmitting control signaling that indicates a power ratio for transmission of the first encoded feedback codebook relative to a second transmission power for transmission of the second encoded feedback codebook.

In some examples of the method, apparatuses, and non-transitory computer-readable medium described herein, demapping the first encoded feedback codebook and the second encoded feedback codebook may include operations, features, means, or instructions for demapping the first encoded feedback codebook to first resource elements of the transmission resource based on proximity of the first resource elements to at least one demodulation reference signal symbol within the transmission resource, and demapping the second encoded feedback codebook to second resource elements remaining within the transmission resource after demapping of the first encoded feedback codebook to the first resource elements.

In some examples of the method, apparatuses, and non-transitory computer-readable medium described herein, determining the first resource amount may include operations, features, means, or instructions for setting the first resource amount as a first number of resource elements to be utilized for transmission of the first feedback codebook.

In some examples of the method, apparatuses, and non-transitory computer-readable medium described herein, determining the second resource amount may include operations, features, means, or instructions for determining a second number of resource elements to be utilized for transmission of the second feedback codebook, where the second resource amount may be the second number of resource elements based on a sum of the first number and the second number not exceeding a total number of resource elements in the transmission resource.

In some examples of the method, apparatuses, and non-transitory computer-readable medium described herein, determining the second resource amount may include operations, features, means, or instructions for determining a second number of resource elements to be utilized for transmission of the second feedback codebook, and setting the second resource amount as a third number of remaining resource elements in the transmission resource based on a sum of the first number and the second number exceeding a total number of resource elements in the transmission resource.

Some examples of the method, apparatuses, and non-transitory computer-readable medium described herein may further include operations, features, means, or instructions for transmitting a first grant scheduling a first resource for transmission of the first feedback codebook, and transmitting a second grant scheduling a second resource for transmission of the second feedback codebook, where the first resource collides in time with the second resource to satisfy the multiplexing condition.

Some examples of the method, apparatuses, and non-transitory computer-readable medium described herein may further include operations, features, means, or instructions for transmitting a grant that schedules a transmission of the first service type and a control channel resource for transmission of the first feedback codebook.

Some examples of the method, apparatuses, and non-transitory computer-readable medium described herein may further include operations, features, means, or instructions for transmitting a grant that schedules a transmission of the second service type and a control channel resource for transmission of the second feedback codebook.

Some examples of the method, apparatuses, and non-transitory computer-readable medium described herein may further include operations, features, means, or instructions for transmitting a first grant scheduling a first resource for transmission of the first feedback codebook and a second grant scheduling a second resource for transmission of the second feedback codebook, and determining that the multiplexing condition may be satisfied based on the first resource at least partially overlapping with the second resource.

In some examples of the method, apparatuses, and non-transitory computer-readable medium described herein, the transmission resource may be the first resource.

In some examples of the method, apparatuses, and non-transitory computer-readable medium described herein, determining that the multiplexing condition may be satisfied may include operations, features, means, or instructions for transmitting a third grant scheduling a data resource for transmission of uplink data on a shared data channel, and determining that the multiplexing condition may be satisfied based on at least one of the first resource and the second resource at least partially overlapping with the data resource, where the transmission resource may be the data resource.

In some examples of the method, apparatuses, and non-transitory computer-readable medium described herein, the decoding may include operations, features, means, or instructions for applying a first cyclic shift of a set of different cyclic shifts to a bit sequence to generate a shifted bit sequence to decode at least one bit of the first feedback codebook, at least one bit of the second feedback codebook, or both.

Some examples of the method, apparatuses, and non-transitory computer-readable medium described herein may further include operations, features, means, or instructions for adjusting from a first modulation scheme to a second modulation scheme based on a size of the first feedback codebook being a single bit, and demodulating a bit of the first encoded feedback codebook and a bit of the second encoded feedback codebook based on the second modulation scheme.

In some examples of the method, apparatuses, and non-transitory computer-readable medium described herein, the first modulation scheme may be binary phase shift keying modulation scheme and the second modulation scheme may be quadrature phase shift keying modulation scheme.

In some examples of the method, apparatuses, and non-transitory computer-readable medium described herein, receiving the first encoded feedback codebook and the second encoded feedback codebook using the transmission resource may include operations, features, means, or instructions for receiving the first encoded feedback codebook and the second encoded feedback codebook using the transmission resource that may be a shared data channel resource.

Some examples of the method, apparatuses, and non-transitory computer-readable medium described herein may further include operations, features, means, or instructions for transmitting control signaling indicating a first parameter and a second parameter, where each of the first resource amount and the second resource amount may be determined based on the first parameter and the second parameter.

In some examples of the method, apparatuses, and non-transitory computer-readable medium described herein, the first parameter may be a beta factor and the second parameter may be an alpha factor.

In some examples of the method, apparatuses, and non-transitory computer-readable medium described herein, the control signaling may be radio resource control signaling.

Some examples of the method, apparatuses, and non-transitory computer-readable medium described herein may further include operations, features, means, or instructions for calculating an amount of resources to be utilized for transmission of the first feedback codebook and the second feedback codebook based on the first parameter, calculating an amount of available resources on the shared data channel resource based on the second parameter, determining the first resource amount based on the amount of available resources, determining an amount of remaining resources within the available resources based on the first resource amount, and determining the second resource amount based on the amount of remaining resources.

In some examples of the method, apparatuses, and non-transitory computer-readable medium described herein, the demapping further may include operations, features, means, or instructions for demapping the first encoded feedback codebook and the second encoded feedback codebook from a set of spatial layers, where the first encoded feedback codebook and the second encoded feedback codebook may be received via the transmission resource using the set of spatial layers.

Some examples of the method, apparatuses, and non-transitory computer-readable medium described herein may further include operations, features, means, or instructions for demodulating the first feedback codebook and the second feedback codebook using a same modulation order as applied to modulate data on the shared data channel resource.

In some examples of the method, apparatuses, and non-transitory computer-readable medium described herein, the demapping may include operations, features, means, or instructions for demapping at least a portion of the first encoded feedback codebook from an earliest symbol of the transmission resource that does not include a front-loaded demodulation reference signal symbol.

In some examples of the method, apparatuses, and non-transitory computer-readable medium described herein, the demapping may include operations, features, means, or instructions for de-rate matching the second encoded feedback codebook around resources within the transmission resource allocated to the first encoded feedback codebook.

In some examples of the method, apparatuses, and non-transitory computer-readable medium described herein, the demapping may include operations, features, means, or instructions for demapping the first encoded feedback codebook from a symbol of the transmission resource that occurs prior to a demodulation reference signal symbol in the transmission resource.

In some examples of the method, apparatuses, and non-transitory computer-readable medium described herein, the demapping may include operations, features, means, or instructions for de-rate matching the second encoded feedback codebook within the transmission resource around resources allocated to the first encoded feedback codebook.

In some examples of the method, apparatuses, and non-transitory computer-readable medium described herein, the demapping may include operations, features, means, or instructions for demapping bits of the first encoded feedback codebook from respective frequency hops based on an interleaving pattern.

In some examples of the method, apparatuses, and non-transitory computer-readable medium described herein, the demapping may include operations, features, means, or instructions for demapping a bit of the first encoded feedback codebook repeated on respective frequency hops.

Some examples of the method, apparatuses, and non-transitory computer-readable medium described herein may further include operations, features, means, or instructions for transmitting a grant that schedules the transmission resource in a shared data channel and indicates a first size of the first feedback codebook, a second size of the second feedback codebook, or both.

In some examples of the method, apparatuses, and non-transitory computer-readable medium described herein, the grant includes a downlink assignment indication.

In some examples of the method, apparatuses, and non-transitory computer-readable medium described herein, the grant indicates a service type.

In some examples of the method, apparatuses, and non-transitory computer-readable medium described herein, the grant includes at least one field that indicates one or more of the first size, or the second size, or a sum of the first size and the second size, or any combination thereof.

Some examples of the method, apparatuses, and non-transitory computer-readable medium described herein may further include operations, features, means, or instructions for demapping data to the transmission resource based on a first size of the first feedback codebook, a second size of the second feedback codebook, or both, where the transmission resource may be a shared data channel resource.

Some examples of the method, apparatuses, and non-transitory computer-readable medium described herein may further include operations, features, means, or instructions for determining that the data mapped to the transmission resource may be punctured with one or more bits of the first encoded feedback codebook, the second encoded feedback codebook, or both, based on a total of the first size and the second size satisfying a threshold.

Some examples of the method, apparatuses, and non-transitory computer-readable medium described herein may further include operations, features, means, or instructions for determining the data mapped to the transmission resource may be punctured with one or more bits of the first encoded feedback codebook based on the first feedback size satisfying a threshold, and de-rate matching the data within the transmission resource around a mapping of the second encoded feedback codebook to the transmission resource based on a total of the first size and the second size not satisfying the threshold.

In some examples of the method, apparatuses, and non-transitory computer-readable medium described herein, demapping the data further may include operations, features, means, or instructions for de-rate matching the data within the transmission resource around a mapping of the first encoded feedback codebook and the second encoded feedback codebook to the transmission resource based on the first size not satisfying a threshold.

Some examples of the method, apparatuses, and non-transitory computer-readable medium described herein may further include operations, features, means, or instructions for de-rating matching the data within the transmission resource around a mapping of the first encoded feedback codebook and the second encoded feedback codebook to the transmission resource based on a transmitting a grant of the transmission resource indicating the first size, the second size, or both.

Some examples of the method, apparatuses, and non-transitory computer-readable medium described herein may further include operations, features, means, or instructions for determining that the data mapped to the transmission resource may be punctured with one or more bits of the first encoded feedback codebook, the second encoded feedback codebook, or both, based on a receiving a grant of the transmission resource that does not indicate the first size or the second size.

Some examples of the method, apparatuses, and non-transitory computer-readable medium described herein may further include operations, features, means, or instructions for transmitting a grant indicating to report channel state information on a shared data channel resource, demapping encoded channel state information from the shared data channel resource, where the transmission resource may be a shared data channel resource for the first service type, and decoding the encoded channel state information using a third coding rate.

Some examples of the method, apparatuses, and non-transitory computer-readable medium described herein may further include operations, features, means, or instructions for transmitting a grant indicating to report channel state information on a shared data channel resource, and determining that reporting of the channel state information may have been dropped based on the transmission resource being the shared data channel resource for the second service type.

In some examples of the method, apparatuses, and non-transitory computer-readable medium described herein, the first service type may be a ultra-reliable low latency (URLLC) service type and the second service type may be an enhanced mobile broadband (eMBB) service type.

In some examples of the method, apparatuses, and non-transitory computer-readable medium described herein, the first coding rate may be different from the second coding rate.

DETAILED DESCRIPTION

Figure 1:
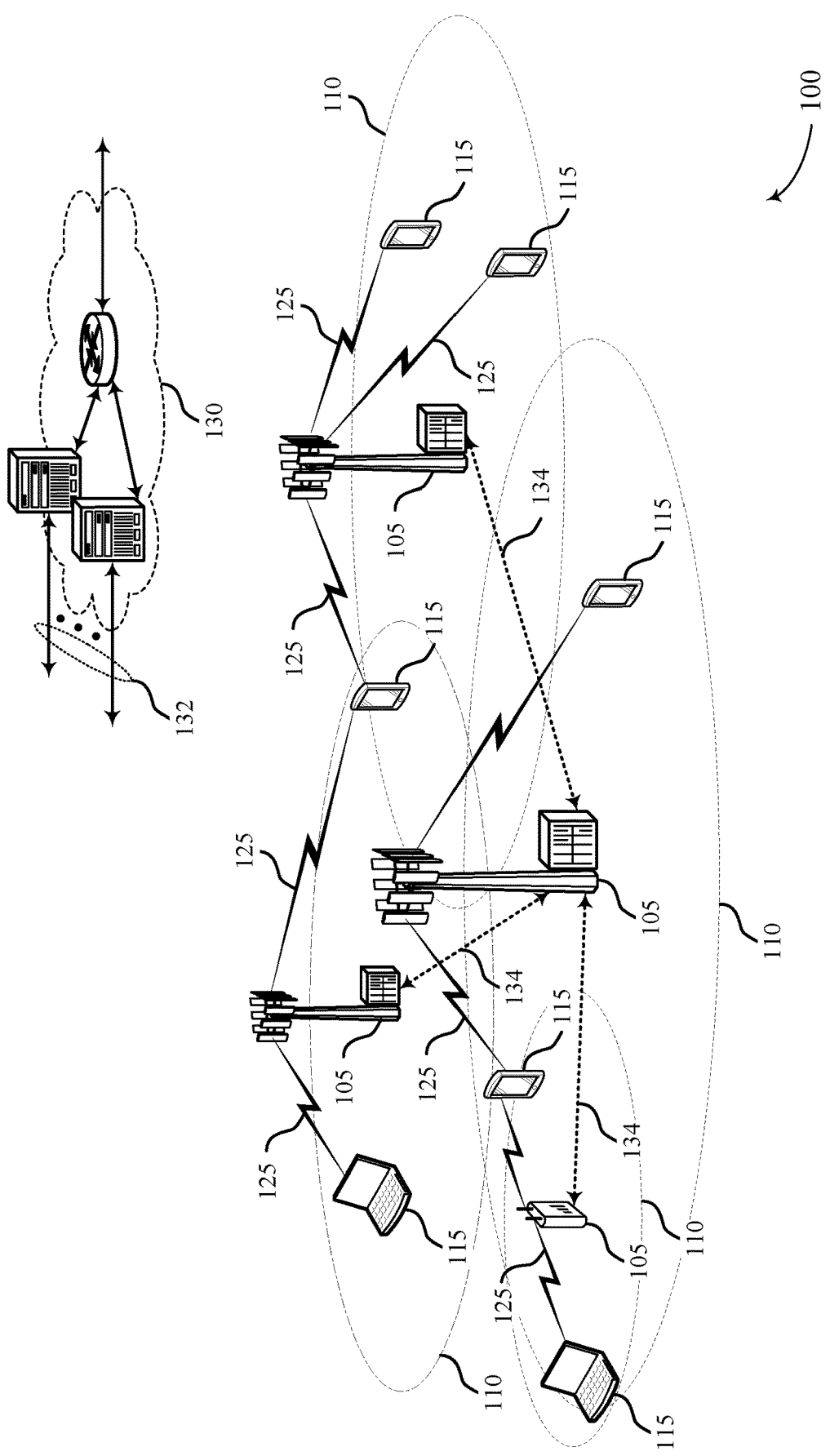
FIG. 1 illustrates an example of a system for wireless communications in accordance with aspects of the present disclosure.

A base station may wirelessly communicate with a user equipment (UE). For instance, the base station may transmit a transport block (TB) to the UE over a downlink shared channel (e.g., a physical downlink shared channel (PDSCH)). The UE may receive and attempt to decode the TB. If the UE successfully decodes the TB, the UE may transmit an acknowledgement (ACK) to the base station. Elsewise, the UE may transmit a non-acknowledgement (NACK). In some cases, the UE may transmit multiple ACKs and/or NACKs together in a feedback codebook for multiple received TBs. The UE may transmit the feedback codebook in an uplink control channel (e.g., a physical uplink control channel (PUCCH)) or an uplink shared channel (e.g., a physical uplink shared channel (PUSCH)).

In some cases, the UE may receive downlink shared channel transmissions of different service types and/or priorities and may transmit a feedback codebook for each service type in corresponding resources. For instance, the UE may receive one or more ultra-reliable low-latency communication (URLLC) downlink shared channel transmissions and may transmit a URLLC feedback codebook in a URLLC PUCCH resource. Additionally or alternatively, the UE may receive one or more enhanced mobile broadband (eMBB) downlink shared channel transmissions and may transmit an eMBB feedback codebook.

In some cases, a resource for transmitting (e.g., reporting) a feedback codebook associated with one or more downlink shared channel transmissions of a first service type and/or priority may collide in time with resources for transmitting (e.g., reporting) a feedback codebook associated with downlink shared channel transmissions of a second service type and/or priority. For instance, a PUCCH resource for reporting an eMBB feedback codebook may at least partially overlap in time resources with a PUCCH resource for reporting a URLLC codebook. In such cases, the UE may always drop feedback codebook associated with a lower priority service type (e.g., eMBB may have a lower priority service type than URLLC). However, always dropping the feedback codebook associated with the lower priority service type may degrade the performance associated with communicating according to the lower priority service type.

To mitigate such performance degradation, the UE may multiplex the feedback codebooks associated with the colliding reporting resources and may generate a multiplexed feedback codebook. The multiplexed feedback codebook may be transmitted on one of the colliding reporting resources (e.g., the higher priority reporting resource). In some cases, the UE may multiplex the feedback codebooks associated with the colliding resources if a feedback multiplexing condition is satisfied. For instance, the UE may multiplex two feedback codebooks if their corresponding reporting resources collide.

The UE may, additionally or alternatively, multiplex two feedback codebooks if the reporting resources associated with each codebook overlap at least partially in time with an uplink shared channel resource (e.g., a PUSCH resource). The multiplexed feedback codebook may be transmitted in the uplink shared channel resource. In some cases, the UE may multiplex the two feedback codebooks and transmit them in the uplink shared channel resource if the reporting resources collide in time with the uplink shared channel resource.

When the UE transmits the multiplexed feedback codebook, the base station may receive and decode the multiplexed feedback codebook. In some cases, the UE may reserve a number of bits for bits of a feedback codebook of one of the service types (e.g., for bits of the eMBB codebook) based on a total size of the multiplexed feedback codebook and a size of a feedback codebook of the other service type (e.g., for a URLLC codebook).

Particular aspects of the subject matter described herein may be implemented to realize one or more advantages. The described techniques may support improvements in the ACK/NACK feedback framework, decreasing signaling overhead, and improving reliability, among other advantages. Aspects of the disclosure are initially described in the context of a wireless communications system. Additional aspects of the disclosure are further described with reference to an additional wireless communications system, resource allocations, mapping schemes, transmission schemes, and a process flow. Aspects of the disclosure are further illustrated by and described with reference to apparatus diagrams, system diagrams, and flowcharts that relate to multiplexing codebooks generated for transmissions having different protocol types.

FIG. 1 illustrates an example of a wireless communications system 100 in accordance with aspects of the present disclosure. The wireless communications system 100 includes base stations 105, UEs 115, and a core network 130.

In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may construct two HARQ-ACK codebooks simultaneously and may use the HARQ-ACK codebooks for different services (e.g., one for eMBB services and one for URLLC services). For example, the UE 115 may transmit an eMBB HARQ-ACK codebook after receiving one or more eMBB downlink grants and may transmit a URLLC HARQ-ACK codebook after receiving one or more URLLC downlink grants. In some cases, the reporting of two HARQ-ACK codebooks may collide in time (e.g., an eMBB HARQ-ACK codebook and a URLLC HARQ-ACK codebook may have overlapping time resources). In such cases, a UE 115 may encode both HARQ codebooks and transmit them in one or more PUCCH or PUSCH resources. Alternatively or additionally, the UE 115 may refrain from transmitting or may drop the eMBB HARQ-ACK codebook.

The described techniques relate to improved methods, systems, devices, and apparatuses that support encoding and mapping for multiplexed feedback codebooks. Generally, the described techniques provide for a UE 115 to identify a resource amounts to be utilized for transmitting feedback codebooks for different service types (e.g., eMBB and URLLC). The UE 115 may separately encode a first feedback codebook for the first service type and using a first encoding rate to generate a first encoded feedback codebook and the second feedback codebook for the second service type and using a second encoding rate to generate a second encoded feedback codebook. The encoding may be based at least in part on the determined resource amounts for transmission of the codebooks. The UE 115 may map the encoded feedback codebooks to a transmission resource (e.g., PUCCH or PUSCH) and transmit the encoded feedback codebooks on the transmission resource based at least in part on the mapping. In some cases, when the total number of available resources are limited, the UE 115 may transmit the codebook for URLLC HARQ-ACK using a share of resources, while using the remaining resources for transmitting eMBB HARQ-ACK. In some cases, the eMBB HARQ-ACK may be completely or partially dropped.

The UE 115 may determine that a feedback multiplexing condition is satisfied based on identifying a collision between a first resource allocated for transmitting the first feedback codebook at least partially overlapping a second resource allocated for transmitting the second codebook. In some cases, the UE 115 may identify a collision in due to at least a partial overlap between the first resource and the second resource, and a third resource on a shared data channel in which the UE is scheduled to send a data transmission. If the condition is satisfied, the UE 115 may separately encode the URLLC feedback codebook and the eMBB feedback codebook and map the encoded codebooks to a transmission resource (e.g., PUCCH or PUSCH). In an example, the transmission resource may be a URLLC PUCCH configured for the UE to transmit a URLLC feedback codebook, a eMBB PUCCH configured for the UE to transmit an eMBB feedback codebook, or a PUSCH resource allocated for the UE to transmit a data transmission.

Figure 2:
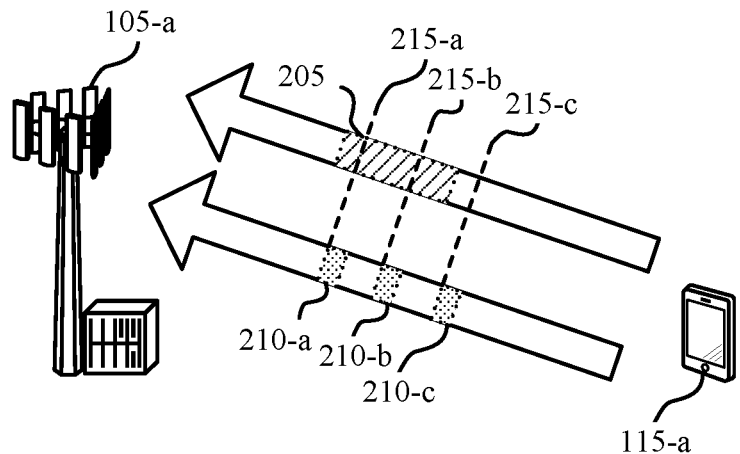
FIG. 2 illustrates an example of a wireless communications system in accordance with aspects of the present disclosure.
Figure 2:
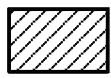
Figure 2:
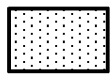

FIG. 2 illustrates an example of a wireless communications system 200 in accordance with aspects of the present disclosure. In some examples, wireless communications system 200 may implement aspects of wireless communication system 100. For instance, wireless communications system 200 may include a UE 115-a and a base station 105-a, which may be an example of a UE 115 and a base station 105 as described with reference to FIG. 1.

UE 115-a may wirelessly communicate with base station 105-a. For instance, base station 105-a may transmit one or more TBs to UE 115-a over a PDSCH associated with a service type (e.g., URLLC or eMBB). UE 115-a may receive and attempt to decode the one or more TBs and may transmit corresponding ACKs and/or NACKs together in a feedback codebook for that service type, such as a HARQ-ACK codebook. In some cases, a PUCCH resource for reporting an eMBB feedback codebook may at least partially overlap in or collide in time with a PUCCH resource for reporting a URLLC feedback codebook. In such cases (e.g., satisfaction of a multiplexing condition), UE 115-b may determine resource amounts for transmitting the URLLC feedback codebook and the eMBB feedback codebook and encode, map, and transmit the codebooks in a multiplexed manner based on the determining.

For instance, UE 115-a may schedule an eMBB PUCCH resource 205 and URLLC PUCCH resources 210-a, 210-b, and 210-c. URLLC PUCCH resources 210-a and 210-b may overlap at least partially in time with eMBB PUCCH resource 205 (e.g., at 215-a and 215-b, respectively). The scheduling may be based on an downlink grant by base station 105-a, for example. URLLC PUCCH resource 210-c may not, however, overlap at least partially in time with eMBB PUCCH resource 205. As such, a feedback codebooks scheduled on the overlapping resources may mapped to and transmitted via URLLC PUCCH resources based on a mapping of the encoded codebooks. In some cases, the URLLC feedback codebook resource may be selected based on the payload size of the URLLC codebook, but not the eMBB feedback codebook size. Accordingly, the selected resource may have sufficient amount of resources for the URLLC HARQ-ACK. In some cases, if the multiplexed codebooks scheduled for transmission on a PUCCH resource collides with (e.g., at least partially overlaps in time) a data transmission (e.g., on a PUSCH resource), then the multiplexed codebooks may be transmitted on the PUSCH resources.

In some case, the UE 115 may schedule the feedback codebook for the high reliability service (e.g., URLLC) on transmission resources and use any remaining resources for the codebook for the lower reliability service (e.g., eMBB). In some example cases, this may result in the UE 115 dropping (e.g., not transmitting or sending at a later time) or partially dropping the codebook for the less reliable service. In some cases, the UE 115 may map the codebook for the high reliability service (e.g., the first codebook) on resources closer to the demodulation reference signal (DMRS) for high reliability transmission and match the codebook for the lower reliability service (e.g., the second codebook) to the resources around the resources mapped for the first codebook.

In some cases, the PUCCH resources for the URLLC HARQ-ACK may collide with a PUCCH transmission carrying a CSI report. In such cases, the UE 115 may determine whether the CSI report corresponds to a low block error rate (BLER) target ($10^{-5}$) or corresponds to a low BLER cell quality indicator (CQI) table. If the CSI report corresponds to the low BLER target ($10^{-5}$) or to the low BLER CQI table (e.g., a multiplexing condition is satisfied), then the UE 115 may also multiplex the CSI feedback with the eMBB HARQ-ACK and URLLC HARQ-ACK. In such cases, the HARQ-ACKS may be separately encoded and resources allocated and mapped as describe herein. For example, the UE 115 may first map the URLLC HARQ-ACK to the PUCCH resource (after determining the amount of resources), then UE may try to accommodate the eMBB HARQ-ACK in the remaining URLLC PUCCH resources. Finally, if there are still some resources left, the UE 115 may map the CSI feedback to the remaining resources. If the CSI report does not correspond to the low BLER target ($10^{-5}$) or the low BLER CQI table, then UE may drop the CSI report.

As described herein, the UE 115 may use various techniques to determine codebook sizes and resource allocation. In some cases, the techniques depend on the PUCCH format type, which may be indicated via RRC from a base station 105. Further, the UE 115 may use various mapping schemes to map codebooks to PUCCH resources. In the case where PUCCH resources overlap with a PUSCH data transmission (e.g., satisfaction of a multiplexing condition), then the UE 115 may implement various techniques to allocate PUSCH resources for codebook mapping and transmission. Further, the UE 115 may use various techniques to map data information (e.g., UL-SCH) on the remaining resources after mapping of the feedback codebook to the PUSCH resources.

Figure 3:
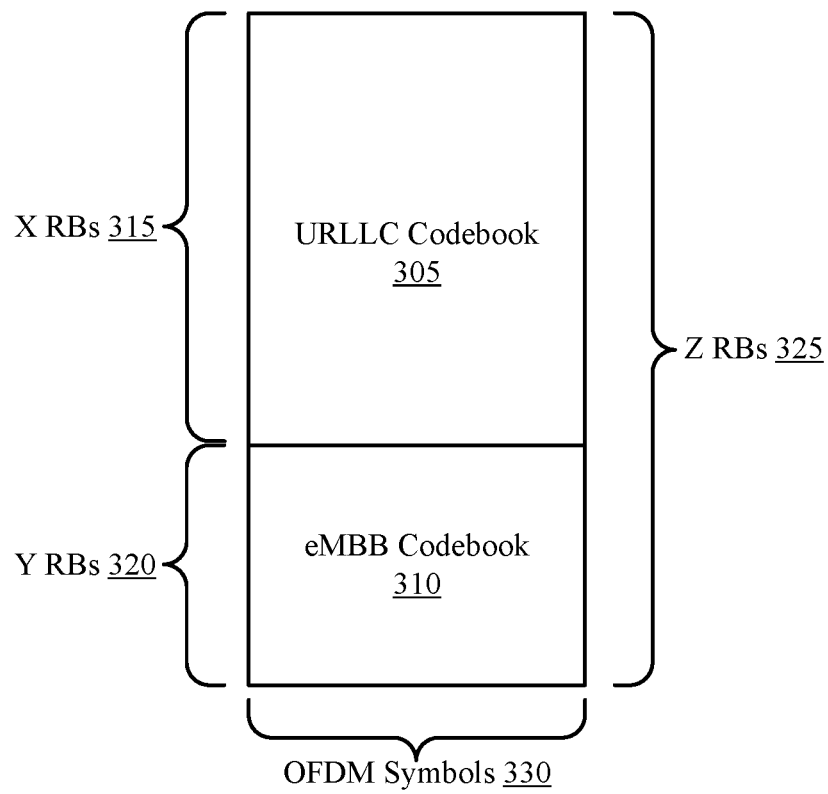
FIG. 3 illustrates an example of a resource allocation in accordance with aspects of the present disclosure.

FIG. 3 illustrates an example of a resource allocation 300 in accordance with aspects of the present disclosure. In some examples, resource allocation 300 may implement aspects of wireless communication system 100. The resource allocation 300 may be implemented by various aspects of wireless communications system 100. For example, wireless communications a UE 115 of FIG. 1 may implement resource allocation 300. The resource allocation 300 indicates resource amounts for a first feedback codebook (e.g., a URLLC feedback codebook 305) and a second feedback codebook (e.g., an eMBB feedback codebook 310). For example, the URLLC feedback codebook 305 may utilize X resource blocks (RBs) 315, and the eMBB feedback codebook 310 may utilize Y RBs 320. The RBs may be distributed across one or more OFDM symbols 330. A UE 115 may determine the resource allocation 300 responsive to satisfaction of a multiplexing condition. In some cases, the multiplexing condition is based at least in part on scheduled resources for transmitting the feedback codebooks at least partially overlapping in time. For example, the scheduled resource on a PUCCH for transmission of the eMBB feedback codebook 310 may overlap with the scheduled resource on a PUCCH for transmission the URLLC feedback codebook 305, which may cause satisfaction of the multiplexing condition. The feedback codebooks 305 and 310 may include ACKs and/or NACKs associated with downlink shared transmissions received from a base station 105.

In the scenario where eMBB PUCCH and URLLC PUCCH collide in time, where both channels are scheduled to carry HARQ-ACKS (e.g., codebooks), the UE 115 may determine to multiplex the eMBB HARQ-ACK and the URLLC HARQ-ACK on the PUCCH resource for URLLC. In some cases, the UE 115 may determine whether the number of multiplexed UCI (uplink control information) bits exceed the maximum number of bits (RRC configured per resource set) supported on the scheduled resource, and if so, then UE may select a new PUCCH resource in a new PUCCH resource set that can accommodate more UCI bits. In other cases, the UE 115 may determine to transmit the multiplexed HARQ-ACKs on the resource scheduled for the URLLC HARQ-ACK assuming that the scheduled resource includes enough resources for at least the URLLC HARQ-ACK. In other words, the UE 115 determines the URLLC PUCCH resources based on the URLLC HARQ-ACK payload size (e.g., resource amount or X RBs 315). As such, the UE 115 prioritizes allocation of the number of resources available for transmission of the URLLC HARQ-ACKs (e.g., the first feedback codebook) and may transmit eMBB HARQ-ACKs (e.g., the second feedback codebook) with a best effort (e.g., utilizing any remaining resources).

To multiplex the separate HARQ-ACKs (e.g., the feedback codebooks 305 and 310), the UE 115 may separately encode the URLLC and the eMBB HARQ-ACKs using different coding rates. In some cases, the coding rate for the URLLC is determined from the URLLC PUCCH resource. The coding rate for the eMBB may be determined from one of the coding rate associated with the scheduled eMBB PUCCH resource (e.g., the scheduled resource may have an associated encoding rate) or an RRC configured parameter γ, which indicates the ratio of rate between an eMBB coding rate and an URLLC coding rate (i.e., $R_{emBB} = \gamma \cdot R_{URLLC}$). Thus, the UE 115 determines the URLLC coding rate, then uses the URLLC coding rate and the γ parameter to derive the eMBB coding rate. The γ parameter may be configured via RRC such that the UE 115 may determine coding rates in collision cases (e.g., when a multiplexing condition is satisfied).

The UE 115 may identify the amount of resources for transmission of the feedback codebooks 305 and 310 based at least in part on the PUCCH format, which may be a PUCCH format 0, 1, 2, 3, or 4. Each format may have different coding rates, modulation schemes, and waveforms, and the formats may be indicated by a base station 105. In cases when the format is 0, 1, or 4, the number of frequency and time domain resources may be indicated through RRC. In PUCCH formats 2 or 3, the base station 105 indicates or configures a value (e.g., maximum) for PUCCH resources that may be utilized by the UE 115. If the scheduled PUCCH format for URLLC HARQ-ACK is format 2 or 3, then the UE 115 determines the amount of resources for URLLC HARQ-ACK based on the URLLC coding rate and the payload size of the URLLC feedback codebook (e.g., the UE 115 determines the value of X RBs 315). The UE 115 may then determine the amount of resources for the eMBB feedback codebook (e.g., Y RBs 320) based on the coding rate (e.g., determined based on eMBB PUCCH resource or the RRC configured parameter γ) and payload size of the eMBB HARQ-ACK.

If a total amount of determined resources (e.g., value of Z RBs 325) for both the URLLC HARQ-ACK and eMBB HARQ-ACK exceeds the configured value (e.g., the maximum) for the PUCCH format, then the UE 115 may: 1) encode the eMBB HARQ-ACK with a higher coding rate to accommodate the eMBB information bits on the remaining available resources, and if the resulting coding rate is above a identified threshold (e.g., 0.95), then the UE 115 may drop the eMBB HARQ-ACK; 2) drop the eMBB transmission; or 3) partially drop the eMBB transmission until a number of remaining eMBB information bits of the eMBB feedback codebook can be conveyable in the remaining PUCCH resources using the eMBB coding rate. Thus, when option 1 is performed (e.g., using a higher coding rate), the higher coding rate may be selected such that the eMBB information bits (e.g., all of the bits) are encoded in the remaining resources (e.g., determine coding rate by dividing the payload size by the number of remaining resources). The resulting encoding rate may be compared to the threshold to determine whether to include the eMBB transmission in the remaining resources. If the resultant encoding rate is above the threshold, then the UE 115 may determine to drop the eMBB (e.g., because the base station 105 may not be able to decode the eMBB with relatively high encoding rate). If the total amount of determined resources (value of Z RBs 325)

is less than the configured limit, then the UE 115 may transmit both the eMBB and URLLC transmissions using the determined amount of PUCCH resources. To transmit on the URLLC PUCCH using format 2 (e.g., cyclic prefix (CP)-OFDM waveform), the UE 115 may determine the number of RBs for the URLLC feedback codebook and the eMBB feedback codebook separately (e.g., determines X RBs 315 and Y RBs 320 separately). The UE 115 may identify the number of OFDM symbols 330 (e.g., number of available resources in a time domain) based on a configuration, and the UE 115 uses the number of OFDM symbols 330 for both the URLLC resource amount determination and the eMBB resource amount determination. The UE 115 determines the number of RBs for the URLLC feedback codebook (e.g., X RBs 315) based on the configured URLLC coding rate, the URLLC HARQ-ACK payload size, and the number of OFDM symbols $$\left(e.g., XRBs\ 315 = \text{ceil}\left(\frac{K_{URLLC}}{R_{URLLC} * N_{OFDM} * 12}\right)\right),$$

where $R_{URLLC}$ is the coding rate for the URLLC HARQ-ACK, $Q_m$ is the modulation order, $N_{OFDM}$ the number of OFDM symbols (e.g., OFDM symbols 330) on the scheduled URLLC PUCCH resource, and K is the payload size (e.g., the size of the URLLC feedback codebook)). Furthermore, 12 is the number of resource elements contained in an RB.

The manner in which the UE 115 determines the amount of RBs for URLLC HARQ-ACK may be independent of whether eMBB HARQ-ACK is multiplexed with the URLLC HARQ-ACK or not. In other words, the UE 115 may use the same resources (and the same coding/modulation and RE mapping) regardless of whether the URLLC codebook is multiplexed with the eMBB feedback codebook or not. As such, the multiplexing of eMBB codebook may have no impact on the URLLC transmission.

The UE 115 determines the number of RBs for the eMBB feedback codebook (e.g., Y RBs 320) based on the determined eMBB coding rate R, the eMBB feedback codebook payload size K, and the number of OFDM symbols NOFDM such that $$YRBs\ 320 = \min\left(\text{ceil}\left(\frac{K_{eMBB}}{R_{eMBB} * Q_m * N_{OFDM} * 12}\right), Z - X\right),$$

where Z is the limit (e.g., a maximum number set by the base station 105) for configured RBs for the scheduled URLLC PUCCH resources. Thus, the Y RBs 320 may be the minimum of the number of required resources or the number of available resources after accounting for the number of resources for the URLLC feedback codebook (e.g., X RBs 315). In both calculations, "ceil" implies a ceiling function. The transmission of the eMBB feedback codebook and the URLLC feedback codebook may be adjacent in frequency as illustrated in resource allocation 300. Accordingly, the resource determination may be on a per RB basis, and each RB may contain either eMBB or URLLC HARQ-ACK, but may not include both.

If the Y RBs 320 is determined to be Z-X (e.g., the allocated RBs for the eMBB feedback codebook is greater than the RBs available after accounting for the URLLC feedback codebook), then the UE 115 may adjust the coding rate for the eMBB feedback codebook or drop the eMBB feedback codebook, as described above and herein. Accordingly, in option 1 described above, the coding rate may be changed to the payload size of the eMBB, K divided by Z-X, and in option 3 described above, a new payload size K is calculated using the coding rate and modulation order.

In PUCCH format 2, the UE 115 may utilize power control for HARQ-ACK feedback. For example, the eMBB feedback codebook and the URLLC feedback codebook may be transmitted with different power on the URLLC PUCCH. A RRC parameter $\xi \geq 1$ may configure a ratio per RB power between URLLC and eMBB. The UE 115 may determine the URLLC power, then scale down the eMBB power according to the $\xi$ parameter. For example, if the URLLC power is P per RB, then the eMBB power may equal P divided by $\xi$. In some cases, the UE 115 determines the total power for transmitting the eMBB and URLLC HARQ-ACK codebooks. If the total power exceeds the defined (e.g., maximum) power that the UE 115 is able to output, the UE 115 may further scale down the power allocated to the eMBB HARQ-ACK codebook to ensure enough power to be allocated to the URLLC HARQ-ACK codebook transmission. For example, if the UE 115 determines that URLLC needs power P1, and eMBB needs power P2, whereas P1+P2>P_max, then UE 115 may set the eMBB power to be P_max–P1. Here, P_max is may be a defined (e.g., maximum) output power of the UE 115. In some cases, the UE 115 may drop the eMBB transmission if its power is too small (e.g., smaller than an RRC configured threshold).

In the case of PUCCH format 3 (e.g., DFT-S-OFDM waveform), the UE 115 may first determine a number of resource elements/modulation symbols Nuiukc for transmitting the URLLC HARQ-ACK and allocate the resources to URLLC HARQ-ACK. The UE 115 may then determine the total number of resources $N_{eMBB}$ for transmitting eMBB HARQ-ACK. If the total amount of determined resources is greater than the maximum resources available on the scheduled PUCCH resource, then UE 115 sets the number for resources allocated for the eMBB as $N_{eMBB} = N_{max} - N_{URLLC}$ Otherwise, the UE 115 may determine the number of RBs based on the total number of determined resources as $N_{RE} = N_{URLLC} + N_{eMBB}$. The UE 115 may then determine the amount of RBs for transmitting the PUCCH as $$N_{RB} = \left\lceil \frac{N_{RE}}{N_{OFDM_{symbol}} * 12} \right\rceil.$$

To determine the number of resources for transmitting UCI (including HARQ-ACK, SR, and channel state information (CSI) report), the UE may be configured with a coding rate R, a modulation order Q, a maximum number of RBs $Z_{max}$, and a number of OFDM symbols N. The UE 115 may be scheduled to transmit K uncoded UCI bits and M CRC bits, then the UE 115 may determine the actual number of resources $Z_{actual}$ if $Z_{actual}$ satisfies $(K+M) \leq R*Q*Z_{actual}*N$ and $(K+M) > R*Q*(Z_{actual}-1)*N$. That is $Z_{actual}$ is the minimum number of RBs such that the actual coding rate $$\frac{K+M}{Q*Z_{actual}*N}$$

is smaller than K. It $$\frac{K+M}{Q * Z_{max} * N} > R,$$

that is even if the UE 115 uses max number of RBs, the coding rate is still above R, then UE 115 will set $Z_{actual}=Z_{max}$, as even using the defined number of RBs may maintain the coding rate above R.

Figure 4:
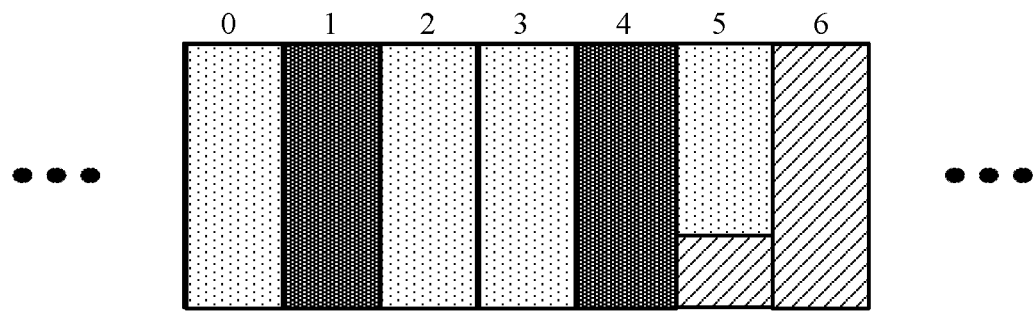
FIG. 4 illustrates an example of a RE mapping scheme in accordance with aspects of the present disclosure.

FIG. 4 illustrates an example of a RE mapping scheme 400 in accordance with aspects of the present disclosure. In some examples, RE mapping scheme 400 may implement aspects of wireless communication system 100. The mapping scheme 400 may be implemented by various aspects of wireless communications system 100. For example, wireless communications a UE 115 of FIG. 1 may implement mapping scheme 400. The mapping scheme illustrates a PUCCH channel including URLLC codebook resources 405, eMBB codebook resources 410, and DMRS 415. The UE 115 may map URLLC coded bits closer to DMRS 415, and map eMBB coded bits to other remaining resources. For example, in the mapping scheme 400, the UE 115 attempts to map URLLC bits to the OFDM symbols 0,2,3,5, if the resources can fully accommodate the URLLC HARQ-ACK payload. If the resources in symbol 0,2,3,5 are not able to fully accommodate the URLLC HARQ-ack payload, the UE 115 may map the remaining URLLC payload to the symbol 6. The UE 115 may then map the eMBB HARQ-acks to the remaining resources of the PUCCH transmission that are not occupied by the URLLC HARQ-ACK payload. In some cases, the RE mapping scheme 400 is applicable to PUCCH format 3.

Figure 5:
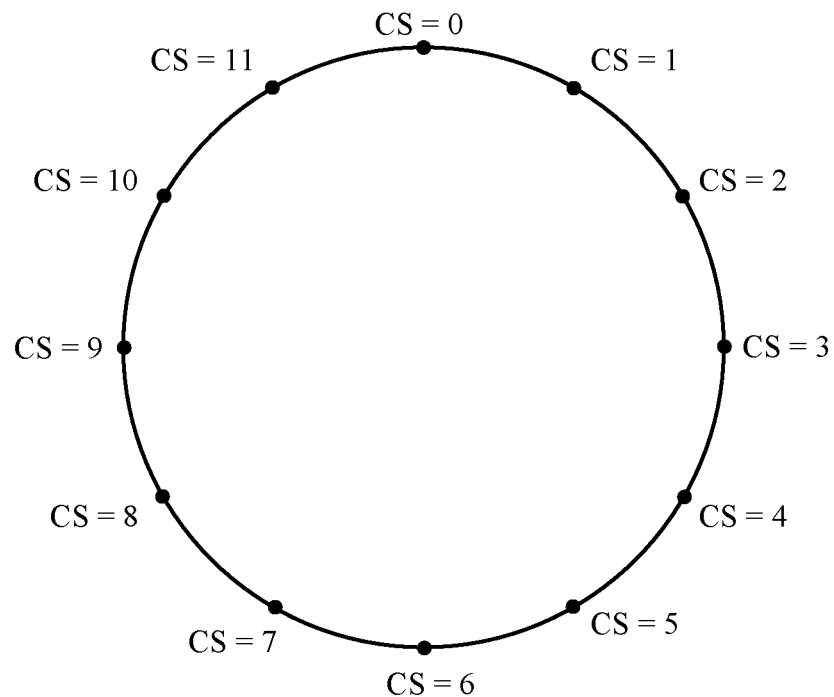
FIG. 5 illustrates an example of a sequence based transmission scheme in accordance with aspects of the present disclosure.

FIG. 5 illustrates an example of a sequence based transmission scheme 500 in accordance with aspects of the present disclosure. In some examples, transmission scheme 500 may implement aspects of wireless communication system 100. The transmission scheme 500 may be utilized for transmission of feedback codebooks (e.g., HARQ-ACK for URLLC and eMBB) in URLLC PUCCH formats 0 and 1. If URLLC HARQ-Ack are scheduled with PUCCH format 0, then UE 115 transmits a sequence of twelve (12) modulated symbols in one OFDM symbol. A UE 115 may optionally be scheduled with two OFDM symbols for PUCCH format 0, in which the UE 115 may repeat the transmission from the first symbol to the second symbol. Information bits for the HARQ-ACK may be mapped to different cyclic shifts (CSs) 505 of the same sequence. In a case where the URLLC HARQ-ACK is one or two bits, then the UE 115 may map the URLLC feedback codebook bits and eMBB feedback codebook bits to different cyclic shifts. Accordingly, a limit of 3 bits may be imposed (e.g., 8 cyclic shifts may be used with a total of 12 cyclic shifts). For example, with a one URLLC feedback codebook bit and one eMBB feedback codebook bit combination, the UE 115 may map (0, 0), (0, 1), (1, 0), and (1, 1) to CS 0, 3, 6, and 9, respectively. The first bit in the tuple (e.g., bit pair) may correspond to a first URLLC HARQ-ACK bit, and the second bit may correspond to a second URLLC HAR-ACK bit or an eMBB HARQ-ACK bit.

In another example, with a two URLLC feedback codebook bits and one eMBB feedback codebook bit combination, the UE 115 may map (0, 0, 0), (0, 1, 0), (1, 0, 0), (1, 1, 0), (0, 0, 1), (0, 1, 1,) and (1, 1, 1) to cyclic shifts 0, 3, 9, 6, 1, 4, 10, and 7, respectively. Thus, if the information to be transmitted in PUCCH is A0 to A11 modulated symbols in the time domain and the UE 115 uses cyclic shift 1 for indicating the HARQ-ACK feedback codebooks, then the UE 115 transmits A1 through A11 then A1, which indicates cyclic shift 1. The different values (e.g., 0 and 1) may indicate NACK and ACK. Accordingly, a transmitted cyclic shift indicating of (1, 1, 0) may correspond to an ACK for a first URLLC service reception, an ACK for a second URLLC service reception, and a NACK for a eMBB service reception.

Figure 6:
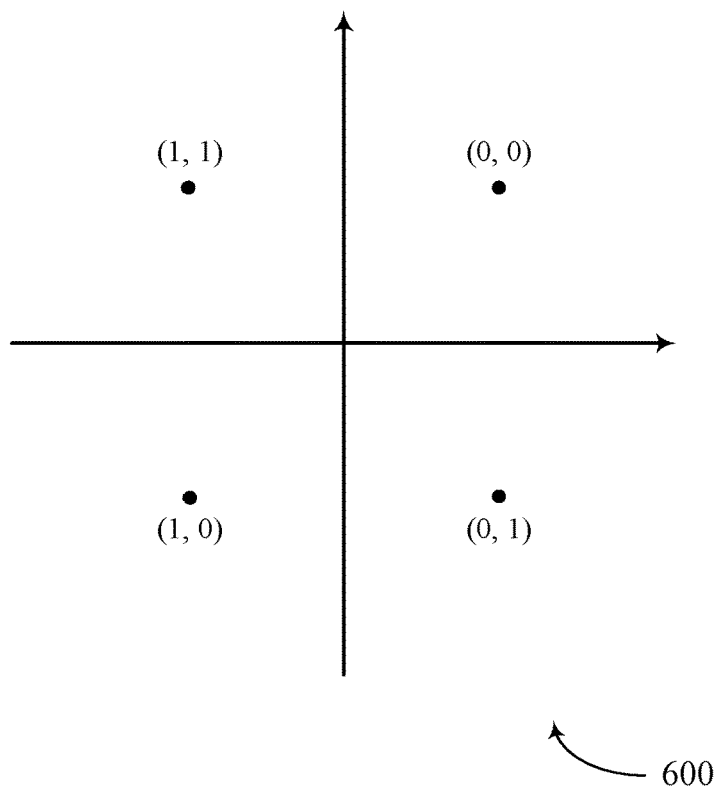
FIG. 6 illustrates examples of transmission schemes in accordance with aspects of the present disclosure.
Figure 6:
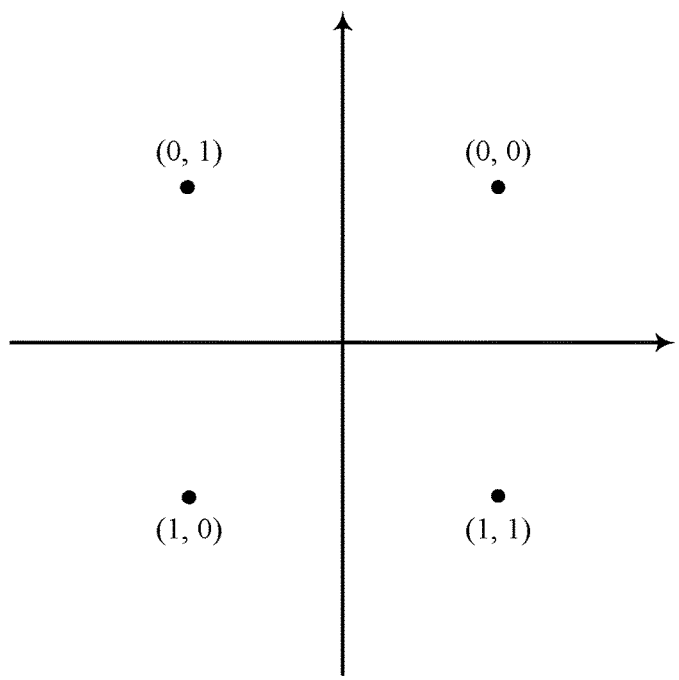

FIG. 6 illustrates examples of transmission schemes 600 and 610 in accordance with aspects of the present disclosure. In some examples, transmission schemes 600 and 610 may implement aspects of wireless communication system 100. Specifically, FIG. 6 illustrates the transmission schemes 600 and 610 when the URLLC-HARQ-ACK are scheduled in PUCCH format 1, which is a long PUCCH (e.g., at least four OFDM symbols) that may carry 2 bits in bit pairs 605. If URLLC HARQ-ACK includes 1 bit, then the UE 115 may insert an additional eMBB bit to map a (URLLC, eMBB) bit pair to a quadrature phase shift keying (QPSK) modulation constellation (e.g., symbol) according to transmission scheme 600 (e.g., the UE 115 converts the 1 bit URLLC binary phase shift keying (BPSK) modulation to a two bit QPSK modulation to use the additional bit for eMBB). If there is no multiplexing, then URLLC HARQ-ACK may be mapped to a BPSK constellation (e.g., (0, 0) for NACK and (1, 0) for ACK). If an eMBB bit is NACK, then (1, 0) and (0, 0) may be mapped the same way as in the 1 bit URLLC case. If URLLC HARQ-ACK has two bits, then the UE 115 may not insert any eMBB bits (e.g., eMBB feedback codebook is dropped or its transmission is delayed).

In transmission scheme 610, the constellation mapping between (1, 1) and (0, 1) are flipped, which may be an alternative method of mapping the bits to optimum phase-shift keying (OPSK) constellations. Note, with transmission scheme 610, the mapping of (0, 0) and (1, 0) may not be changed. Accordingly, if an eMBB bit is a 0 (e.g., NACK), then the URLLC mapping rule may be the same as discussed above with respect to transmission scheme 600 (e.g., the 1 bit URLLC case). For example, if an eMBB bit is NACK, then (1, 0) and (0, 0) may be mapped the same way as in the 1 bit URLLC case.

Figure 7:
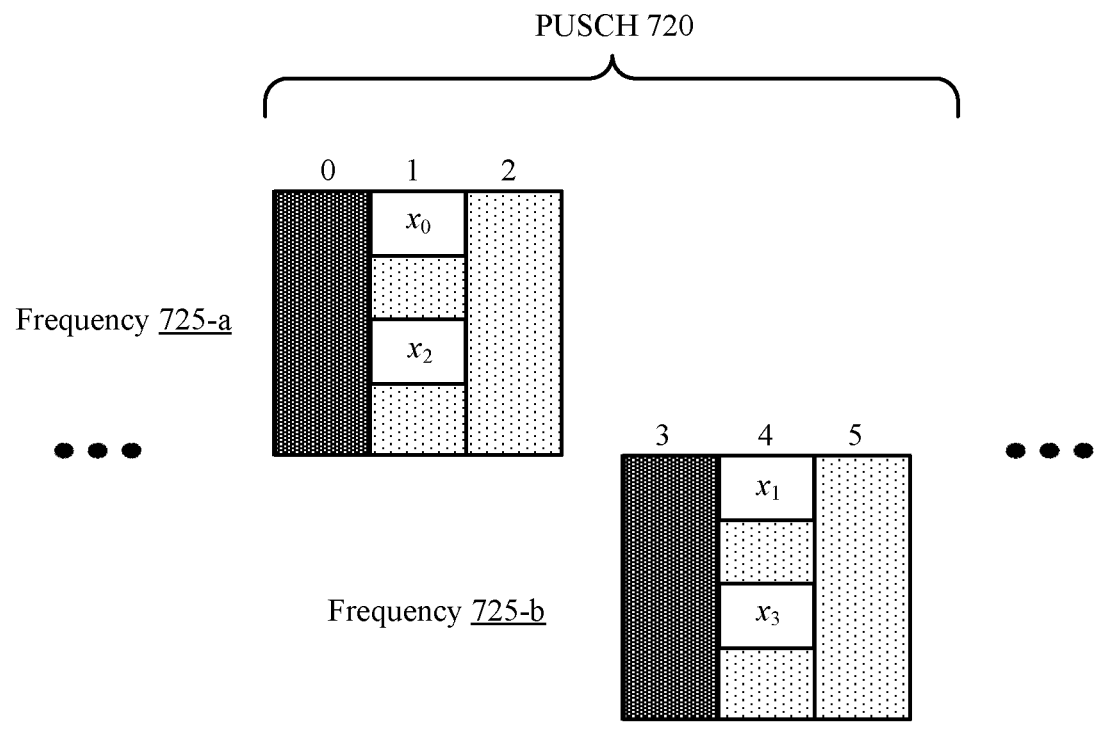
FIG. 7 illustrates an example of a resource mapping in accordance with aspects of the present disclosure.

FIG. 7 illustrates an example resource mapping 700 in accordance with aspects of the present disclosure. In some examples, resource mapping 700 may implement aspects of wireless communication system 100. Specifically, FIG. 7 illustrates the resource mapping 700 of HARQ-ACKs on a PUSCH 720 (e.g., piggyback). If a URLLC and eMBB HARQ-ACK (e.g., two feedback codebooks) are scheduled on two PUCCH resources, the eMBB PUCCH resources and URLLC PUCCH resources collide or partially overlap (e.g., satisfaction of a multiplexing condition), and if the URLLC PUCCH resources overlap with a data transmission scheduled on the PUSCH (e.g., satisfaction of the multiplexing condition), then the UE 115 may map the feedback codebooks to PUSCH resources for transmission. As discussed above with respect to the PUCCH mapping, the URLLC and eMBB HARQ-ACK information bits may be separately encoded using different encoding rates, which may result in different reliabilities. Further, the UE 115 may determine the amount of resources needed for transmission of the URLLC and eMBB HARQ-ACK separately based at least in part on the payload and encoding rates. In cases where a total number of resources are limited, the UE 115 may ensure that the URLLC HARQ-ACK bits are transmitted on resources of the PUSCH 720, and the eMBB HARQ-ACK is transmitted according to a best effort (e.g., using any remaining resources). In some cases, the UE 115 may map the URLLC HARQ-ACK closer to the DMRS of the PUSCH 720, and the UE 115 may match the eMBB HARQ-ACK around the URLLC HARQ-ACKS on any remaining resources.

In some cases, a base station 105 may signal one or more beta factors to UEs 115. The beta factors may be used to derive a coding rate for piggybacking control information on PUSCH. For example, if the coding rate for a data transmission on PUSCH is R, then the UE 115 derives the coding rate of the control information (e.g., feedback codebooks) by dividing R by the beta factor. A base station 105 may signal different beta factors for different scenarios: 1) transmission of the eMBB HARQ-ACK on the eMBB PUSCH; 2) transmission of the eMBB HARQ-ACK on the URLLC PUSCH (assuming this mode is enabled per RRC); 3) transmission of the URLLC HARQ-ACK on the URLLC PUSCH; or 4) transmission of the URLLC HARQ-ACK on the eMBB PUSCH (assuming this mode is enabled per RRC). Accordingly, the UE 115 signal one or more of at least four different beta factors.

The base station 105 may further signal one or more alpha factors to UEs 115. The alpha factor may ensure the PUSCH includes sufficient resources for the data transmission (e.g., rather than control information such as feedback codebooks). In some cases, the alpha factor is between 0 and 1 and signals a maximum number of resources on the PUSCH that may be allocated to HARQ-ACK. For example, if the PUSCH is scheduled with 1000 resources and the alpha factor is 0.4, then the UE 115 may use 400 (e.g., up to a maximum number of) resources out of the 1000 resources to transmit the HARQ-ACK feedback codebooks and any other uplink control information. The remaining 600 resources are designated for data transmission. Similar to the beta factor, the base station 105 may configure four different alpha factors for the four different scenarios: 1) transmission of the eMBB HARQ-Ack on the eMBB PUSCH; 2) transmission of the eMBB HARQ-ACK on the URLLC PUSCH (e.g., low alpha factor); 3) transmission of the URLLC HARQ-ACK on the URLLC PUSCH; or 4) transmission of the URLLC HARQ-ACK on the eMBB PUSCH (e.g., high alpha factor).

To determine the number of resources for HARQ-ACK on PUSCH 720, the UE 115 may determine the defined (e.g., required) number of resources (e.g., REs) for transmission of URLLC HARQ-ACK and eMBB-HARQ-Ack (e.g., $N_1$ and $N_2$, respectively) according to the corresponding payload size as well as the corresponding beta factor. For example, $$N_1 = \left\lceil \frac{K_{URLLC-ack} \cdot M \cdot \beta_{offset}^{URLLC-ack}}{K_{data}} \right\rceil,$$

where M is the total number of resources on PUSCH 720 (for both HARQ-ack and uplink (UL) data transmission), $K_{URLLC-ack}$ is the number of URLLC HARQ-ack bits (including CRC bits), $K_{data}$ is the total payload of uncoded data, and $\beta_{offset}^{URLLC-ack}$ is the beta-offset factor of transmitting the URLLC HARQ-acks on the PUSCH 720 (of a given service type). Further, to determine the payload size for eMBB HARQ-ACK, $$N_2 = \left\lceil \frac{K_{eMBB-ack} \cdot M \cdot \beta_{offset}^{eMBB-ack}}{K_{data}} \right\rceil.$$

The UE 115 may further calculate a defined (e.g., maximum) amount of resources available for the URLLC and eMBB feedback codebooks based on the alpha factor (e.g., $\alpha_{URLLC}M$ or $\alpha_{eMBB}M$, where $\alpha$ is chosen based on the PUSCH type). The UE 115 may determine the amount of resources allocated to HARQ-ACK for URLLC to be $N_{URLLC}=\min(N_1, \lceil\alpha_{URLLC}M\rceil)$. The UE 115 may determine the amount of resources allocated to eMBB HARQ-Ack to be $N_{eMBB}=\min(\max(\lceil\alpha_{URLLC}M\rceil, \lceil\alpha_{eMBB}M\rceil)-N_{URLLC}, N_2)$, where $N_2$ is the amount of resources to accommodate the scheduled eMBB HARQ-ACK. Thus, the formula identifies either the number of available resources (if the scheduled eMBB HARQ-ACK is more than the available resources) or the amount of resources (e.g., amount of required resources) to accommodate the scheduled eMBB HARQ-ACK. Both eMBB and URLLC HARQ-ACKs may be mapped to all layers (e.g., different spatial layers or streams) of the uplink transmission. Further, both eMBB and URLLC HARQ-ACKs may follow the same modulation order (e.g., QPSK) as transmissions on the PUSCH 720.

The UE 115 may map eMBB and URLLC HARQ-ACK on the PUSCH 720 as illustrated in FIG. 7. The URLLC codebook resources 710 may be mapped closer to the DMRS 715 (e.g., for improved channel estimation and demodulation of the URLLC feedback codebook). In some cases, the UE 115 maps the URLLC HARQ-ACK to resources starting from the first non-DMRS OFDM symbol. In other cases, if the DMRS is non-front-loaded (e.g., the DMRS is not scheduled on the first OFDM symbol), then the UE 115 may map resources starting from the OFDM symbol before DMRS 715, which may improve latency relative to schemes which map the HARQ-ACK in the first symbol after DMRS 715. After mapping the URLLC to the PUSCH resources, the UE 115 maps the eMBB HARQ-ACK (e.g., rate matched) around the URLLC HARQ-ACK resources on the PUSCH (e.g., on available resources 705 not used by the URLLC feedback codebook).

If frequency hopping is enabled for PUSCH on the UE 115 (e.g., based on RRC configuration), the UE 115 may map the coded URLLC bits to two frequency hops (e.g., frequency hop 725-*a* and frequency hop 725-*b*) in an interleaved manner. In the illustrated implementation, each frequency hop 725 includes three OFDM symbols, and in each frequency hop 725, the first symbol is a DMRS 715 symbol. To interleave the URLLC HARQ-ACK codebook, the first URLLC HARQ-ACK modulated symbol $x_0$ may be mapped to the first non-DMRS OFDM symbol in the first frequency hop 725-*a*, and the second URLLC HARQ-ACK modulated symbol $x_1$ may be mapped to the first non-DMRS OFDM symbol in the second frequency hop 725-*b* (e.g., illustrated by URLLC codebook resources 710). A third URLLC HARQ-ACK modulated symbol $x_2$ may be mapped to the first symbol in the first frequency hop 725-*a*, and a fourth URLLC HARQ-ACK modulated symbol $x_3$ may be mapped to the first non-DMRS OFDM symbol in the second frequency hop 725-*b* (e.g., illustrated by URLLC codebook resources 710). The UE 115 may map the eMBB encoded codebook to available resources in a sequential manner, while avoiding resources occupied by the URLLC HARQ-ACKs (e.g., the URLLC codebook resources 710). In another case, the UE 115 may map a first copy of the URLLC encoded codebook to the first frequency hop 725-*a* and a second copy (e.g., repetition) of the URLLC encoded codebook in the second frequency hop 725-*b*. The UE 115 may then map the eMBB encoded codebook to the remaining and available resources while avoiding the URLLC HARQ-ACK bits. In some cases, the UE 115 may map the eMBB HARQ-ACK modulated symbols to the remaining and available resources in a non-interleaved manner. For example, the UE 115 may first map the eMBB HARQ-ACK modulated symbols to the resources in the first frequency hop 725-a, and then map the remaining eMBB HARQ-ACK modulated symbols to the second frequency hop 725-b.

To determine the HARQ-ACK codebook size in case of piggybacking on the PUSCH, the UL grant transmitted by the base station 105 may contain one or more downlink assignment indication (DAI) fields to indicate expected codebooks sizes. The UE 115 may use the DAI fields to determine the feedback codebook sizes. In one option, the UL grant includes two DAI fields, where one DAI field indicates the eMBB codebook size, and the other field indicates the URLLC codebook size. In a second option, the UL grant includes one DAI field that indicates the sum of the eMBB and URLLC codebooks size. In a third option, the UL grant includes one DAI field that indicates the eMBB codebook size. In a fourth option, the UL grant includes one DAI field that indicates the URLLC code book size. In a fifth option, the UL grant includes one DAI field, with a separate indication of the service type (e.g., a bit indicating whether the DAI field corresponds to the URLLC codebook or the eMBB codebook).

To map data (e.g., uplink shared channel (UL-SCH) data) to the PUSCH to resources after the URLLC HARQ-ACK and the eMBB HARQ-ACK codebooks are mapped, the UE 115 may consider the codebook size. For example, if the total number of uncoded URLLC HARQ-ACK and eMBB HARQ-ACK is less than or equal to 2 bits, then both the URLLC HARQ-ACK and the eMBB HARQ-ACK may puncture the PUSCH. If the URLLC HARQ-ACK is less than or equal to 2 bits but the eMBB URLLC HARQ-ACK is greater than 2 bits, then the URLLC may puncture the PUSCH, but the PUSCH may rate-match around the eMBB HARQ-ACK. If the URLLC HARQ-ACK is greater than 2 bits, then the PUSCH may rate-match around both the eMBB and URLLC HARQ-ACKs. For example, in the case of puncturing, the UE 115 may encode data for 1000 resources on PUSCH, but the HARQ-ACK may be scheduled for 100 of the 1000 resources. The UE 115 may discard the data corresponding to the 100 resources now allocated for the HARQ-ACK. In another example, for rate matching, if 100 out of 1000 resources are allocated to HARQ-ACK, then the data may be encoded to fit in the 900 resources and mapped to the 900 resources.

In second option for mapping the data (e.g., UL-SCH data) to the PUSCH resources, the UE 115 may consider the DAI included in the UL grant. If the codebook size of a service is indicated in the UL grant, then the UE 115 may re-match the data around the URLLC feedback codebook and the eMBB feedback codebook. Otherwise, the HARQ-ACK may puncture the data within the PUSCH resources.

If the PUSCH transmission contains an aperiodic channels state information (A-CSI) report, then the UE 115 may separately encode the A-CSI (e.g., use a coding rate that may be the same as or different than a coding rate used for encoding the URLLC feedback codebook, a coding rate used for encoding the eMBB feedback codebook, etc.) and map the A-CSI after eMBB-HARQ-ACKS on the available remaining resources on the PUSCH if the PUSCH is for URLLC (e.g., the A-CSI is triggered by a URLLC UL grant). If the PUSCH is for eMBB, then the UE 115 may drop the A-CSI report.

In case the PUSCH transmission or the HARQ-ACK reporting collides with CSI feedback, then UE 115 may determine whether to multiplex the CSI feedback on the PUSCH or drop the CSI feedback based on whether the CSI report is associated with the $10^{-5}$ BLER target or with a low BLER CQI table or not. In the PUSCH transmission collision case, the CSI feedback may result from either an aperiodic CSI that is scheduled to be transmitted on the PUSCH or a periodic CSI that is scheduled to be transmitted on a PUCCH, where the PUCCH may collide with either the PUSCH or with the URLLC HARQ-ACK feedback. In cases where the CSI report is associated with a low BLER or CQI table, then the UE 115 may multiplex, and the resources may be allocated first URLLC HARQ-ACK then to eMBB HARQ-ACK. If there are resources remaining, then resources may be allocated to the CSI report. If there are not enough resources remaining for the CSI report or if the CSI is not associated with a low BLER or CQI table, then the CSI report may be dropped.

In some cases, a UE 115 may piggyback UCI on a shared data channel. For instance, when a PUSCH and a PUCCH resource overlap, HARQ-ACK resources typically carried by a PUCCH may be carried by the PUSCH instead. When a UE performs UCI piggybacking, there may be an alpha-parameter that determines the number of PUSCH resources for transmitting the UCI. The alpha factor may be used such that of the total PUSCH resources, an alpha portion may be used for UCI transmission. When the calculated resources for UCI exceed the alpha portion, the resources for UCI may be capped at this portion. For a HARQ-ACK transmission on PUSCH, the size of an eMBB payload may depend on the alpha factor that is RRC-configured. That is, the eMBB payload size may be determined such that the number of resources in the PUSCH for a HARQ-ACK transmission does not exceed an alpha ratio of the total number of PUSCH resources.

Figure 8:
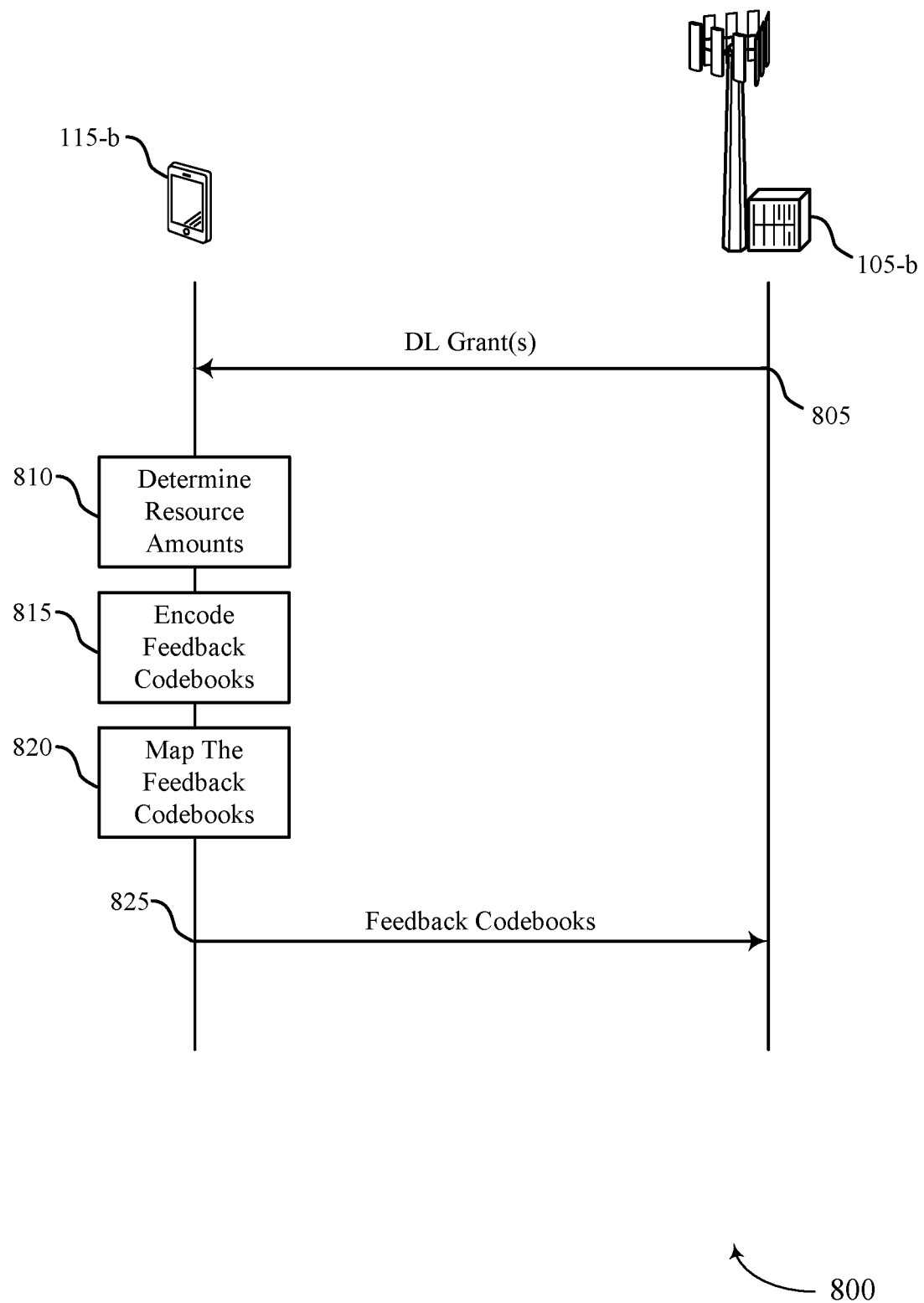
FIG. 8 illustrates an example of a process flow in accordance with aspects of the present disclosure.

FIG. 8 illustrates an example of a process flow 800 in accordance with aspects of the present disclosure. In some examples, process flow 800 may be implemented by aspects of wireless communications system 100. For instance, process flow 800 may include a UE 115-b and a base station 105-b, which may be examples of a UE 115 and a base station 105 as described with reference to FIG. 1.

At 805, UE 115-b may receive one or more downlink grants for transmitting on one or more uplink channels from base station 105-b. The one or more uplink grants may schedule a first resource for transmission of a first feedback codebook for a first service type (e.g., URLLC) and a second resource for a transmission of a second feedback codebook for a second service type (e.g., eMBB). In some cases, the second service type may have a lower latency specification than the first service type.

At 810, UE 115-b determines a first resource amount to be utilized for transmission of the first feedback codebook for the first service type and the second resource amount to be utilized for transmission of the second feedback codebook for the second service type based at least in part on a multiplexing condition being satisfied. The multiplexing condition may be satisfied based at least in part on the first resource colliding in time with the second resource to satisfy the multiplexing condition. The resource amounts (resource elements, resource blocks, etc.) may be determined using coding rates, feedback codebook payload sizes, etc.

At 815, UE 115-b may map the first encoded feedback codebook and the second encoded feedback codebook to a transmission resource based at least in part on the first resource amount and the second resource amount. In some cases, the UE 115-b uses a mapping scheme to map feedback codebooks. In some cases, the first feedback codebooks is mapped to resources based on proximity of the resources to one or more DMRSs. The UE 115-*b* may map the feedback codebooks to resources of the first service or the second service.

At 820 the UE 115-*b* may transmit the first encoded feedback codebook and the second encoded feedback codebook to the base station 105-*b* using the transmission resource based at least in part on the mapping.

In some examples, the communications manager 815 may be implemented as an integrated circuit or chipset for a mobile device modem, and the receiver 810 and transmitter 820 may be implemented as analog components (e.g., amplifiers, filters, antennas) coupled with the mobile device modem to enable wireless transmission and reception over one or more bands.

The communications manager 815 as described herein may be implemented to realize one or more potential advantages. One implementation may allow the device 805 to more reliably communicate feedback for multiple services types. For example, the device 805 may determine to encode feedback codebooks for two different service types, map the two feedback codebooks to resources based on available resource amounts, and transmit the first and second feedback codebooks to a base station.

Based on implementing the feedback techniques as described herein, a processor of a UE 115 (e.g., controlling the receiver 810, the transmitter 820, or the transceiver 1220 as described with reference to FIG. 12) may increase reliability and decrease signaling overhead in the communication of feedback by multiplexing feedback on some resources.

Figure 9:
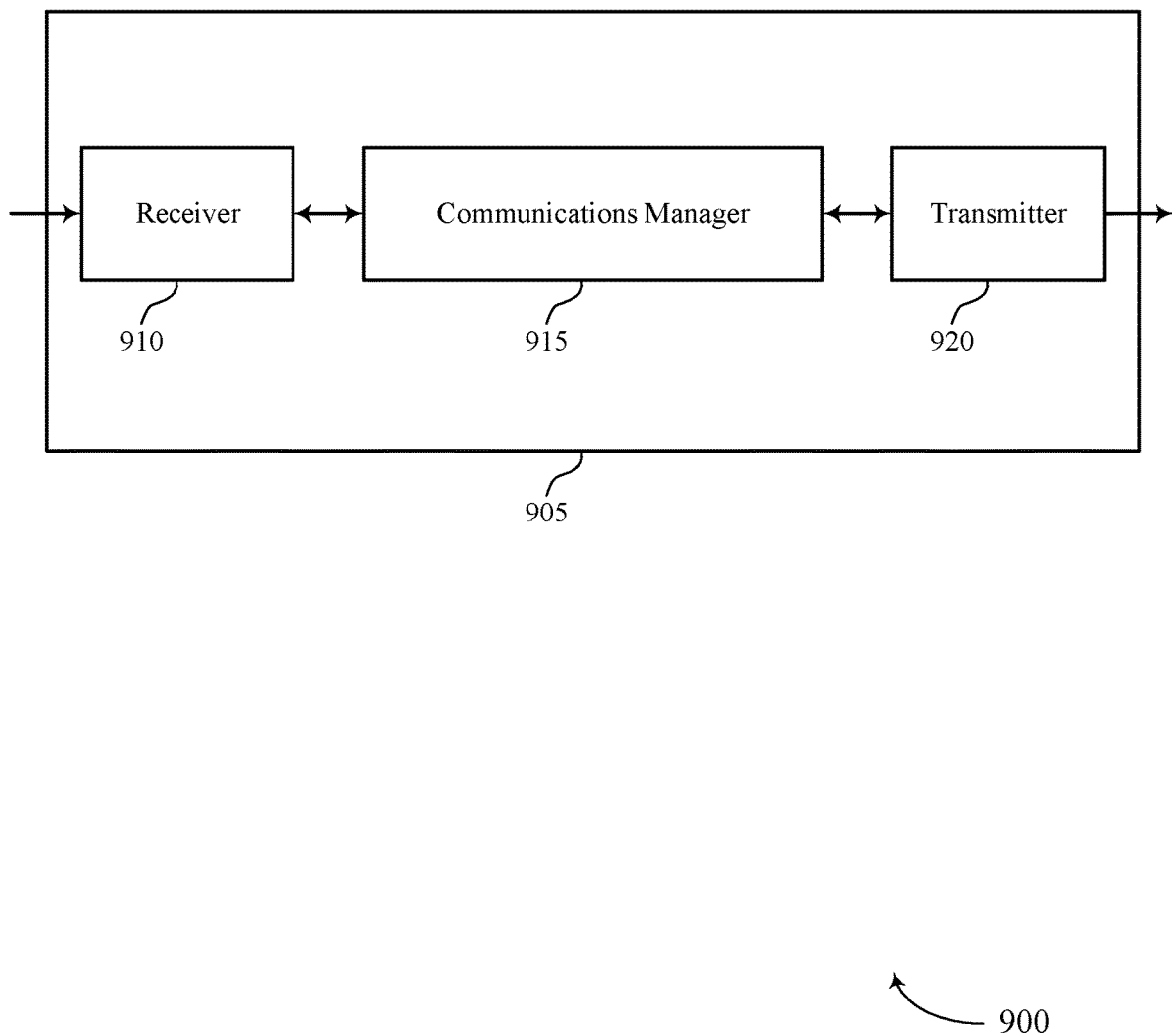
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to encoding and resource mapping for multiplexing feedback codebooks, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type, encode the first feedback codebook using a first coding rate to generate a first encoded feedback codebook and the second feedback codebook using a second coding rate to generate a second encoded feedback codebook, map the first encoded feedback codebook and the second encoded feedback codebook to a transmission resource based on the first resource amount and the second resource amount, and transmit the first encoded feedback codebook and the second encoded feedback codebook using the transmission resource based on the mapping.

The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
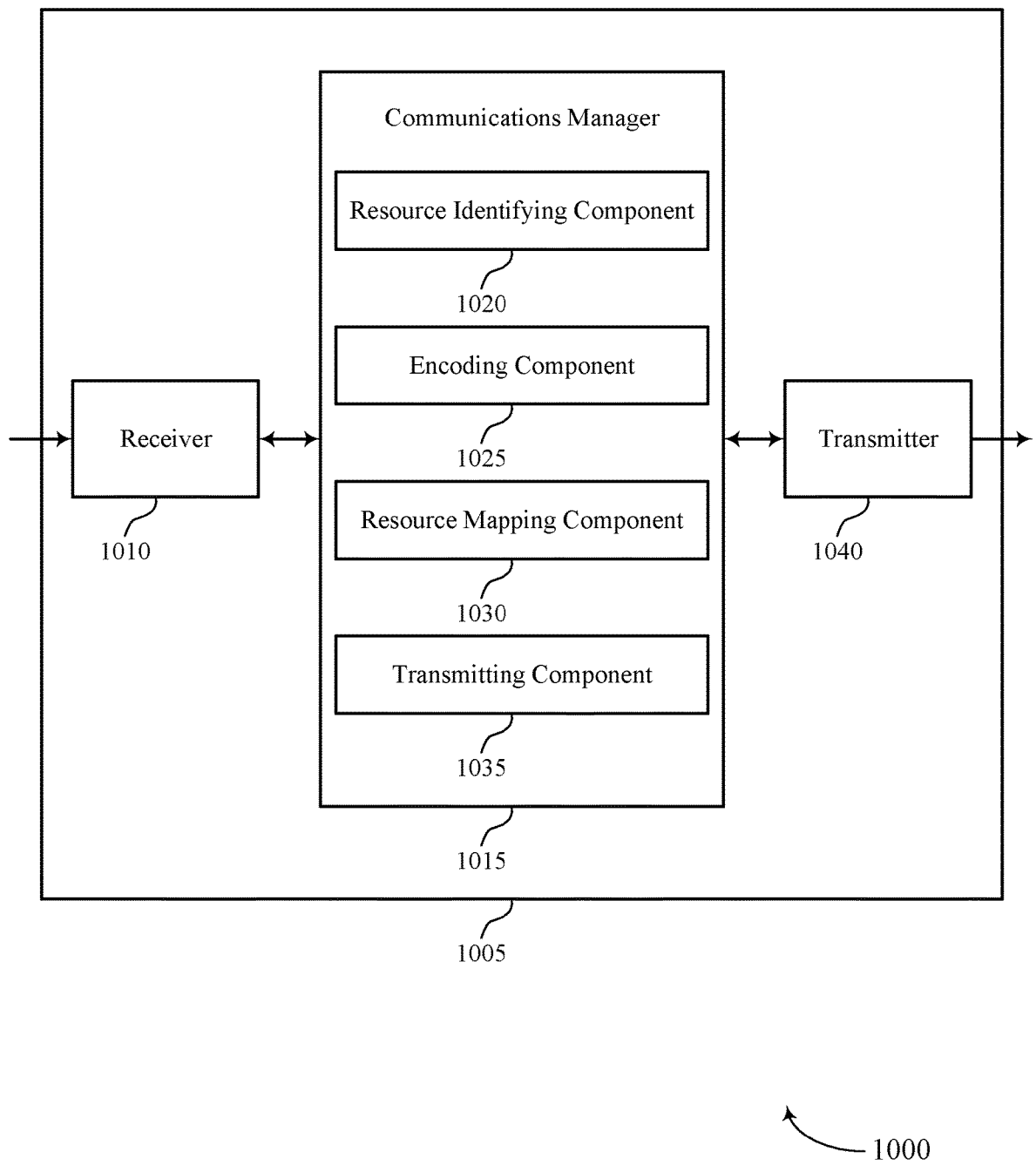

FIG. 10 shows a block diagram 1000 of a device 1005 in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to encoding and resource mapping for multiplexing feedback codebooks, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a resource identifying component 1020, an encoding component 1025, a resource mapping component 1030, and a transmitting component 1035. The communications manager 1015 may be an example of aspects of the communications manager 1210 described herein.

The resource identifying component 1020 may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type.

The encoding component 1025 may encode the first feedback codebook using a first coding rate to generate a first encoded feedback codebook and the second feedback codebook using a second coding rate to generate a second encoded feedback codebook.

The resource mapping component 1030 may map the first encoded feedback codebook and the second encoded feedback codebook to a transmission resource based on the first resource amount and the second resource amount.

The transmitting component 1035 may transmit the first encoded feedback codebook and the second encoded feedback codebook using the transmission resource based on the mapping.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
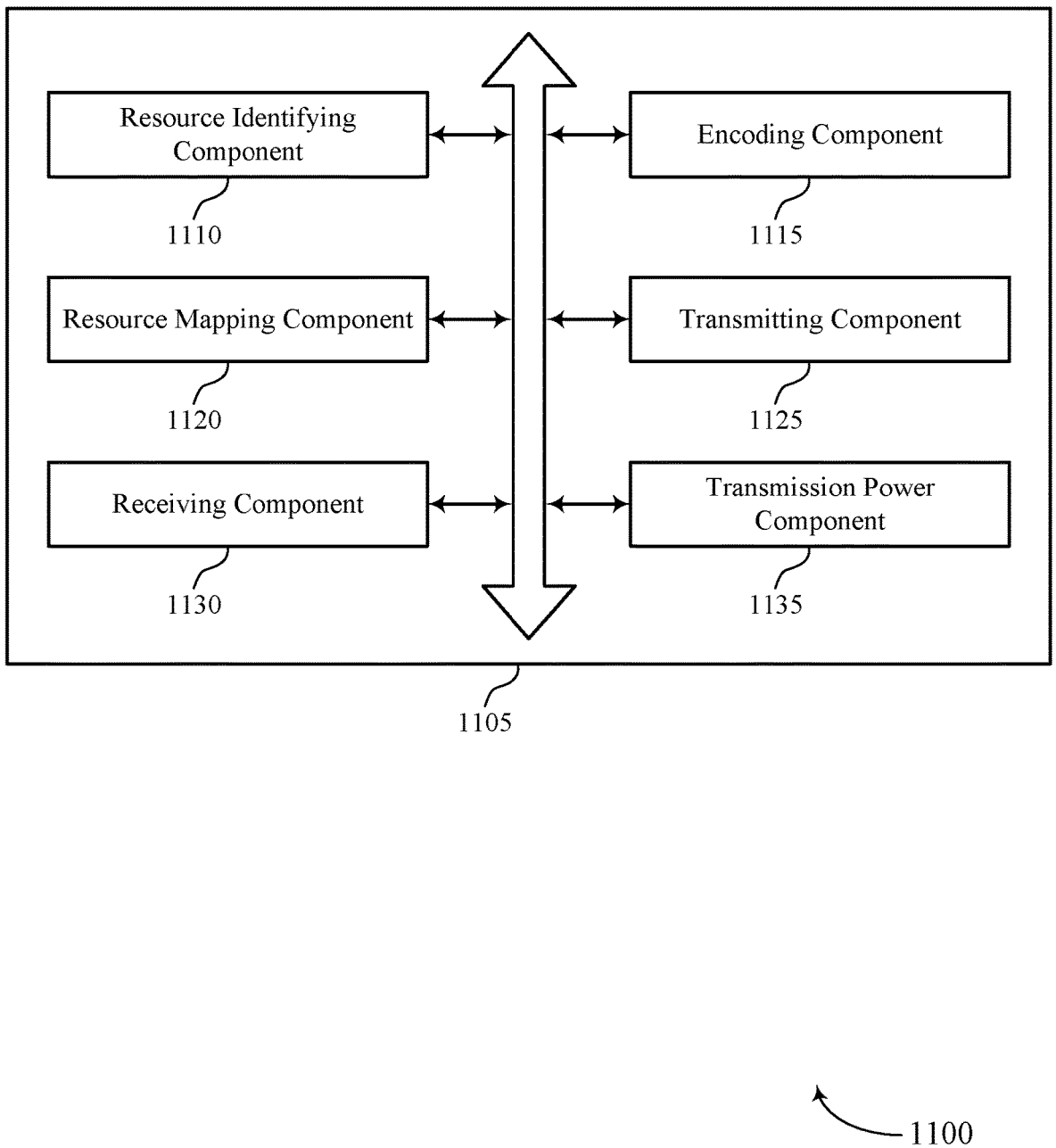
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include a resource identifying component 1110, an encoding component 1115, a resource mapping component 1120, a transmitting component 1125, a receiving component 1130, and a transmission power component 1135. Each of these modules may communicate, directly or indirectly, with one another (e.g., via one or more buses).

The resource identifying component 1110 may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type.

In some examples, the resource identifying component 1110 may determine the first resource amount based on a size of the first feedback codebook. In some examples, the resource identifying component 1110 may determine the second resource amount based on a size of the second feedback codebook. In some examples, the resource identifying component 1110 may determine the first resource amount and the second resource amount based on a control channel format of the transmission resource. In some examples, the resource identifying component 1110 may determine the second coding rate that corresponds to the second resource.

In some examples, the resource identifying component 1110 may determine the second coding rate based on the ratio and the first coding rate. In some examples, the resource identifying component 1110 may determine the first resource amount as a number of resource blocks based on the first coding rate, a size of the first feedback codebook, and a number of symbols in the transmission resource. In some examples, the resource identifying component 1110 may determine the second resource amount as a number of resource blocks based on the second coding rate, a size of the second feedback codebook, and a number of symbols in the transmission resource.

In some examples, the resource identifying component 1110 may set the first resource amount as a first number of resource elements to be utilized for transmission of the first feedback codebook. In some examples, the resource identifying component 1110 may determine a second number of resource elements to be utilized for transmission of the second feedback codebook, where the second resource amount is the second number of resource elements based on a sum of the first number and the second number not exceeding a total number of resource elements in the transmission resource. In some examples, the resource identifying component 1110 may determine a second number of resource elements to be utilized for transmission of the second feedback codebook.

In some examples, the resource identifying component 1110 may set the second resource amount as a third number of remaining resource elements in the transmission resource based on a sum of the first number and the second number exceeding a total number of resource elements in the transmission resource. In some examples, the resource identifying component 1110 may determine that the multiplexing condition is satisfied based on at least one of the first resource and the second resource at least partially overlapping with the data resource, where the transmission resource is the data resource. In some examples, the resource identifying component 1110 may calculate an amount of resources to be utilized for transmission of the first feedback codebook and the second feedback codebook based on the first parameter. In some examples, the resource identifying component 1110 may calculate an amount of available resources on the shared data channel resource based on the second parameter.

In some examples, the resource identifying component 1110 may determine the first resource amount based on the amount of available resources. In some examples, the resource identifying component 1110 may determine an amount of remaining resources within the available resources based on the first resource amount. In some examples, the resource identifying component 1110 may determine the second resource amount based on the amount of remaining resources. In some examples, the resource identifying component 1110 may determine a first size of the first feedback codebook, a second size of the second feedback codebook, or both, based on a grant that schedules the transmission resource in a shared data channel.

In some examples, the resource identifying component 1110 may receive a first grant scheduling a first resource for transmission of the first feedback codebook, determine that the first resource overlaps in time with a second resource scheduled for a channel state information report, and map the channel state information report to the transmission resource based at least in part on determining that the channel state information report satisfies a block error rate target threshold or a channel quality information table threshold. In some cases, the transmission resource is a shared data channel resource, and wherein the channel state information report is an aperiodic channel state information report scheduled to be transmitted on the shared data channel resource. In some cases, the transmission resource is a shared data channel resource, and wherein the second resource is scheduled for the channel state information report based at least in part on a control channel resource scheduled for the channel state information report overlapping in time with the shared data channel resource or the first resource.

In some examples, the resource identifying component 1110 may receive a first grant scheduling a first resource for transmission of the first feedback codebook, determine that the first resource overlaps in time with a second resource scheduled for a channel state information report, and drop reporting of the channel state information report based at least in part on determining that the channel state information report does not satisfy a block error rate target threshold or a channel quality information table threshold.

The encoding component 1115 may encode the first feedback codebook using a first coding rate to generate a first encoded feedback codebook and the second feedback codebook using a second coding rate to generate a second encoded feedback codebook.

In some examples, the encoding component 1115 may determine the first coding rate that corresponds to the first resource. In some examples, the encoding component 1115 may adjust the second coding rate based on determining that a sum of the first resource amount and the second resource amount exceeds an available amount of resources for the transmission resource. In some examples, the encoding component 1115 may adjust a size of a payload for the second feedback codebook to partially drop a portion of the second feedback codebook based on determining that a sum of the first resource amount and the second resource amount exceeds an available amount of resources for the transmission resource. In some examples, the encoding component 1115 may generate the first feedback codebook based on the transmission of the first service type.

In some examples, the encoding component 1115 may generate the second feedback codebook based on the transmission of the second service type. In some examples, the encoding component 1115 may determine that the multiplexing condition is satisfied based on the first resource at least partially overlapping with the second resource. In some examples, the encoding component 1115 may apply a first cyclic shift of a set of different cyclic shifts to a bit sequence to generate a shifted bit sequence to encode at least one bit of the first feedback codebook, at least one bit of the second feedback codebook, or both. In some examples, the encoding component 1115 may adjust from a first modulation scheme to a second modulation scheme based on a size of the first feedback codebook being a single bit.

In some examples, the encoding component 1115 may modulate a bit of the first encoded feedback codebook and a bit of the second encoded feedback codebook based on the second modulation scheme. In some examples, the encoding component 1115 may modulate the first feedback codebook and the second feedback codebook using a same modulation order as applied to modulate data on the shared data channel resource. In some examples, the encoding component 1115 may encode the channel state information using a third coding rate, where the transmission resource is the shared data channel resource for the first service type. In some cases, the first modulation scheme is binary phase shift keying modulation scheme and the second modulation scheme is quadrature phase shift keying modulation scheme.

The resource mapping component 1120 may map the first encoded feedback codebook and the second encoded feedback codebook to a transmission resource based on the first resource amount and the second resource amount. In some examples, the resource mapping component 1120 may map the first encoded feedback codebook to first resource elements of the transmission resource based on proximity of the first resource elements to at least one demodulation reference signal symbol within the transmission resource. In some examples, the resource mapping component 1120 may map the second encoded feedback codebook to second resource elements remaining within the transmission resource after mapping of the first encoded feedback codebook to the first resource elements.

In some examples, the resource mapping component 1120 may map the first encoded feedback codebook and the second encoded feedback codebook to a set of spatial layers, where the first encoded feedback codebook and the second encoded feedback codebook are transmitted via the transmission resource using the set of spatial layers. In some examples, the resource mapping component 1120 may map at least a portion of the first encoded feedback codebook to an earliest symbol of the transmission resource that does not include a front-loaded demodulation reference signal symbol.

In some examples, the resource mapping component 1120 may rate match the second encoded feedback codebook around resources within the transmission resource allocated to the first encoded feedback codebook. In some examples, the resource mapping component 1120 may map the first encoded feedback codebook to a symbol of the transmission resource that occurs prior to a demodulation reference signal symbol in the transmission resource. In some examples, the resource mapping component 1120 may rate match the second encoded feedback codebook within the transmission resource around resources allocated to the first encoded feedback codebook.

In some examples, the resource mapping component 1120 may map bits of the first encoded feedback codebook to respective frequency hops based on an interleaving pattern. In some examples, the resource mapping component 1120 may repeat a bit of the first encoded feedback codebook on respective frequency hops.

In some examples, the resource mapping component 1120 may map data to the transmission resource based on a first size of the first feedback codebook, a second size of the second feedback codebook, or both, where the transmission resource is a shared data channel resource. In some examples, the resource mapping component 1120 may puncture the data mapped to the transmission resource with one or more bits of the first encoded feedback codebook, the second encoded feedback codebook, or both, based on a total of the first size and the second size satisfying a threshold. In some examples, the resource mapping component 1120 may puncture the data mapped to the transmission resource with one or more bits of the first encoded feedback codebook based on the first feedback size satisfying a threshold.

In some examples, the resource mapping component 1120 may rate match the data within the transmission resource around the mapping of the second encoded feedback codebook to the transmission resource based on a total of the first size and the second size not satisfying the threshold. In some examples, the resource mapping component 1120 may rate match the data within the transmission resource around the mapping of the first encoded feedback codebook and the second encoded feedback codebook to the transmission resource based on the first size not satisfying a threshold.

In some examples, the resource mapping component 1120 may rate match the data within the transmission resource around the mapping of the first encoded feedback codebook and the second encoded feedback codebook based on a receiving a grant of the transmission resource indicating the first size, the second size, or both. In some examples, the resource mapping component 1120 may puncture the data mapped to the transmission resource with one or more bits of the first encoded feedback codebook, the second encoded feedback codebook, or both, based on a receiving a grant of the transmission resource that does not indicate the first size or the second size. In some examples, the resource mapping component 1120 may map the encoded channel state information to the shared data channel resource.

In some examples, the resource mapping component 1120 may drop reporting of the channel state information based on the transmission resource being the shared data channel resource for the second service type. In some cases, the transmission resource is a shared data channel resource, and where the first encoded feedback codebook and the second encoded feedback codebook are transmitted using the shared data channel resource.

The transmitting component 1125 may transmit the first encoded feedback codebook and the second encoded feedback codebook using the transmission resource based on the mapping. In some examples, the transmitting component 1125 may transmit the first encoded feedback codebook and the second encoded feedback codebook using the transmission resource that is the first resource. In some examples, the transmitting component 1125 may transmit the first encoded feedback codebook and the second encoded feedback codebook using the transmission resource that is a shared data channel resource.

The receiving component 1130 may receive a grant scheduling a first resource for transmission of the first feedback codebook. In some examples, the receiving component 1130 may receive a grant scheduling a second resource for transmission of the second feedback codebook. In some examples, the receiving component 1130 may receive control signaling indicating a ratio between the first coding rate and the second coding rate. In some examples, the receiving component 1130 may receive control signaling that indicates a power ratio.

In some examples, the receiving component 1130 may receive a first grant scheduling a first resource for transmission of the first feedback codebook. In some examples, the receiving component 1130 may receive a second grant scheduling a second resource for transmission of the second feedback codebook, where the first resource collides in time with the second resource to satisfy the multiplexing condition.

In some examples, the receiving component 1130 may receive a grant that schedules a transmission of the first service type and a control channel resource for transmission of the first feedback codebook. In some examples, the receiving component 1130 may receive a grant that schedules a transmission of the second service type and a control channel resource for transmission of the second feedback codebook. In some examples, the receiving component 1130 may receive a first grant scheduling a first resource for transmission of the first feedback codebook and a second grant scheduling a second resource for transmission of the second feedback codebook.

In some examples, the receiving component 1130 may receive a third grant scheduling a data resource for transmission of uplink data on a shared data channel. In some examples, the receiving component 1130 may receive control signaling indicating a first parameter and a second parameter, where each of the first resource amount and the second resource amount is determined based on the first parameter and the second parameter. In some examples, the receiving component 1130 may receive a grant indicating to report channel state information on a shared data channel resource. In some examples, the receiving component 1130 may receive a grant indicating to report channel state information on a share data channel resource.

In some cases, the control signaling is radio resource control signaling. In some cases, the first parameter is a beta factor and the second parameter is an alpha factor. In some cases, the grant includes a downlink assignment indication. In some cases, the grant indicates a service type. In some cases, the grant includes at least one field that indicates one or more of the first size, or the second size, or a sum of the first size and the second size, or any combination thereof.

The transmission power component 1135 may determine a first transmission power for transmission of the first encoded feedback codebook and a second transmission power for transmission of the second encoded feedback codebook based on the power ratio, where the first encoded feedback codebook and the second encoded feedback codebook are respectively transmitted in accordance with the first transmission power and the second first transmission power. The transmission power component 1135 may determine a total transmission power for transmission of the first encoded feedback codebook and transmission of the second encoded feedback codebook and reduce a power allocated for transmission of the second encoded feedback codebook based at least in part on determining that the total transmission power exceeds a transmission power capability of the UE.

Figure 12:
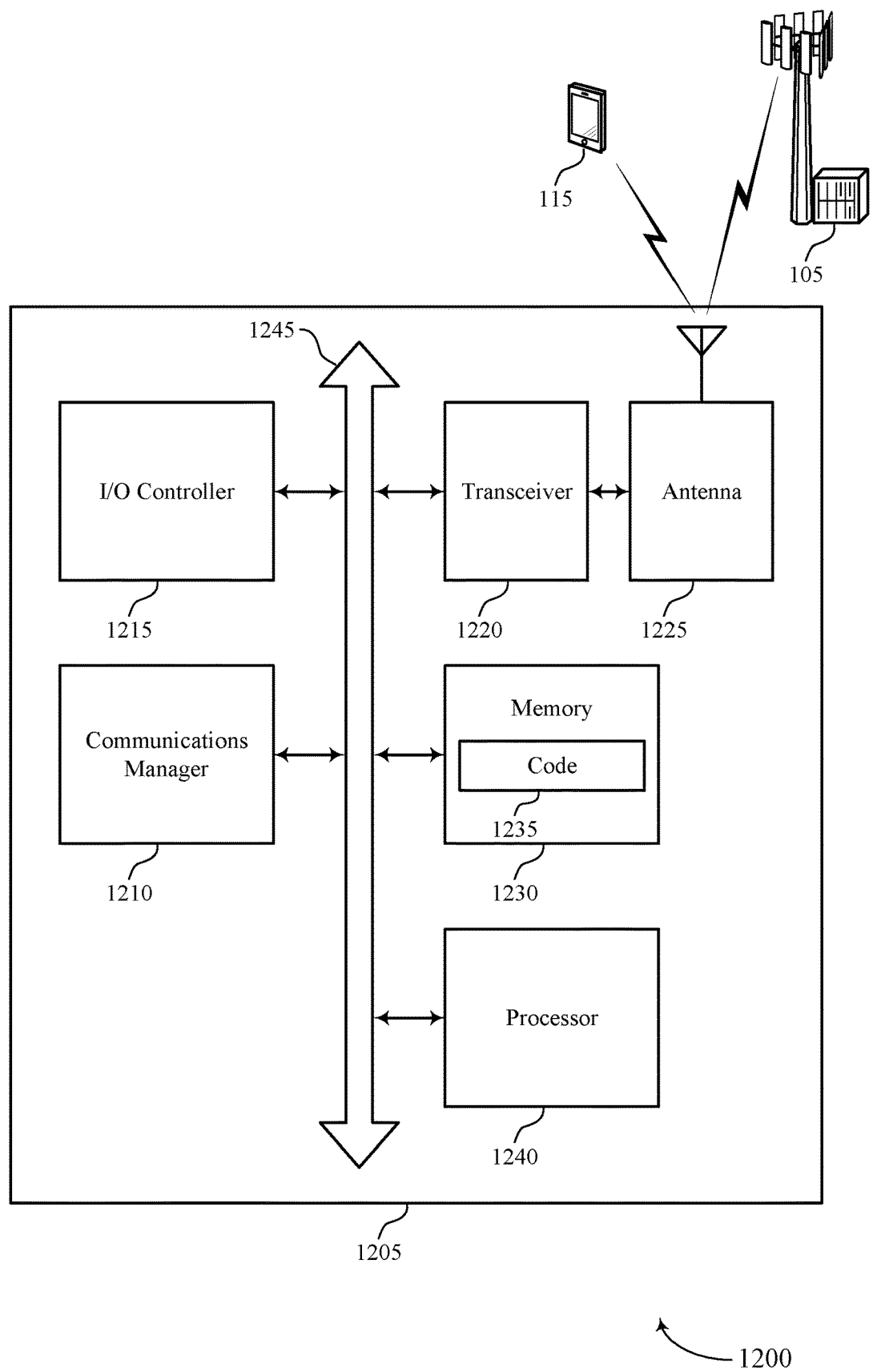
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type, encode the first feedback codebook using a first coding rate to generate a first encoded feedback codebook and the second feedback codebook using a second coding rate to generate a second encoded feedback codebook, map the first encoded feedback codebook and the second encoded feedback codebook to a transmission resource based on the first resource amount and the second resource amount, and transmit the first encoded feedback codebook and the second encoded feedback codebook using the transmission resource based on the mapping.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting encoding and resource mapping for multiplexing feedback codebooks).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
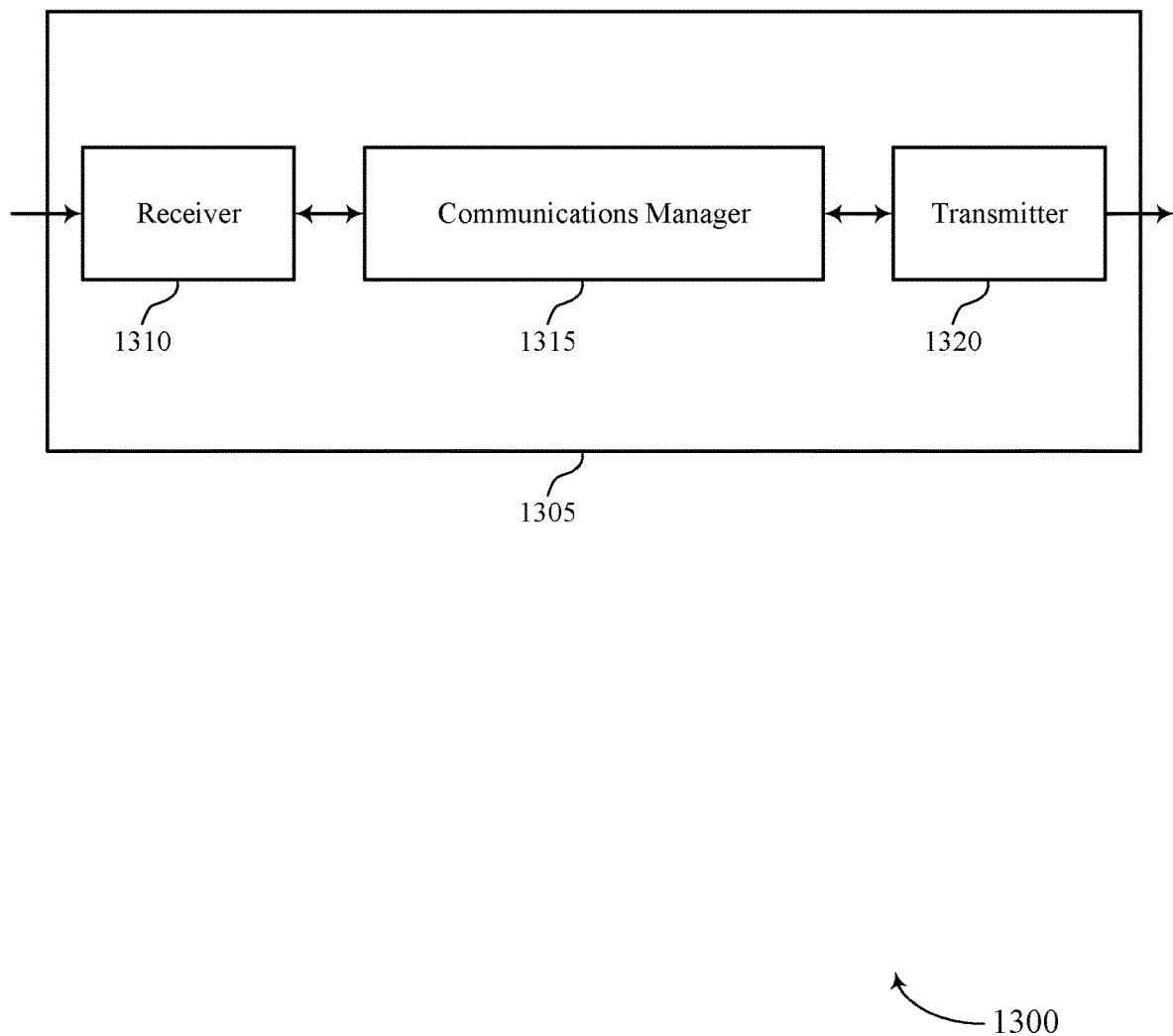
FIGS. 13 and 14 show block diagrams of devices in accordance with aspects of the present disclosure.

FIG. 13 shows a block diagram 1300 of a device 1305 in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to encoding and resource mapping for multiplexing feedback codebooks, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit a first transmission for a first service type and a second transmission for a second service type, the first service type having a lower latency specification and a higher reliability specification than the second service type, determine a first resource amount to be utilized for transmission of a first feedback codebook for the first service type and a second resource amount to be utilized for transmission of a second feedback codebook for the second service type based on a multiplexing condition being satisfied, receive the first encoded feedback codebook and the second encoded feedback codebook via a transmission resource, demap the first encoded feedback codebook and the second encoded feedback codebook based on the first resource amount and the second resource amount, and decode the first encoded feedback codebook using a first coding rate to generate a first feedback codebook and the second encoded feedback codebook using a second coding rate that differs from the first coding rate to generate a second feedback codebook. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
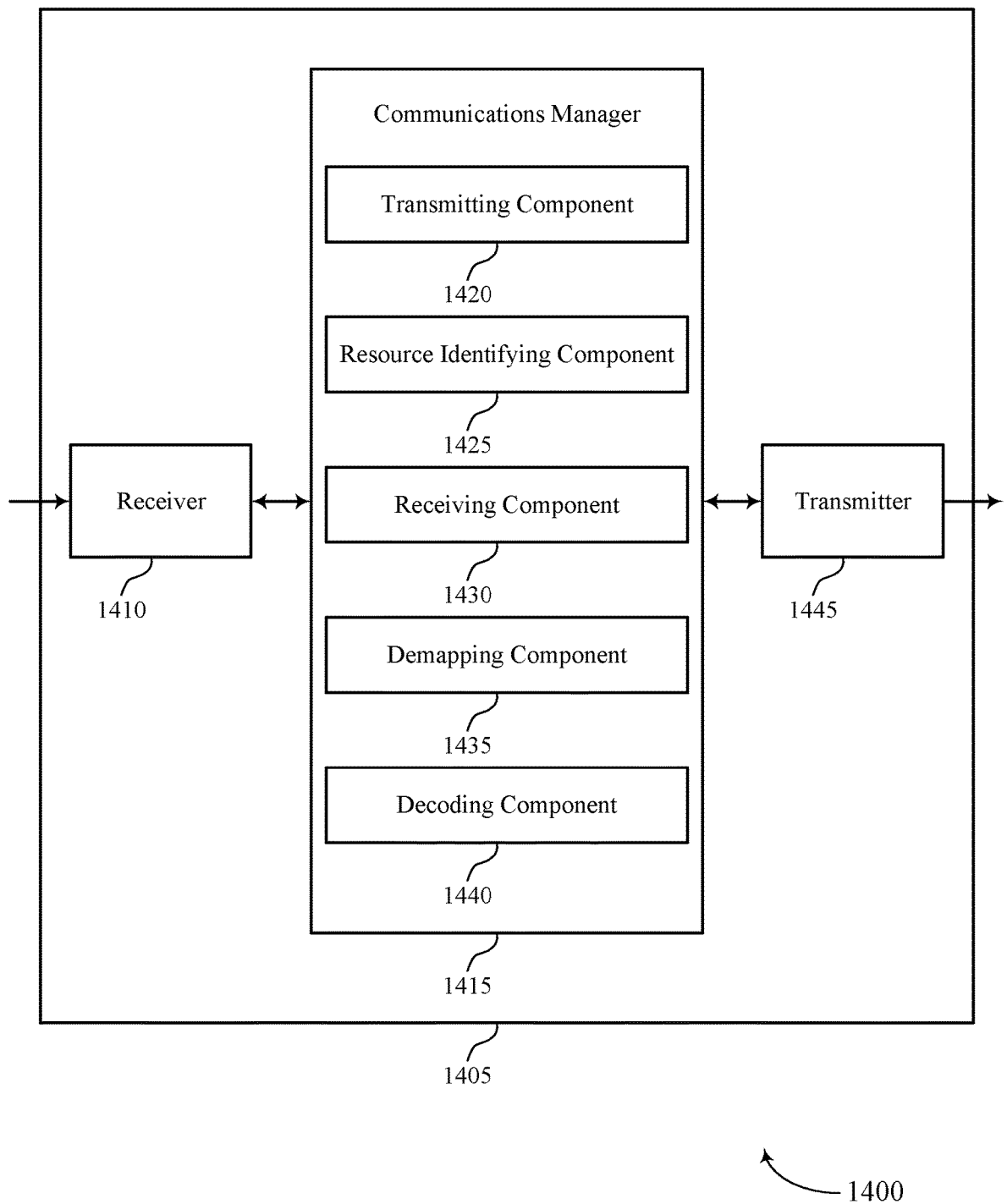

FIG. 14 shows a block diagram 1400 of a device 1405 in accordance with aspects of the present disclosure. The device 1405 may be an example of aspects of a device 1305, or a base station 105 as described herein. The device 1405 may include a receiver 1410, a communications manager 1415, and a transmitter 1445. The device 1405 may also include a processor. Each of these components may be in communication with one another (e.g., via one or more buses).

The receiver 1410 may receive information such as packets, user data, or control information associated with various information channels (e.g., control channels, data channels, and information related to encoding and resource mapping for multiplexing feedback codebooks, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a transmitting component 1420, a resource identifying component 1425, a receiving component 1430, a demapping component 1435, and a decoding component 1440. The communications manager 1415 may be an example of aspects of the communications manager 1610 described herein.

The transmitting component 1420 may transmit a first transmission for a first service type and a second transmission for a second service type, the first service type having a lower latency specification and a higher reliability specification than the second service type.

The resource identifying component 1425 may determine a first resource amount to be utilized for transmission of a first feedback codebook for the first service type and a second resource amount to be utilized for transmission of a second feedback codebook for the second service type based on a multiplexing condition being satisfied.

The receiving component 1430 may receive the first encoded feedback codebook and the second encoded feedback codebook via a transmission resource.

The demapping component 1435 may demap the first encoded feedback codebook and the second encoded feedback codebook based on the first resource amount and the second resource amount.

The decoding component 1440 may decode the first encoded feedback codebook using a first coding rate to generate a first feedback codebook and the second encoded feedback codebook using a second coding rate that differs from the first coding rate to generate a second feedback codebook.

The transmitter 1445 may transmit signals generated by other components of the device 1405. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
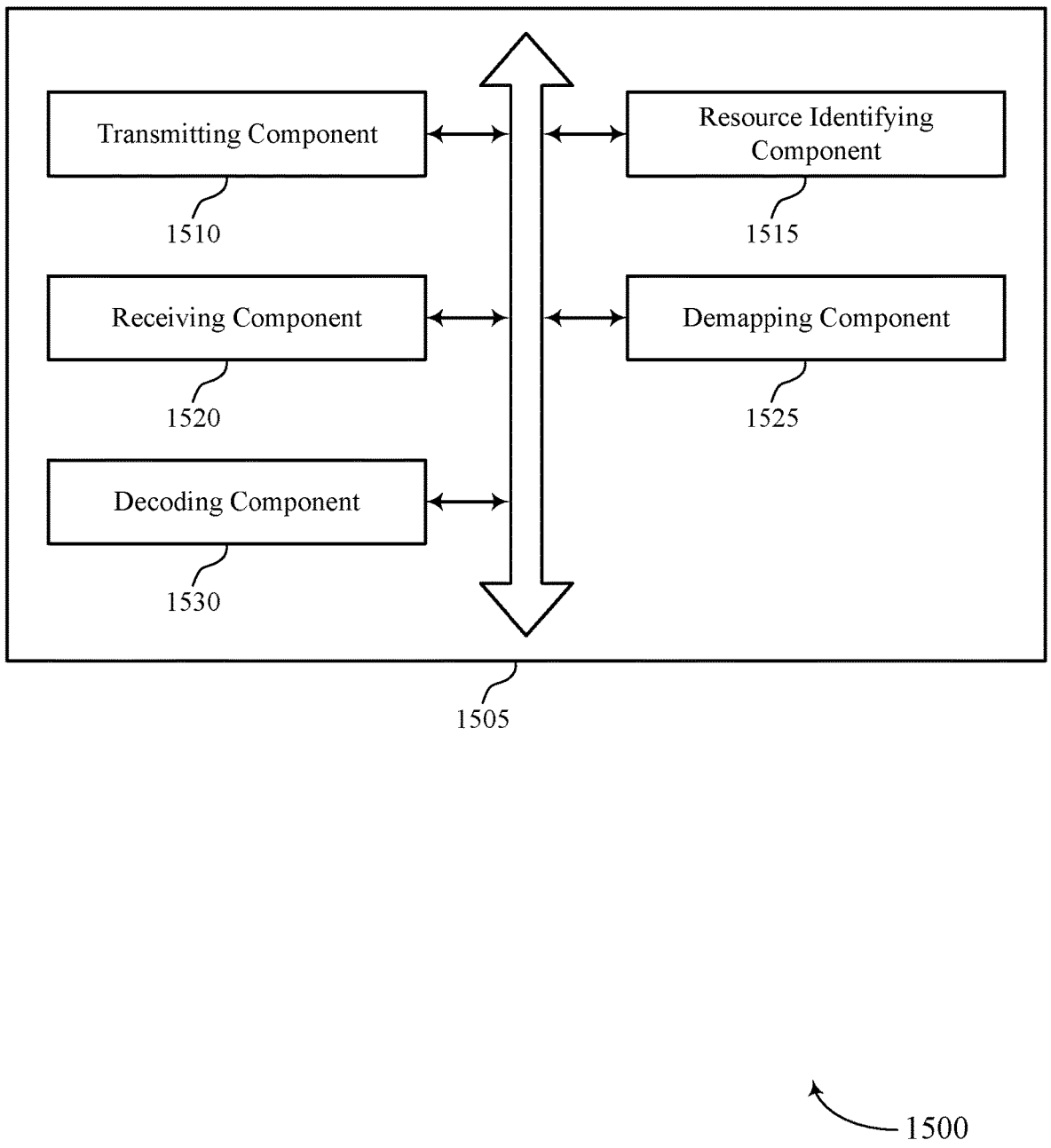
FIG. 15 shows a block diagram of a communications manager in accordance with aspects of the present disclosure.

FIG. 15 shows a block diagram 1500 of a communications manager 1505 in accordance with aspects of the present disclosure. The communications manager 1505 may be an example of aspects of a communications manager 1315, a communications manager 1415, or a communications manager 1610 described herein. The communications manager 1505 may include a transmitting component 1510, a resource identifying component 1515, a receiving component 1520, a demapping component 1525, and a decoding component 1530. Each of these modules may communicate, directly or indirectly, with one another (e.g., via one or more buses).

The transmitting component 1510 may transmit a first transmission for a first service type and a second transmission for a second service type, the first service type having a lower latency specification and a higher reliability specification than the second service type.

In some examples, the transmitting component 1510 may transmit a grant scheduling a first resource for transmission of the first feedback codebook. In some examples, the transmitting component 1510 may transmit a grant scheduling a second resource for transmission of the second feedback codebook. In some examples, the transmitting component 1510 may transmit control signaling indicating a ratio between the first coding rate and the second coding rate. In some examples, the transmitting component 1510 may transmit control signaling that indicates a power ratio for transmission of the first encoded feedback codebook relative to a second transmission power for transmission of the second encoded feedback codebook.

In some examples, the transmitting component 1510 may transmit a first grant scheduling a first resource for transmission of the first feedback codebook. In some examples, the transmitting component 1510 may transmit a second grant scheduling a second resource for transmission of the second feedback codebook, where the first resource collides in time with the second resource. In some examples, the transmitting component 1510 may transmit a grant that schedules a transmission of the first service type and a control channel resource for transmission of the first feedback codebook.

In some examples, the transmitting component 1510 may transmit a grant that schedules a transmission of the second service type and a control channel resource for transmission of the second feedback codebook. In some examples, the transmitting component 1510 may transmit a first grant scheduling a first resource for transmission of the first feedback codebook and a second grant scheduling a second resource for transmission of the second feedback codebook. In some examples, the transmitting component 1510 may transmit a third grant scheduling a data resource for transmission of uplink data on a shared data channel.

In some examples, the transmitting component 1510 may transmit control signaling indicating a first parameter and a second parameter, where each of the first resource amount and the second resource amount is determined based on the first parameter and the second parameter. In some examples, the transmitting component 1510 may transmit a grant that schedules the transmission resource in a shared data channel and indicates a first size of the first feedback codebook, a second size of the second feedback codebook, or both.

In some examples, the transmitting component 1510 may transmit a grant indicating to report channel state information, where the transmission resource is a shared data channel resource for the first service type. In some examples, the transmitting component 1510 may transmit a grant indicating to report channel state information.

In some cases, the first parameter is a beta factor and the second parameter is an alpha factor. In some cases, the control signaling is radio resource control signaling. In some cases, the grant includes a downlink assignment indication. In some cases, the grant includes at least one field that indicates one or more of the first size, or the second size, or a sum of the first size and the second size, or any combination thereof. In some cases, the grant indicates a service type.

The resource identifying component 1515 may determine a first resource amount to be utilized for transmission of a first feedback codebook for the first service type and a second resource amount to be utilized for transmission of a second feedback codebook for the second service type based on a multiplexing condition being satisfied. In some examples, the resource identifying component 1515 may determine the first resource amount based on a size of the first feedback codebook. In some examples, the resource identifying component 1515 may determine the second resource amount based on a size of the second feedback codebook.

In some examples, the resource identifying component 1515 may determine the first resource amount and the second resource amount based on a control channel format of the transmission resource. In some examples, the resource identifying component 1515 may determine the first resource amount as a number of resource blocks based on the first coding rate, a size of the first feedback codebook, and a number of symbols in the transmission resource. In some examples, the resource identifying component 1515 may determine the second resource amount as a number of resource blocks based on the second coding rate, a size of the second feedback codebook, and a number of symbols in the transmission resource.

In some examples, the resource identifying component 1515 may set the first resource amount as a first number of resource elements to be utilized for transmission of the first feedback codebook. In some examples, the resource identifying component 1515 may determine a second number of resource elements to be utilized for transmission of the second feedback codebook, where the second resource amount is the second number of resource elements based on a sum of the first number and the second number not exceeding a total number of resource elements in the transmission resource. In some examples, the resource identifying component 1515 may determine a second number of resource elements to be utilized for transmission of the second feedback codebook.

In some examples, the resource identifying component 1515 may set the second resource amount as a third number of remaining resource elements in the transmission resource based on a sum of the first number and the second number exceeding a total number of resource elements in the transmission resource. In some examples, the resource identifying component 1515 may determine that the multiplexing condition is satisfied based on the first resource at least partially overlapping with the second resource. In some examples, the resource identifying component 1515 may determine that the multiplexing condition is satisfied based on at least one of the first resource and the second resource at least partially overlapping with the data resource, where the transmission resource is the data resource.

In some examples, the resource identifying component 1515 may calculate an amount of resources to be utilized for transmission of the first feedback codebook and the second feedback codebook based on the first parameter. In some examples, the resource identifying component 1515 may calculate an amount of available resources on the shared data channel resource based on the second parameter. In some examples, the resource identifying component 1515 may determine the first resource amount based on the amount of available resources.

In some examples, the resource identifying component 1515 may determine an amount of remaining resources within the available resources based on the first resource amount. In some examples, the resource identifying component 1515 may determine the second resource amount based on the amount of remaining resources.

The receiving component 1520 may receive the first encoded feedback codebook and the second encoded feedback codebook via a transmission resource. In some examples, the receiving component 1520 may receive the first encoded feedback codebook and the second encoded feedback codebook using the transmission resource that is a shared data channel resource.

The demapping component 1525 may demap the first encoded feedback codebook and the second encoded feedback codebook based on the first resource amount and the second resource amount. In some examples, the demapping component 1525 may demap the first encoded feedback codebook to first resource elements of the transmission resource based on proximity of the first resource elements to at least one demodulation reference signal symbol within the transmission resource.

In some examples, the demapping component 1525 may demap the second encoded feedback codebook to second resource elements remaining within the transmission resource after demapping of the first encoded feedback codebook to the first resource elements. In some examples, the demapping component 1525 may demap the first encoded feedback codebook and the second encoded feedback codebook from a set of spatial layers, where the first encoded feedback codebook and the second encoded feedback codebook are received via the transmission resource using the set of spatial layers.

In some examples, the demapping component 1525 may demap at least a portion of the first encoded feedback codebook from an earliest symbol of the transmission resource that does not include a front-loaded demodulation reference signal symbol. In some examples, the demapping component 1525 may de-rate match the second encoded feedback codebook around resources within the transmission resource allocated to the first encoded feedback codebook.

In some examples, the demapping component 1525 may demap the first encoded feedback codebook from a symbol of the transmission resource that occurs prior to a demodulation reference signal symbol in the transmission resource. In some examples, the demapping component 1525 may de-rate match the second encoded feedback codebook within the transmission resource around resources allocated to the first encoded feedback codebook. In some examples, the demapping component 1525 may demap bits of the first encoded feedback codebook from respective frequency hops based on an interleaving pattern.

In some examples, the demapping component 1525 may demap a bit of the first encoded feedback codebook repeated on respective frequency hops. In some examples, the demapping component 1525 may demap data to the transmission resource based on a first size of the first feedback codebook, a second size of the second feedback codebook, or both.

In some examples, the demapping component 1525 may determine that the data mapped to the transmission resource is punctured with one or more bits of the first encoded feedback codebook, the second encoded feedback codebook, or both, based on a total of the first size and the second size satisfying a threshold. In some examples, the demapping component 1525 may determine the data mapped to the transmission resource is punctured with one or more bits of the first encoded feedback codebook based on the first feedback size satisfying a threshold.

In some examples, the demapping component 1525 may de-rate match the data within the transmission resource around a mapping of the second encoded feedback codebook to the transmission resource based on a total of the first size and the second size not satisfying the threshold. In some examples, the demapping component 1525 may de-rate match the data within the transmission resource around a mapping of the first encoded feedback codebook and the second encoded feedback codebook to the transmission resource based on the first size not satisfying a threshold.

In some examples, the demapping component 1525 may de-rate match the data within the transmission resource around a mapping of the first encoded feedback codebook and the second encoded feedback codebook to the transmission resource based on a transmitting a grant of the transmission resource indicating the first size, the second size, or both. In some examples, the demapping component 1525 may determine that the data mapped to the transmission resource is punctured with one or more bits of the first encoded feedback codebook, the second encoded feedback codebook, or both, based on a receiving a grant of the transmission resource that does not indicate the first size or the second size. In some examples, the demapping component 1525 may demap encoded channel state information from the shared data channel resource.

The decoding component 1530 may decode the first encoded feedback codebook using a first coding rate to generate a first feedback codebook and the second encoded feedback codebook using a second coding rate that differs from the first coding rate to generate a second feedback codebook. In some examples, the decoding component 1530 may determine the first coding rate that corresponds to the first resource.

In some examples, the decoding component 1530 may determine the second coding rate that corresponds to the second resource. In some examples, the decoding component 1530 may determine the second coding rate based on the ratio and the first coding rate.

In some examples, the decoding component 1530 may adjust the second coding rate based on determining that a sum of the first resource amount and the second resource amount exceeds an available amount of resources for the transmission resource. In some examples, the decoding component 1530 may adjust a size of a payload for the second feedback codebook to partially drop a portion of the second feedback codebook based on determining that a sum of the first resource amount and the second resource amount exceeds an available amount of resources for the transmission resource.

In some examples, the decoding component 1530 may apply a first cyclic shift of a set of different cyclic shifts to a bit sequence to generate a shifted bit sequence to decode at least one bit of the first feedback codebook, at least one bit of the second feedback codebook, or both. In some examples, the decoding component 1530 may adjust from a first modulation scheme to a second modulation scheme based on a size of the first feedback codebook being a single bit. In some examples, the decoding component 1530 may demodulate a bit of the first encoded feedback codebook and a bit of the second encoded feedback codebook based on the second modulation scheme.

In some examples, the decoding component 1530 may demodulate the first feedback codebook and the second feedback codebook using a same modulation order as applied to modulate data on the shared data channel resource. In some examples, the decoding component 1530 may decode the encoded channel state information using a third coding rate. In some examples, the decoding component 1530 may determine that reporting of the channel state information has been dropped based on the transmission resource being a shared data channel resource for the second service type. In some cases, the first modulation scheme is binary phase shift keying modulation scheme and the second modulation scheme is quadrature phase shift keying modulation scheme.

Figure 16:
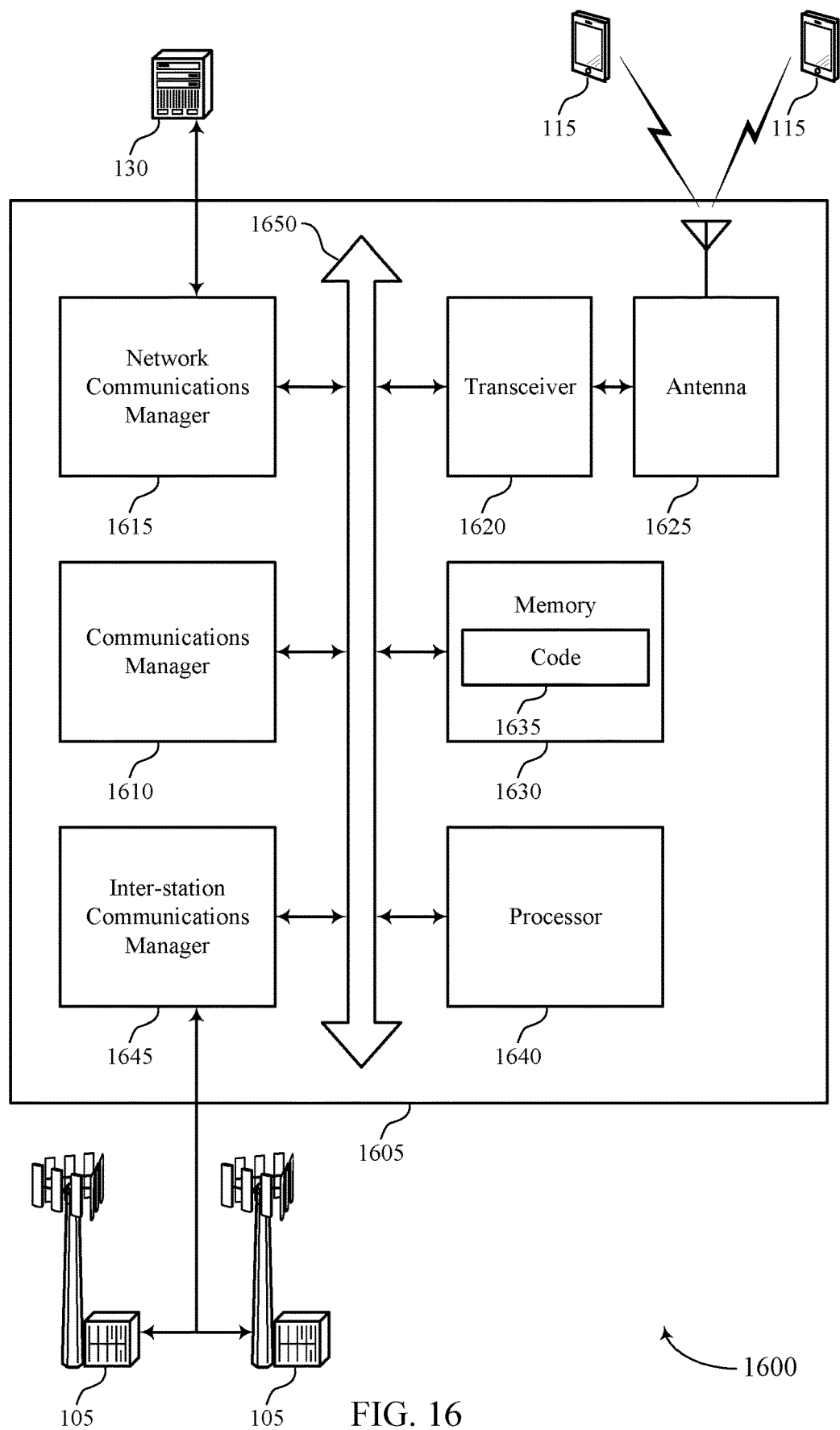
FIG. 16 shows a diagram of a system including a device in accordance with aspects of the present disclosure.

FIG. 16 shows a diagram of a system 1600 including a device 1605 in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit a first transmission for a first service type and a second transmission for a second service type, the first service type having a lower latency specification and a higher reliability specification than the second service type, determine a first resource amount to be utilized for transmission of a first feedback codebook for the first service type and a second resource amount to be utilized for transmission of a second feedback codebook for the second service type based on a multiplexing condition being satisfied, receive the first encoded feedback codebook and the second encoded feedback codebook via a transmission resource, demap the first encoded feedback codebook and the second encoded feedback codebook based on the first resource amount and the second resource amount, and decode the first encoded feedback codebook using a first coding rate to generate a first feedback codebook and the second encoded feedback codebook using a second coding rate that differs from the first coding rate to generate a second feedback codebook.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor

1640. The processor 1640 may be configured to execute computer-readable instructions stored in a memory (e.g., the memory 1630) to cause the device 1605 to perform various functions (e.g., functions or tasks supporting encoding and resource mapping for multiplexing feedback codebooks).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
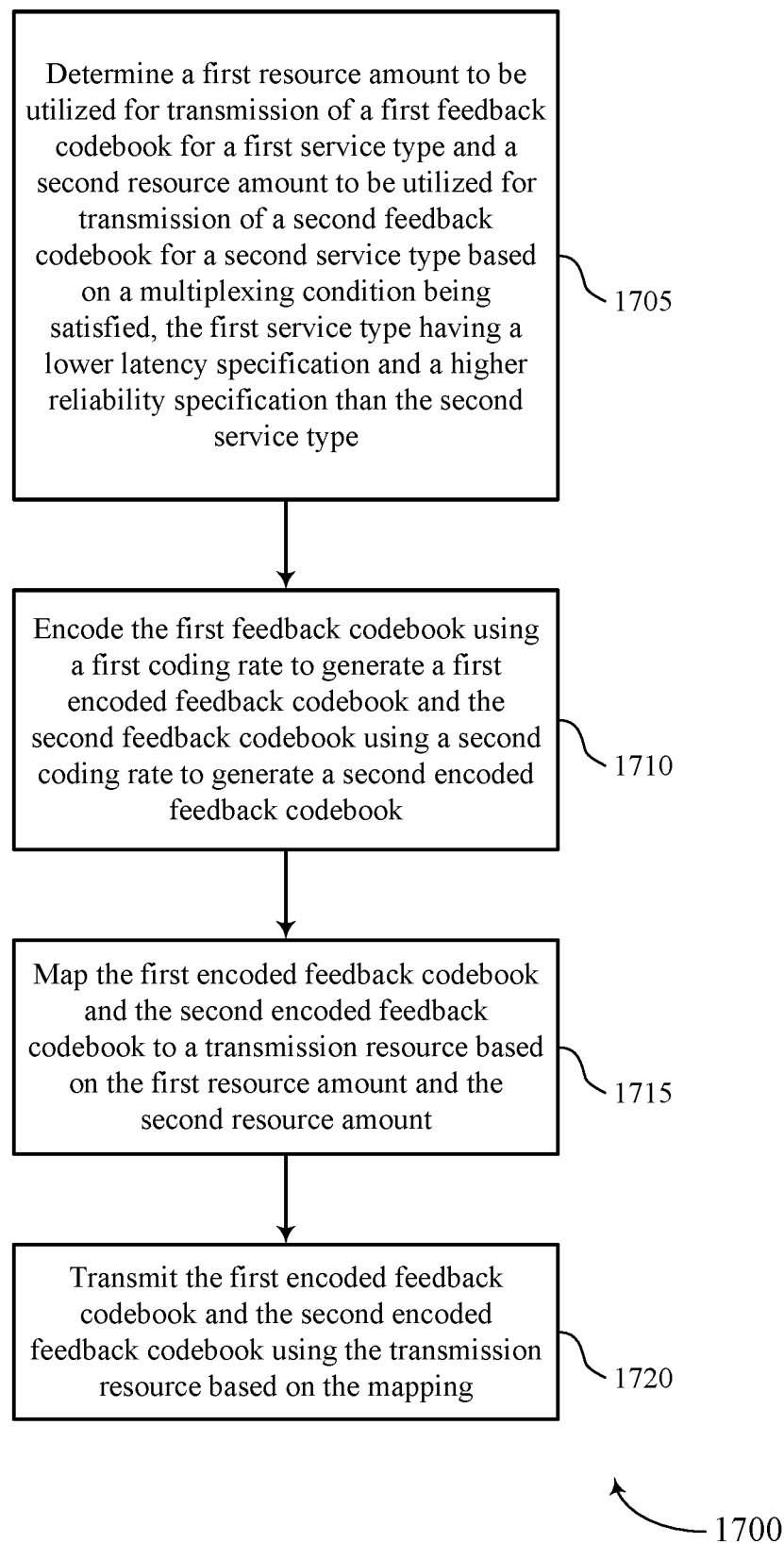
FIGS. 17 through 27 show flowcharts illustrating methods in accordance with aspects of the present disclosure.

FIG. 17 shows a flowchart illustrating a method 1700 in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 1705 may be performed according to the methods described herein. In some examples, aspects of the operations of 1705 may be performed by a resource identifying component as described with reference to FIGS. 9 through 12.

At 1710, the UE may encode the first feedback codebook using a first coding rate to generate a first encoded feedback codebook and the second feedback codebook using a second coding rate to generate a second encoded feedback codebook. The operations of 1710 may be performed according to the methods described herein. In some examples, aspects of the operations of 1710 may be performed by an encoding component as described with reference to FIGS. 9 through 12.

At 1715, the UE may map the first encoded feedback codebook and the second encoded feedback codebook to a transmission resource based on the first resource amount and the second resource amount. The operations of 1715 may be performed according to the methods described herein. In some examples, aspects of the operations of 1715 may be performed by a resource mapping component as described with reference to FIGS. 9 through 12.

At 1720, the UE may transmit the first encoded feedback codebook and the second encoded feedback codebook using the transmission resource based on the mapping. The operations of 1720 may be performed according to the methods described herein. In some examples, aspects of the operations of 1720 may be performed by a transmitting component as described with reference to FIGS. 9 through 12.

Figure 18:
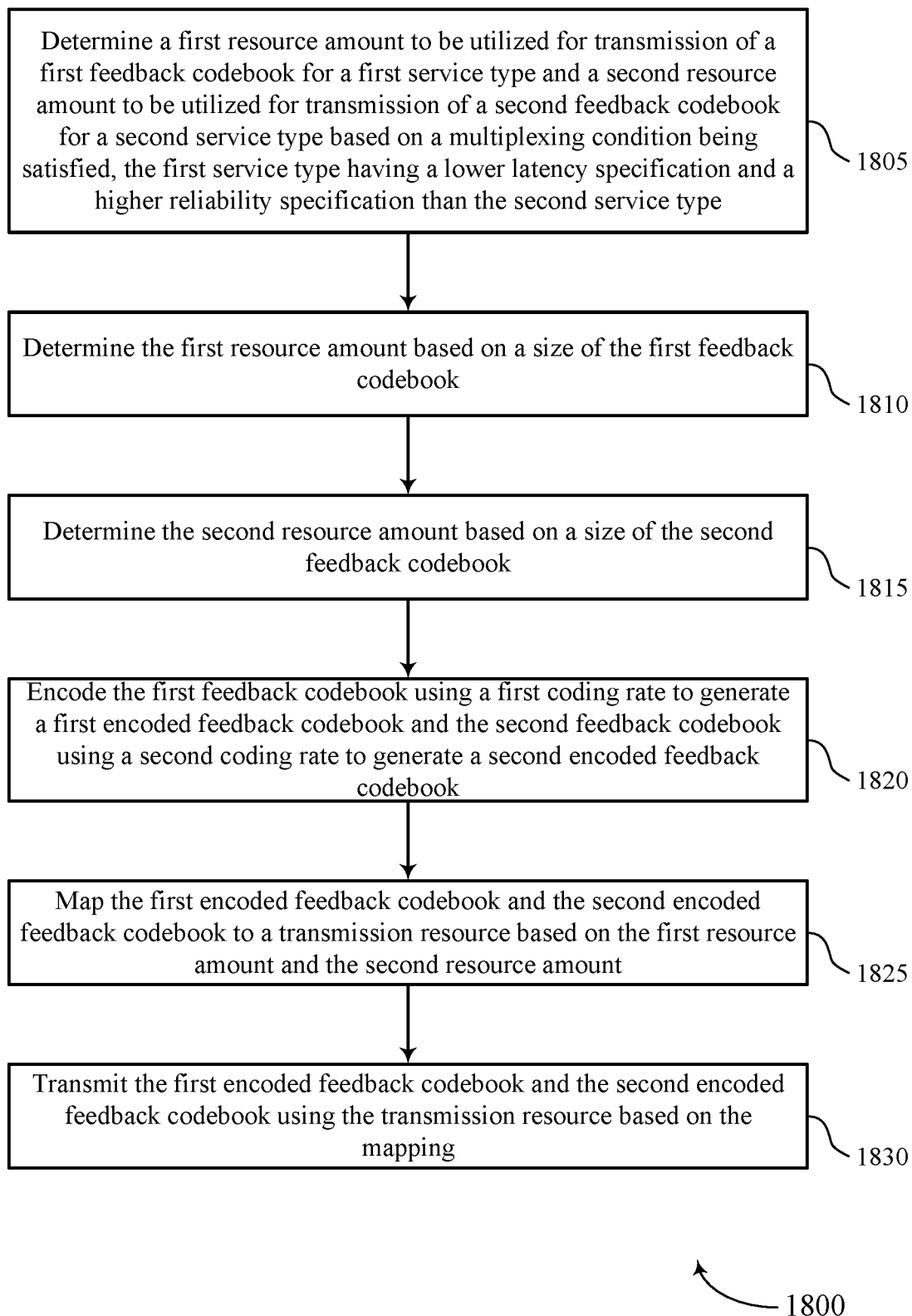

FIG. 18 shows a flowchart illustrating a method 1800 in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 1805 may be performed according to the methods described herein. In some examples, aspects of the operations of 1805 may be performed by a resource identifying component as described with reference to FIGS. 9 through 12.

At 1810, the UE may determine the first resource amount based on a size of the first feedback codebook. The operations of 1810 may be performed according to the methods described herein. In some examples, aspects of the operations of 1810 may be performed by a resource identifying component as described with reference to FIGS. 9 through 12.

At 1815, the UE may determine the second resource amount based on a size of the second feedback codebook. The operations of 1815 may be performed according to the methods described herein. In some examples, aspects of the operations of 1815 may be performed by a resource identifying component as described with reference to FIGS. 9 through 12.

At 1820, the UE may encode the first feedback codebook using a first coding rate to generate a first encoded feedback codebook and the second feedback codebook using a second coding rate to generate a second encoded feedback codebook. The operations of 1820 may be performed according to the methods described herein. In some examples, aspects of the operations of 1820 may be performed by an encoding component as described with reference to FIGS. 9 through 12.

At 1825, the UE may map the first encoded feedback codebook and the second encoded feedback codebook to a transmission resource based on the first resource amount and the second resource amount. The operations of 1825 may be performed according to the methods described herein. In some examples, aspects of the operations of 1825 may be performed by a resource mapping component as described with reference to FIGS. 9 through 12.

At 1830, the UE may transmit the first encoded feedback codebook and the second encoded feedback codebook using the transmission resource based on the mapping. The operations of 1830 may be performed according to the methods described herein. In some examples, aspects of the operations of 1830 may be performed by a transmitting component as described with reference to FIGS. 9 through 12.

Figure 19:
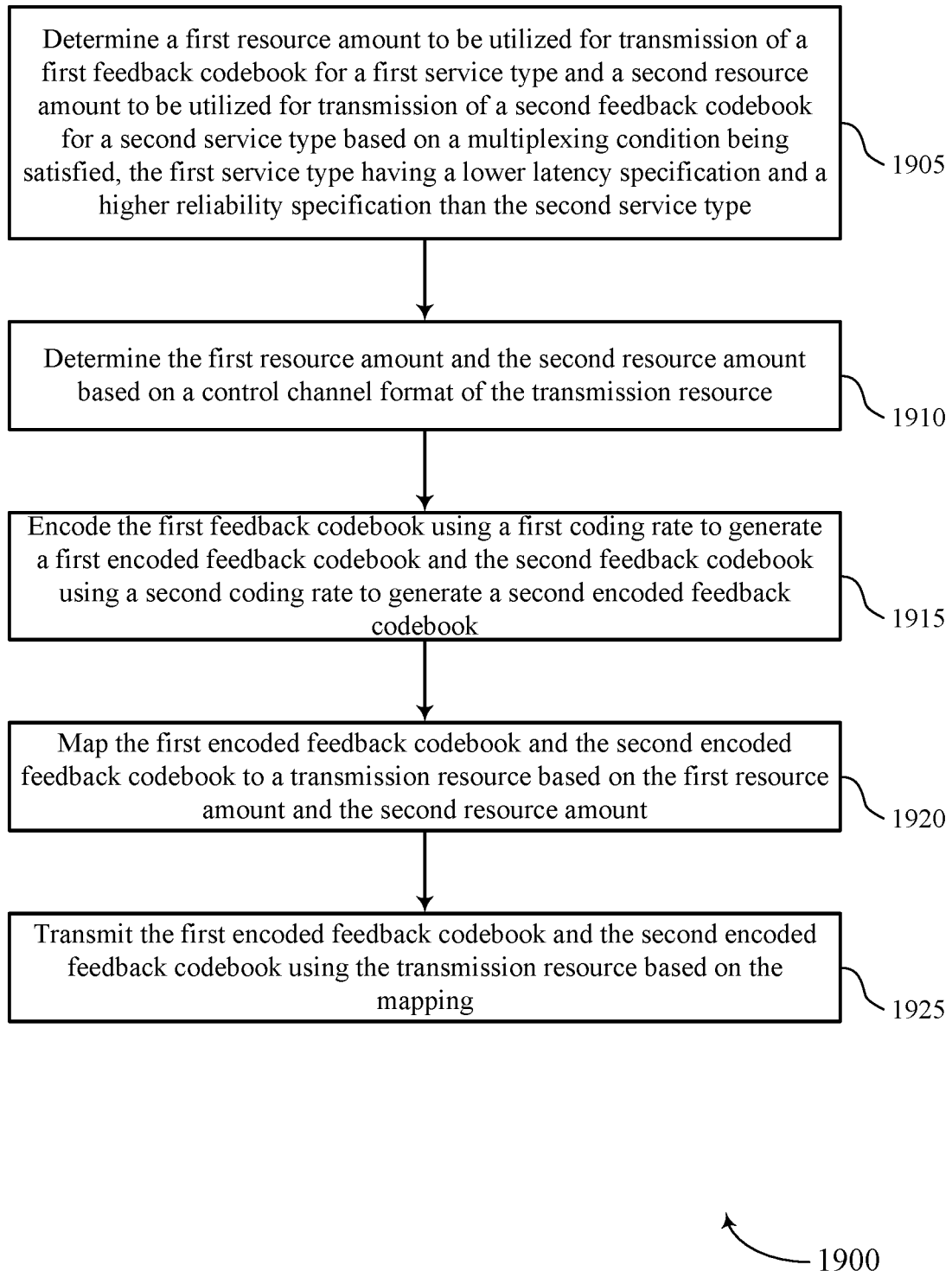

FIG. 19 shows a flowchart illustrating a method 1900 in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 1905 may be performed according to the methods described herein. In some examples, aspects of the operations of 1905 may be performed by a resource identifying component as described with reference to FIGS. 9 through 12.

At 1910, the UE may determine the first resource amount and the second resource amount based on a control channel format of the transmission resource. The operations of 1910 may be performed according to the methods described herein. In some examples, aspects of the operations of 1910 may be performed by a resource identifying component as described with reference to FIGS. 9 through 12.

At 1915, the UE may encode the first feedback codebook using a first coding rate to generate a first encoded feedback codebook and the second feedback codebook using a second coding rate to generate a second encoded feedback codebook. The operations of 1915 may be performed according to the methods described herein. In some examples, aspects of the operations of 1915 may be performed by an encoding component as described with reference to FIGS. 9 through 12.

At 1920, the UE may map the first encoded feedback codebook and the second encoded feedback codebook to a transmission resource based on the first resource amount and the second resource amount. The operations of 1920 may be performed according to the methods described herein. In some examples, aspects of the operations of 1920 may be performed by a resource mapping component as described with reference to FIGS. 9 through 12.

At 1925, the UE may transmit the first encoded feedback codebook and the second encoded feedback codebook using the transmission resource based on the mapping. The operations of 1925 may be performed according to the methods described herein. In some examples, aspects of the operations of 1925 may be performed by a transmitting component as described with reference to FIGS. 9 through 12.

Figure 20:
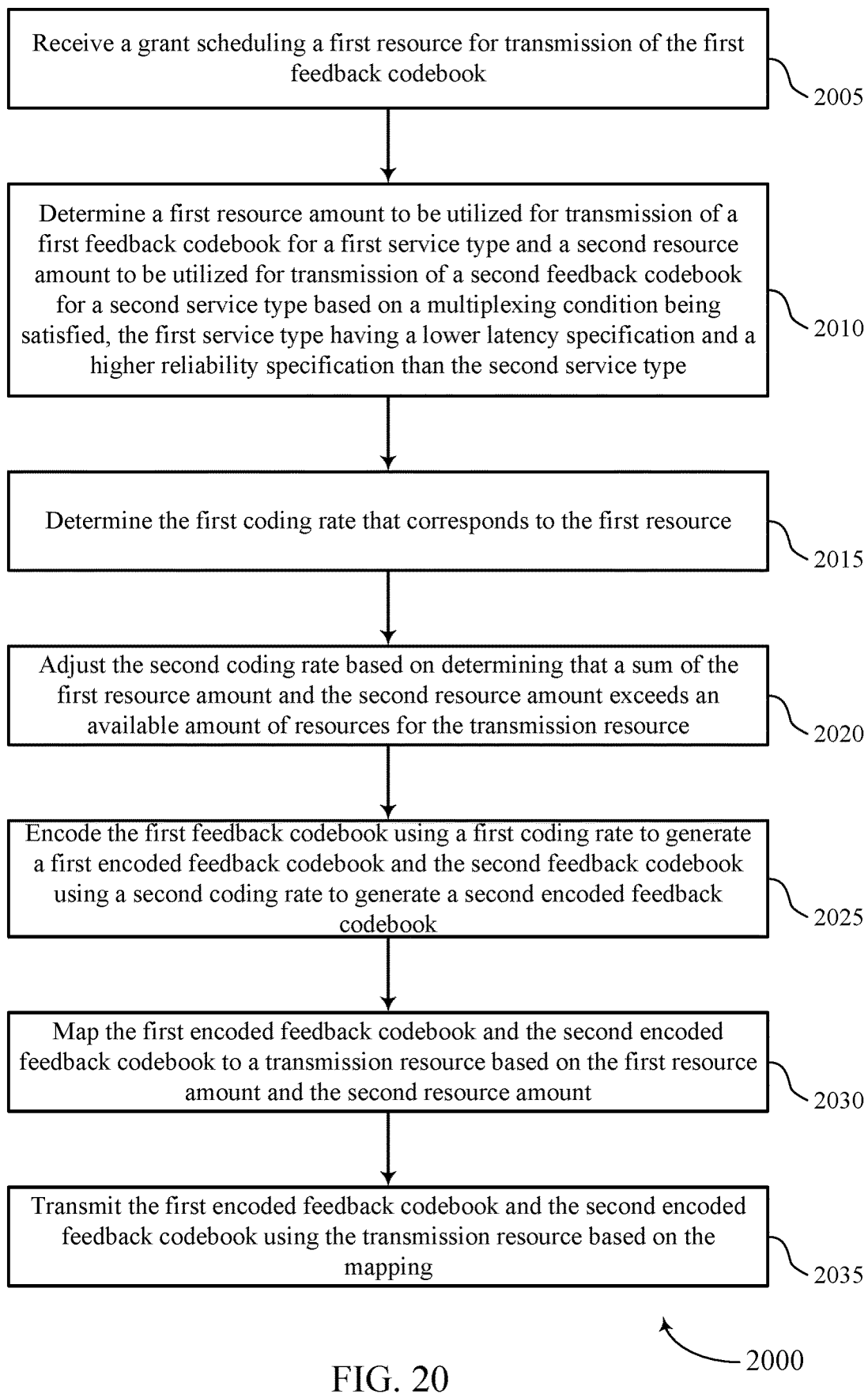

FIG. 20 shows a flowchart illustrating a method 2000 in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may receive a grant scheduling a first resource for transmission of the first feedback codebook. The operations of 2005 may be performed according to the methods described herein. In some examples, aspects of the operations of 2005 may be performed by a receiving component as described with reference to FIGS. 9 through 12.

At 2010, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 2010 may be performed according to the methods described herein. In some examples, aspects of the operations of 2010 may be performed by a resource identifying component as described with reference to FIGS. 9 through 12.

At 2015, the UE may determine the first coding rate that corresponds to the first resource. The operations of 2015 may be performed according to the methods described herein. In some examples, aspects of the operations of 2015 may be performed by an encoding component as described with reference to FIGS. 9 through 12.

At 2020, the UE may adjust the second coding rate based on determining that a sum of the first resource amount and the second resource amount exceeds an available amount of resources for the transmission resource. The operations of 2020 may be performed according to the methods described herein. In some examples, aspects of the operations of 2020 may be performed by an encoding component as described with reference to FIGS. 9 through 12.

At 2025, the UE may encode the first feedback codebook using a first coding rate to generate a first encoded feedback codebook and the second feedback codebook using a second coding rate to generate a second encoded feedback codebook. The operations of 2025 may be performed according to the methods described herein. In some examples, aspects of the operations of 2025 may be performed by an encoding component as described with reference to FIGS. 9 through 12.

At 2030, the UE may map the first encoded feedback codebook and the second encoded feedback codebook to a transmission resource based on the first resource amount and the second resource amount. The operations of 2030 may be performed according to the methods described herein. In some examples, aspects of the operations of 2030 may be performed by a resource mapping component as described with reference to FIGS. 9 through 12.

At 2035, the UE may transmit the first encoded feedback codebook and the second encoded feedback codebook using the transmission resource based on the mapping. The operations of 2035 may be performed according to the methods described herein. In some examples, aspects of the operations of 2035 may be performed by a transmitting component as described with reference to FIGS. 9 through 12.

Figure 21:
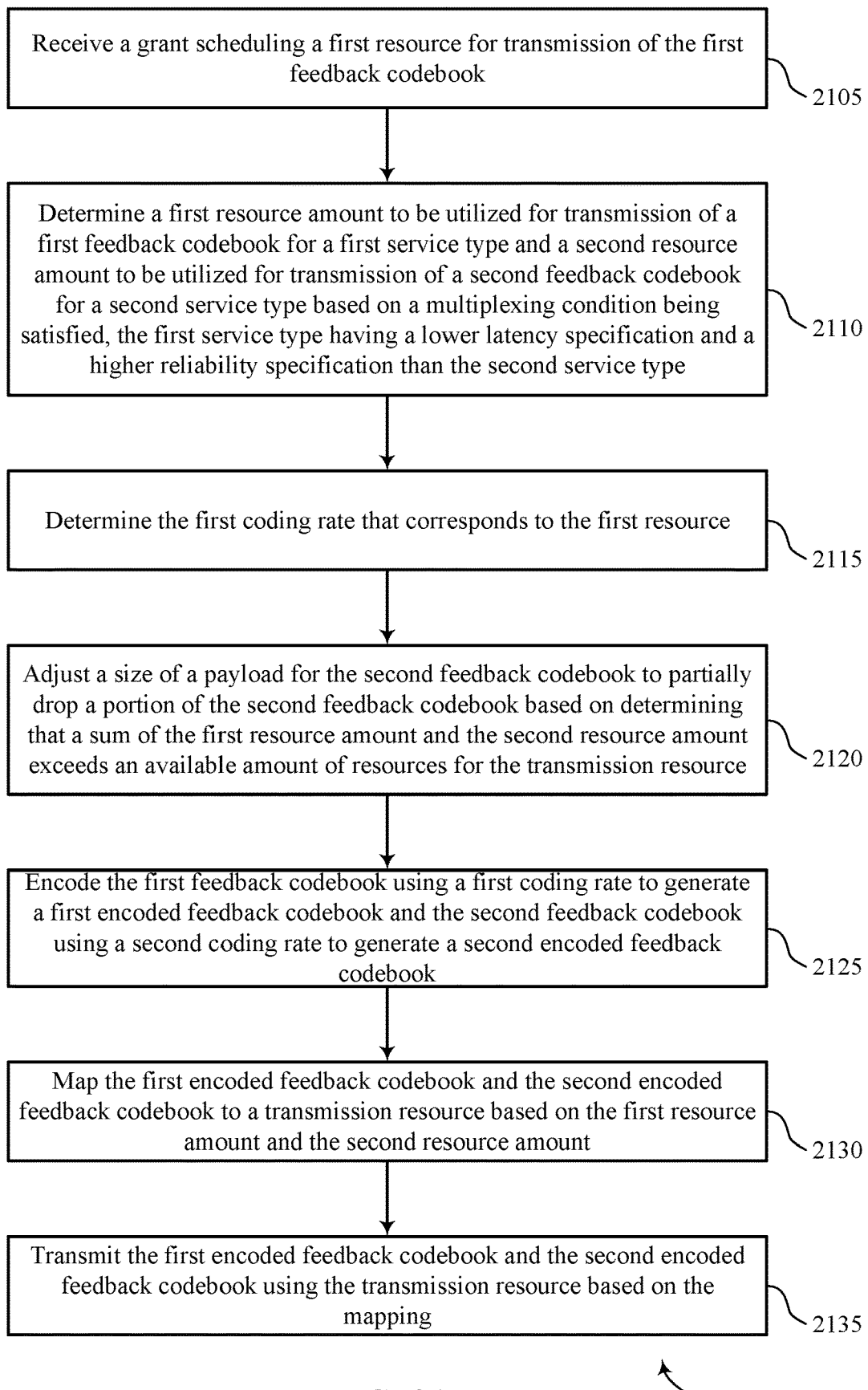

FIG. 21 shows a flowchart illustrating a method 2100 in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2105, the UE may receive a grant scheduling a first resource for transmission of the first feedback codebook.

The operations of 2105 may be performed according to the methods described herein. In some examples, aspects of the operations of 2105 may be performed by a receiving component as described with reference to FIGS. 9 through 12.

At 2110, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 2110 may be performed according to the methods described herein. In some examples, aspects of the operations of 2110 may be performed by a resource identifying component as described with reference to FIGS. 9 through 12.

At 2115, the UE may determine the first coding rate that corresponds to the first resource. The operations of 2115 may be performed according to the methods described herein. In some examples, aspects of the operations of 2115 may be performed by an encoding component as described with reference to FIGS. 9 through 12.

At 2120, the UE may adjust a size of a payload for the second feedback codebook to partially drop a portion of the second feedback codebook based on determining that a sum of the first resource amount and the second resource amount exceeds an available amount of resources for the transmission resource. The operations of 2120 may be performed according to the methods described herein. In some examples, aspects of the operations of 2120 may be performed by an encoding component as described with reference to FIGS. 9 through 12.

At 2125, the UE may encode the first feedback codebook using a first coding rate to generate a first encoded feedback codebook and the second feedback codebook using a second coding rate to generate a second encoded feedback codebook. The operations of 2125 may be performed according to the methods described herein. In some examples, aspects of the operations of 2125 may be performed by an encoding component as described with reference to FIGS. 9 through 12.

At 2130, the UE may map the first encoded feedback codebook and the second encoded feedback codebook to a transmission resource based on the first resource amount and the second resource amount. The operations of 2130 may be performed according to the methods described herein. In some examples, aspects of the operations of 2130 may be performed by a resource mapping component as described with reference to FIGS. 9 through 12.

At 2135, the UE may transmit the first encoded feedback codebook and the second encoded feedback codebook using the transmission resource based on the mapping. The operations of 2135 may be performed according to the methods described herein. In some examples, aspects of the operations of 2135 may be performed by a transmitting component as described with reference to FIGS. 9 through 12.

Figure 22:
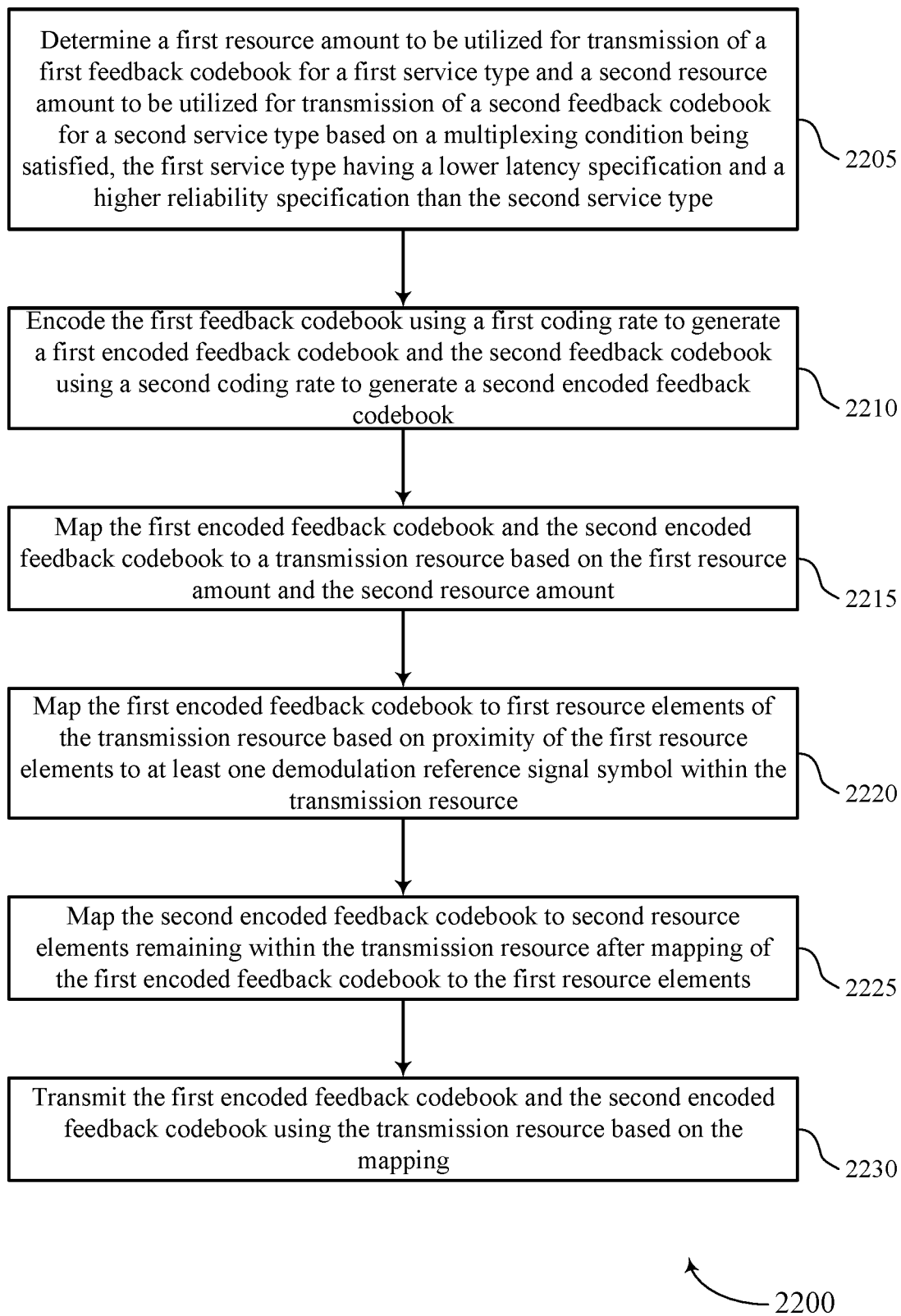

FIG. 22 shows a flowchart illustrating a method 2200 in accordance with aspects of the present disclosure. The operations of method 2200 may be implemented by a UE 115 or its components as described herein. For example, the operations of method 2200 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2205, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 2205 may be performed according to the methods described herein. In some examples, aspects of the operations of 2205 may be performed by a resource identifying component as described with reference to FIGS. 9 through 12.

At 2210, the UE may encode the first feedback codebook using a first coding rate to generate a first encoded feedback codebook and the second feedback codebook using a second coding rate to generate a second encoded feedback codebook. The operations of 2210 may be performed according to the methods described herein. In some examples, aspects of the operations of 2210 may be performed by an encoding component as described with reference to FIGS. 9 through 12.

At 2215, the UE may map the first encoded feedback codebook and the second encoded feedback codebook to a transmission resource based on the first resource amount and the second resource amount. The operations of 2215 may be performed according to the methods described herein. In some examples, aspects of the operations of 2215 may be performed by a resource mapping component as described with reference to FIGS. 9 through 12.

At 2220, the UE may map the first encoded feedback codebook to first resource elements of the transmission resource based on proximity of the first resource elements to at least one demodulation reference signal symbol within the transmission resource. The operations of 2220 may be performed according to the methods described herein. In some examples, aspects of the operations of 2220 may be performed by a resource mapping component as described with reference to FIGS. 9 through 12.

At 2225, the UE may map the second encoded feedback codebook to second resource elements remaining within the transmission resource after mapping of the first encoded feedback codebook to the first resource elements. The operations of 2225 may be performed according to the methods described herein. In some examples, aspects of the operations of 2225 may be performed by a resource mapping component as described with reference to FIGS. 9 through 12.

At 2230, the UE may transmit the first encoded feedback codebook and the second encoded feedback codebook using the transmission resource based on the mapping. The operations of 2230 may be performed according to the methods described herein. In some examples, aspects of the operations of 2230 may be performed by a transmitting component as described with reference to FIGS. 9 through 12.

Figure 23:
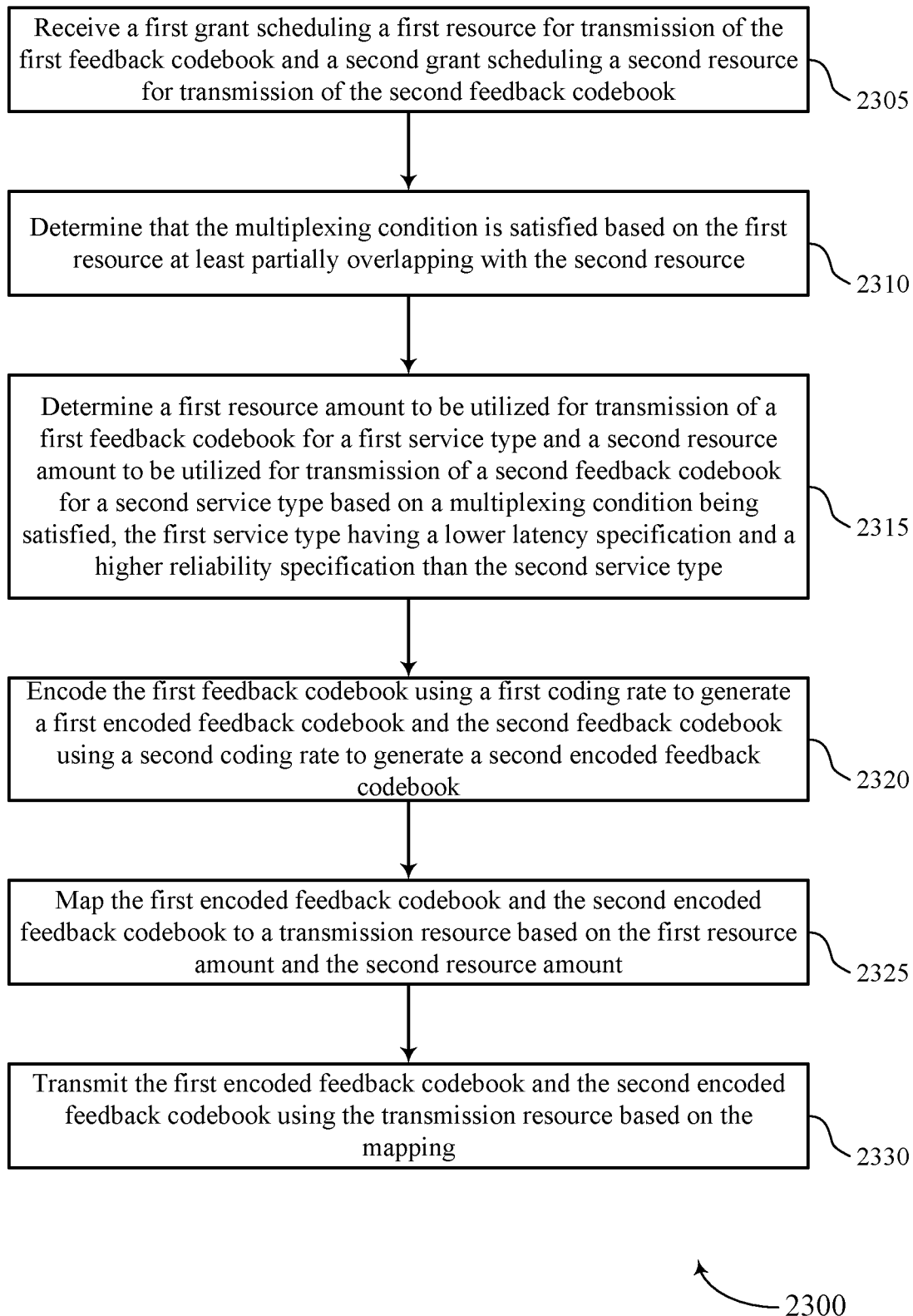

FIG. 23 shows a flowchart illustrating a method 2300 in accordance with aspects of the present disclosure. The operations of method 2300 may be implemented by a UE 115 or its components as described herein. For example, the operations of method 2300 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2305, the UE may receive a first grant scheduling a first resource for transmission of the first feedback codebook and a second grant scheduling a second resource for transmission of the second feedback codebook. The operations of 2305 may be performed according to the methods described herein. In some examples, aspects of the operations of 2305 may be performed by a receiving component as described with reference to FIGS. 9 through 12.

At 2310, the UE may determine that the multiplexing condition is satisfied based on the first resource at least partially overlapping with the second resource. The operations of 2310 may be performed according to the methods described herein. In some examples, aspects of the operations of 2310 may be performed by an encoding component as described with reference to FIGS. 9 through 12.

At 2315, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 2315 may be performed according to the methods described herein. In some examples, aspects of the operations of 2315 may be performed by a resource identifying component as described with reference to FIGS. 9 through 12.

At 2320, the UE may encode the first feedback codebook using a first coding rate to generate a first encoded feedback codebook and the second feedback codebook using a second coding rate to generate a second encoded feedback codebook. The operations of 2320 may be performed according to the methods described herein. In some examples, aspects of the operations of 2320 may be performed by an encoding component as described with reference to FIGS. 9 through 12.

At 2325, the UE may map the first encoded feedback codebook and the second encoded feedback codebook to a transmission resource based on the first resource amount and the second resource amount. The operations of 2325 may be performed according to the methods described herein. In some examples, aspects of the operations of 2325 may be performed by a resource mapping component as described with reference to FIGS. 9 through 12.

At 2330, the UE may transmit the first encoded feedback codebook and the second encoded feedback codebook using the transmission resource based on the mapping. The operations of 2330 may be performed according to the methods described herein. In some examples, aspects of the operations of 2330 may be performed by a transmitting component as described with reference to FIGS. 9 through 12.

Figure 24:
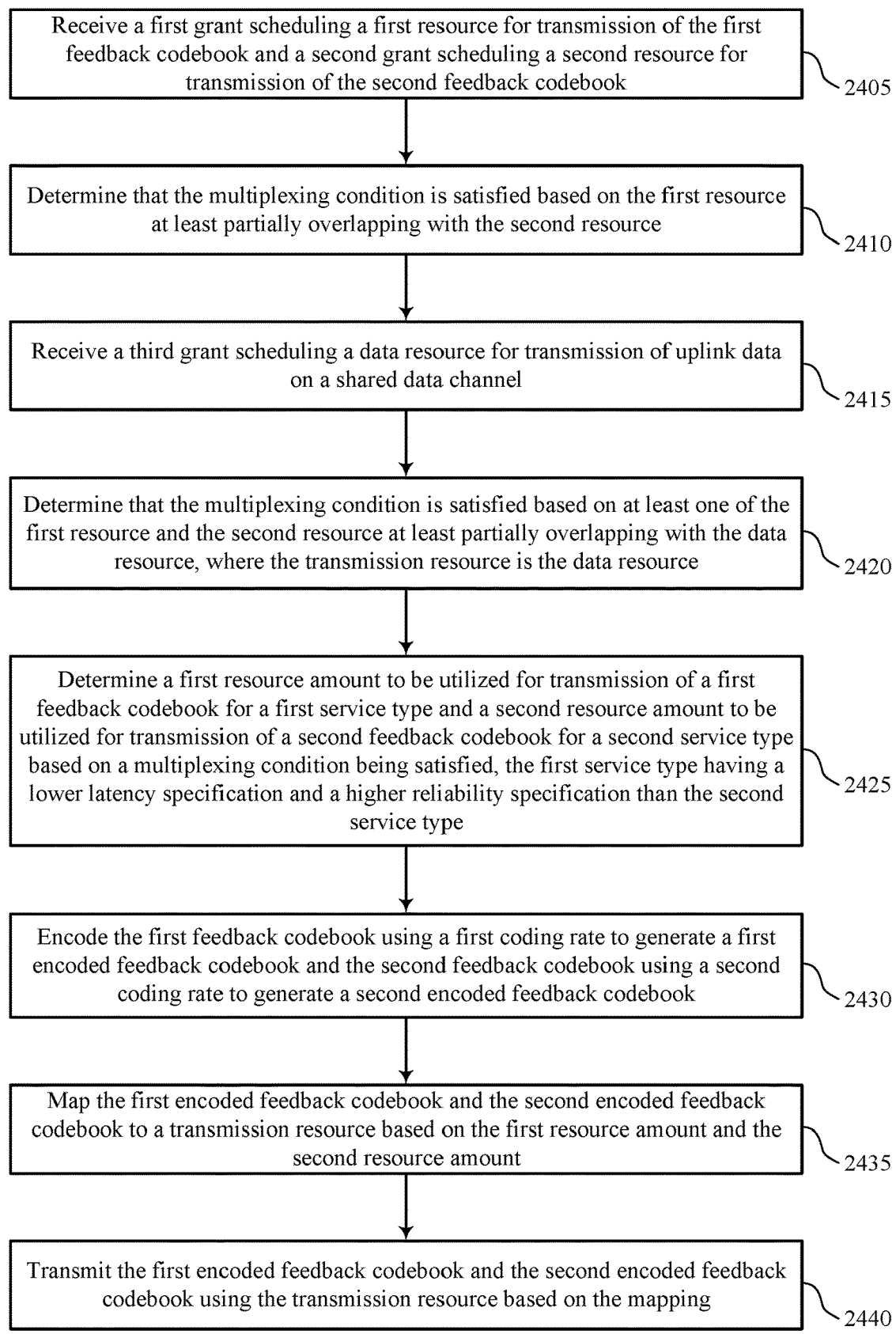

FIG. 24 shows a flowchart illustrating a method 2400 in accordance with aspects of the present disclosure. The operations of method 2400 may be implemented by a UE 115 or its components as described herein. For example, the operations of method 2400 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2405, the UE may receive a first grant scheduling a first resource for transmission of the first feedback codebook and a second grant scheduling a second resource for transmission of the second feedback codebook. The operations of 2405 may be performed according to the methods described herein. In some examples, aspects of the operations of 2405 may be performed by a receiving component as described with reference to FIGS. 9 through 12.

At 2410, the UE may determine that the multiplexing condition is satisfied based on the first resource at least partially overlapping with the second resource. The operations of 2410 may be performed according to the methods described herein. In some examples, aspects of the operations of 2410 may be performed by an encoding component as described with reference to FIGS. 9 through 12.

At 2415, the UE may receive a third grant scheduling a data resource for transmission of uplink data on a shared data channel. The operations of 2415 may be performed according to the methods described herein. In some examples, aspects of the operations of 2415 may be performed by a receiving component as described with reference to FIGS. 9 through 12.

At 2420, the UE may determine that the multiplexing condition is satisfied based on at least one of the first resource and the second resource at least partially overlapping with the data resource, where the transmission resource is the data resource. The operations of 2420 may be performed according to the methods described herein. In some examples, aspects of the operations of 2420 may be performed by a resource identifying component as described with reference to FIGS. 9 through 12.

At 2425, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 2425 may be performed according to the methods described herein. In some examples, aspects of the operations of 2425 may be performed by a resource identifying component as described with reference to FIGS. 9 through 12.

At 2430, the UE may encode the first feedback codebook using a first coding rate to generate a first encoded feedback codebook and the second feedback codebook using a second coding rate to generate a second encoded feedback codebook. The operations of 2430 may be performed according to the methods described herein. In some examples, aspects of the operations of 2430 may be performed by an encoding component as described with reference to FIGS. 9 through 12.

At 2435, the UE may map the first encoded feedback codebook and the second encoded feedback codebook to a transmission resource based on the first resource amount and the second resource amount. The operations of 2435 may be performed according to the methods described herein. In some examples, aspects of the operations of 2435 may be performed by a resource mapping component as described with reference to FIGS. 9 through 12.

At 2440, the UE may transmit the first encoded feedback codebook and the second encoded feedback codebook using the transmission resource based on the mapping. The operations of 2440 may be performed according to the methods described herein. In some examples, aspects of the operations of 2440 may be performed by a transmitting component as described with reference to FIGS. 9 through 12.

Figure 25:
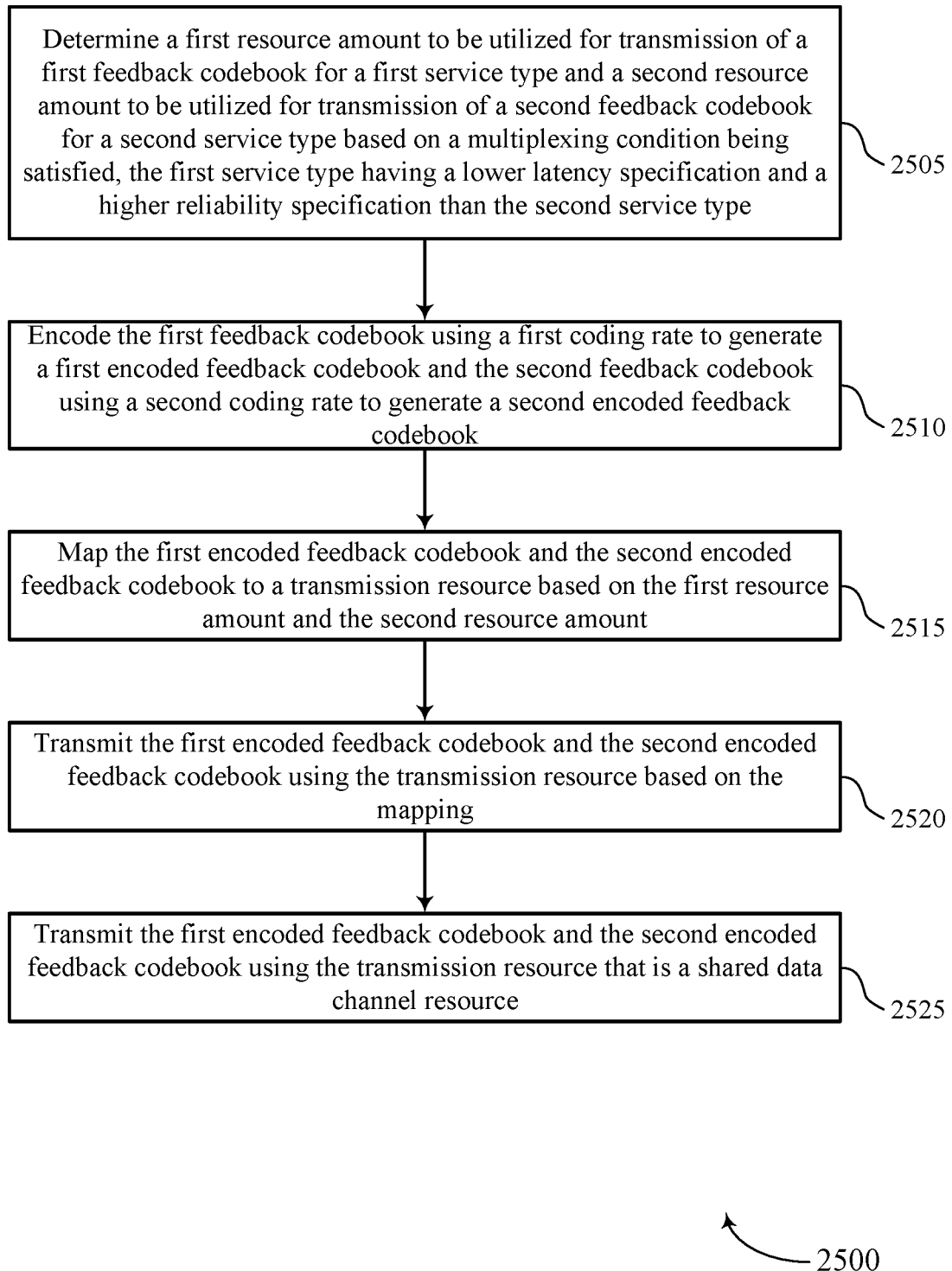

FIG. 25 shows a flowchart illustrating a method 2500 in accordance with aspects of the present disclosure. The operations of method 2500 may be implemented by a UE 115 or its components as described herein. For example, the operations of method 2500 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2505, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 2505 may be performed according to the methods described herein. In some examples, aspects of the operations of 2505 may be performed by a resource identifying component as described with reference to FIGS. 9 through 12.

At 2510, the UE may encode the first feedback codebook using a first coding rate to generate a first encoded feedback codebook and the second feedback codebook using a second coding rate to generate a second encoded feedback codebook. The operations of 2510 may be performed according to the methods described herein. In some examples, aspects of the operations of 2510 may be performed by an encoding component as described with reference to FIGS. 9 through 12.

At 2515, the UE may map the first encoded feedback codebook and the second encoded feedback codebook to a transmission resource based on the first resource amount and the second resource amount. The operations of 2515 may be performed according to the methods described herein. In some examples, aspects of the operations of 2515 may be performed by a resource mapping component as described with reference to FIGS. 9 through 12.

At 2520, the UE may transmit the first encoded feedback codebook and the second encoded feedback codebook using the transmission resource based on the mapping. The operations of 2520 may be performed according to the methods described herein. In some examples, aspects of the operations of 2520 may be performed by a transmitting component as described with reference to FIGS. 9 through 12.

At 2525, the UE may transmit the first encoded feedback codebook and the second encoded feedback codebook using the transmission resource that is a shared data channel resource. The operations of 2525 may be performed according to the methods described herein. In some examples, aspects of the operations of 2525 may be performed by a transmitting component as described with reference to FIGS. 9 through 12.

Figure 26:
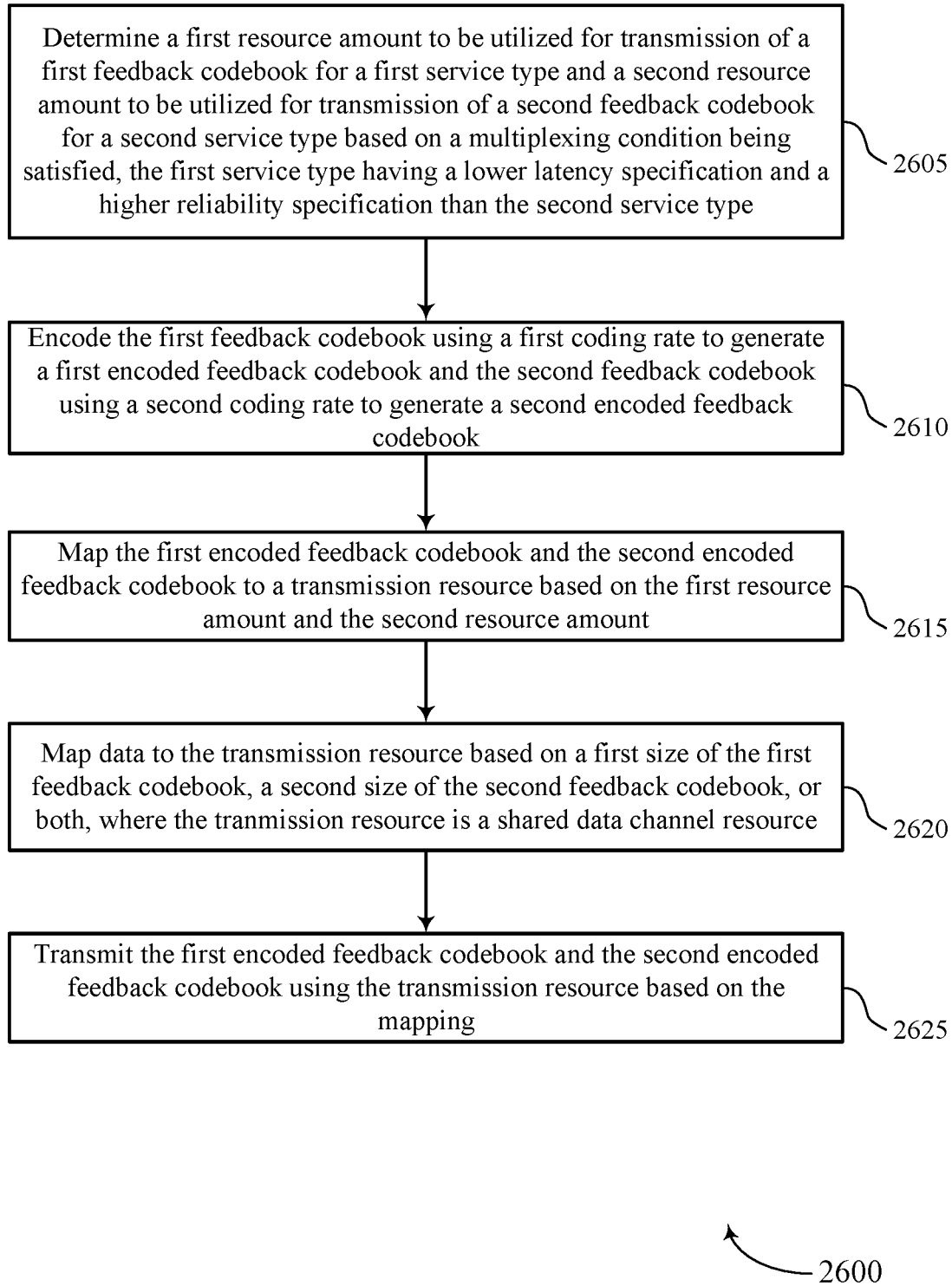

FIG. 26 shows a flowchart illustrating a method 2600 in accordance with aspects of the present disclosure. The operations of method 2600 may be implemented by a UE 115 or its components as described herein. For example, the operations of method 2600 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2605, the UE may determine a first resource amount to be utilized for transmission of a first feedback codebook for a first service type and a second resource amount to be utilized for transmission of a second feedback codebook for a second service type based on a multiplexing condition being satisfied, the first service type having a lower latency specification and a higher reliability specification than the second service type. The operations of 2605 may be performed according to the methods described herein. In some examples, aspects of the operations of 2605 may be performed by a resource identifying component as described with reference to FIGS. 9 through 12.

At 2610, the UE may encode the first feedback codebook using a first coding rate to generate a first encoded feedback codebook and the second feedback codebook using a second coding rate to generate a second encoded feedback codebook. The operations of 2610 may be performed according to the methods described herein. In some examples, aspects of the operations of 2610 may be performed by an encoding component as described with reference to FIGS. 9 through 12.

At 2615, the UE may map the first encoded feedback codebook and the second encoded feedback codebook to a transmission resource based on the first resource amount and the second resource amount. The operations of 2615 may be performed according to the methods described herein. In some examples, aspects of the operations of 2615 may be performed by a resource mapping component as described with reference to FIGS. 9 through 12.

At 2620, the UE may map data to the transmission resource based on a first size of the first feedback codebook, a second size of the second feedback codebook, or both, where the transmission resource is a shared data channel resource. The operations of 2620 may be performed according to the methods described herein. In some examples, aspects of the operations of 2620 may be performed by a resource mapping component as described with reference to FIGS. 9 through 12.

At 2625, the UE may transmit the first encoded feedback codebook and the second encoded feedback codebook using the transmission resource based on the mapping. The operations of 2625 may be performed according to the methods described herein. In some examples, aspects of the operations of 2625 may be performed by a transmitting component as described with reference to FIGS. 9 through 12.

Figure 27:
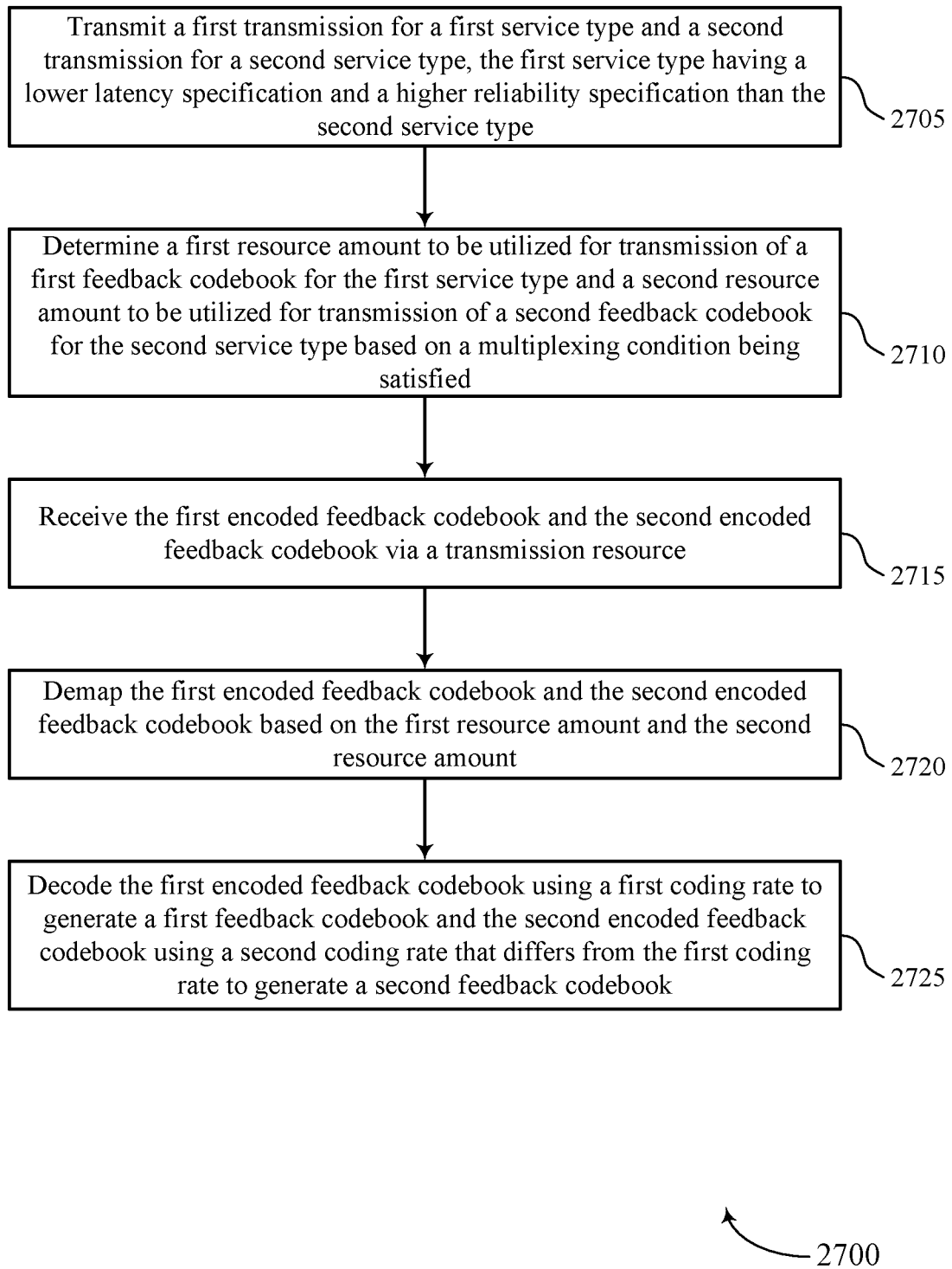

FIG. 27 shows a flowchart illustrating a method 2700 in accordance with aspects of the present disclosure. The operations of method 2700 may be implemented by a base station 105 or its components as described herein. For example, the operations of method 2700 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2705, the base station may transmit a first transmission for a first service type and a second transmission for a second service type, the first service type having a lower latency specification and a higher reliability specification than the second service type. The operations of 2705 may be performed according to the methods described herein. In some examples, aspects of the operations of 2705 may be performed by a transmitting component as described with reference to FIGS. 13 through 16.

At 2710, the base station may determine a first resource amount to be utilized for transmission of a first feedback codebook for the first service type and a second resource amount to be utilized for transmission of a second feedback codebook for the second service type based on a multiplexing condition being satisfied. The operations of 2710 may be performed according to the methods described herein. In some examples, aspects of the operations of 2710 may be performed by a resource identifying component as described with reference to FIGS. 13 through 16.

At 2715, the base station may receive the first encoded feedback codebook and the second encoded feedback codebook via a transmission resource. The operations of 2715 may be performed according to the methods described herein. In some examples, aspects of the operations of 2715 may be performed by a receiving component as described with reference to FIGS. 13 through 16.

At 2720, the base station may demap the first encoded feedback codebook and the second encoded feedback codebook based on the first resource amount and the second resource amount. The operations of 2720 may be performed according to the methods described herein. In some examples, aspects of the operations of 2720 may be performed by a demapping component as described with reference to FIGS. 13 through 16.

At 2725, the base station may decode the first encoded feedback codebook using a first coding rate to generate a first feedback codebook and the second encoded feedback codebook using a second coding rate that differs from the first coding rate to generate a second feedback codebook. The operations of 2725 may be performed according to the methods described herein. In some examples, aspects of the operations of 2725 may be performed by a decoding component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment, comprising:

encoding separately a first feedback codebook for a high priority transmission using a first coding rate to generate a first encoded feedback codebook and a second feedback codebook for a low priority transmission using a second coding rate associated with different coding reliability than the first coding rate to generate a second encoded feedback codebook;

mapping the first encoded feedback codebook and the second encoded feedback codebook to a transmission resource based at least in part on a first resource amount to be utilized for transmission of the first feedback codebook and a second resource amount to be utilized for transmission of the second feedback codebook; and transmitting a multiplexed feedback codebook comprising the first encoded feedback codebook and the second encoded feedback codebook using the transmission resource based at least in part on the mapping.

2. The method of claim 1, wherein the first resource amount is based at least in part on a size of the first feedback codebook; and wherein the second resource amount is based at least in part on a size of the second feedback codebook.

3. The method of claim 1, wherein the first resource amount and the second resource amount are based at least in part on a control channel format of the transmission resource.

4. The method of claim 1, further comprising:

receiving a grant scheduling a first resource for transmission of the first feedback codebook, wherein the first coding rate corresponds to the first resource.

5. The method of claim 1, wherein the first resource amount is a number of resource blocks that is based at least in part on the first coding rate, a size of the first feedback codebook, and a number of symbols in the transmission resource.

6. The method of claim 1, wherein the second resource amount is a number of resource blocks that is based at least in part on the second coding rate, a size of the second feedback codebook, and a number of symbols in the transmission resource.

7. The method of claim 1, further comprising:

receiving control signaling that indicates a power ratio, wherein a first transmission power for transmission of the first encoded feedback codebook and a second transmission power for transmission of the second encoded feedback codebook is based at least in part on the power ratio, wherein the first encoded feedback codebook and the second encoded feedback codebook are respectively transmitted in accordance with the first transmission power and the second transmission power.

8. The method of claim 1, further comprising:

reducing a power allocated for transmission of the second encoded feedback codebook based at least in part on a total transmission power for transmission of the first encoded feedback codebook and transmission of the second encoded feedback codebook exceeding a transmission power capability of the user equipment.

9. The method of claim 1, wherein mapping the first encoded feedback codebook and the second encoded feedback codebook comprises:
mapping the first encoded feedback codebook to first resource elements of the transmission resource based at least in part on proximity of the first resource elements to at least one demodulation reference signal symbol within the transmission resource; and
mapping the second encoded feedback codebook to second resource elements remaining within the transmission resource after mapping of the first encoded feedback codebook to the first resource elements.

10. The method of claim 1, further comprising:
setting the first resource amount as a first number of resource elements to be utilized for transmission of the first feedback codebook.

11. The method of claim 1, further comprising:
receiving a first grant scheduling a first resource for transmission of the first feedback codebook; and
receiving a second grant scheduling a second resource for transmission of the second feedback codebook, wherein the first resource collides in time with the second resource to satisfy a multiplexing condition,
wherein the first resource amount and the second resource amount are based at least in part on the multiplexing condition being satisfied.

12. The method of claim 1, further comprising:
receiving a grant that schedules a transmission of the low priority transmission and a control channel resource for transmission of the first feedback codebook; and
generating the first feedback codebook based at least in part on the low priority transmission.

13. The method of claim 1, further comprising:
receiving a grant that schedules a transmission of the high priority transmission and a control channel resource for transmission of the second feedback codebook; and
generating the second feedback codebook based at least in part on the high priority transmission.

14. The method of claim 1, further comprising:
receiving a first grant scheduling a first resource for transmission of the first feedback codebook and a second grant scheduling a second resource for transmission of the second feedback codebook,
wherein the first resource amount and a second resource amount are based at least in part on the first resource at least partially overlapping with the second resource.

15. The method of claim 1, wherein the encoding comprises:
applying a first cyclic shift of a plurality of different cyclic shifts to a bit sequence to generate a shifted bit sequence to encode at least one bit of the first feedback codebook, at least one bit of the second feedback codebook, or both.

16. The method of claim 1, further comprising:
adjusting from a first modulation scheme to a second modulation scheme based at least in part on a size of the first feedback codebook being a single bit; and
modulating a bit of the first encoded feedback codebook and a bit of the second encoded feedback codebook based at least in part on the second modulation scheme.

17. The method of claim 1, wherein transmitting the first encoded feedback codebook and the second encoded feedback codebook using the transmission resource comprises:
transmitting the first encoded feedback codebook and the second encoded feedback codebook using the transmission resource that is a shared data channel resource.

18. The method of claim 1, wherein the mapping comprises:
mapping at least a portion of the first encoded feedback codebook to an earliest symbol of the transmission resource that does not include a front-loaded demodulation reference signal symbol.

19. The method of claim 18, wherein the mapping comprises:
rate matching the second encoded feedback codebook around resources within the transmission resource allocated to the first encoded feedback codebook.

20. The method of claim 1, wherein the mapping comprises:
mapping the first encoded feedback codebook to a symbol of the transmission resource that occurs prior to a demodulation reference signal symbol in the transmission resource.

21. The method of claim 20, wherein the mapping comprises:
rate matching the second encoded feedback codebook within the transmission resource around resources allocated to the first encoded feedback codebook.

22. The method of claim 1, wherein the mapping comprises:
mapping bits of the first encoded feedback codebook to respective frequency hops based at least in part on an interleaving pattern.

23. The method of claim 1, wherein the mapping comprises:
repeating a bit of the first encoded feedback codebook on respective frequency hops.

24. The method of claim 1,
wherein a first size of the first feedback codebook, a second size of the second feedback codebook, or both, are based at least in part on a grant that schedules the transmission resource in a shared data channel.

25. The method of claim 1, further comprising:
mapping data to the transmission resource based at least in part on a first size of the first feedback codebook, a second size of the second feedback codebook, or both, wherein the transmission resource is a shared data channel resource.

26. The method of claim 1, further comprising:
receiving a grant indicating to report channel state information on a shared data channel resource;
encoding the channel state information using a third coding rate, wherein the transmission resource is the shared data channel resource for a second high priority transmission; and
mapping the encoded channel state information to the shared data channel resource.

27. The method of claim 1, further comprising:
receiving a grant indicating to report channel state information on a shared data channel resource; and
dropping reporting of the channel state information based at least in part on the transmission resource being the shared data channel resource for a second high priority transmission.

28. An apparatus for wireless communications by a user equipment, comprising:
a processor,
memory in electronic communication with the processor; and instructions stored in the memory and executable by the processor to cause the apparatus to:
- encode separately a first feedback codebook for a high priority transmission using a first coding rate to generate a first encoded feedback codebook and a second feedback codebook for a low priority transmission using a second coding rate associated with different coding reliability than the first coding rate to generate a second encoded feedback codebook;
- map the first encoded feedback codebook and the second encoded feedback codebook to a transmission resource based at least in part on a first resource amount to be utilized for transmission of the first feedback codebook and a second resource amount to be utilized for transmission of the second feedback codebook; and
- transmit a multiplexed feedback codebook comprising the first encoded feedback codebook and the second encoded feedback codebook using the transmission resource based at least in part on the mapping.

29. The apparatus of claim 28, wherein the first resource amount is a number of resource blocks that is based at least in part on the first coding rate, a size of the first feedback codebook, and a number of symbols in the transmission resource.

30. The apparatus of claim 28, wherein the second resource amount is a number of resource blocks that is based at least in part on the second coding rate, a size of the second feedback codebook, and a number of symbols in the transmission resource.

31. The apparatus of claim 28, wherein the instructions to map the first encode feedback codebook and the second encoded feedback codebook are executable by the processor to cause the apparatus to:
- map the first encoded feedback codebook to first resource elements of the transmission resource based at least in part on proximity of the first resource elements to at least one demodulation reference signal symbol within the transmission resource; and
- map the second encoded feedback codebook to second resource elements remaining within the transmission resource after mapping of the first encoded feedback codebook to the first resource elements.

32. The apparatus of claim 28, wherein the high priority transmission has a lower latency specification and a higher reliability specification than the low priority transmission.

33. An apparatus for wireless communications by a user equipment, comprising:
- means for encoding separately a first feedback codebook for a high priority transmission using a first coding rate to generate a first encoded feedback codebook and a second feedback codebook for a low priority transmission using a second coding rate associated with different coding reliability than the first coding rate to generate a second encoded feedback codebook;
- means for mapping the first encoded feedback codebook and the second encoded feedback codebook to a transmission resource based at least in part on a first resource amount to be utilized for transmission of the first feedback codebook and a second resource amount to be utilized for transmission of the second feedback codebook; and
- means for transmitting a multiplexed feedback codebook comprising the first encoded feedback codebook and the second encoded feedback codebook using the transmission resource based at least in part on the mapping.

34. A non-transitory computer-readable medium storing code for wireless communications by a user equipment, the code comprising instructions executable by a processor to:
- encode separately a first feedback codebook for a high priority transmission using a first coding rate to generate a first encoded feedback codebook and a second feedback codebook for a low priority transmission using a second coding rate associated with different coding reliability than the first coding rate to generate a second encoded feedback codebook;
- map the first encoded feedback codebook and the second encoded feedback codebook to a transmission resource based at least in part on a first resource amount to be utilized for transmission of the first feedback codebook and a second resource amount to be utilized for transmission of the second feedback codebook; and
- transmit a multiplexed feedback codebook comprising the first encoded feedback codebook and the second encoded feedback codebook using the transmission resource based at least in part on the mapping.

35. The method of claim 1, wherein the high priority transmission has a lower latency specification and a higher reliability specification than the low priority transmission.

* * * * *